US012568967B2

(12) United States Patent
Satchivi et al.

(10) Patent No.: US 12,568,967 B2
(45) **Date of Patent: *Mar. 10, 2026**

(54) COMPOSITIONS COMPRISING PYRIDINE CARBOXYLATE HERBICIDES WITH SYNTHETIC AUXIN HERBICIDES OR AUXIN TRANSPORT INHIBITORS

(71) Applicant: Corteva Agriscience LLC, Indianapolis, IN (US)

(72) Inventors: Norbert M. Satchivi, Carmel, IN (US); Jeremy Kister, Carmel, IN (US)

(73) Assignee: CORTEVA AGRISCIENCE LLC, IN (US)

( * ) Notice: Subject to any disclaimer, the term of this patent is extended or adjusted under 35 U.S.C. 154(b) by 812 days.

This patent is subject to a terminal disclaimer.

(21) Appl. No.: 17/289,496

(22) PCT Filed: Nov. 4, 2019

(86) PCT No.: PCT/US2019/059596

§ 371 (c)(1),
(2) Date: Apr. 28, 2021

(87) PCT Pub. No.: WO2020/096926

PCT Pub. Date: May 14, 2020

(65) Prior Publication Data

US 2023/0009120 A1 Jan. 12, 2023

Related U.S. Application Data

(60) Provisional application No. 62/756,708, filed on Nov. 7, 2018.

(51) Int. Cl.

| | |
|---|---|
| ***A01N 43/40*** | (2006.01) |
| ***A01N 37/10*** | (2006.01) |
| ***A01N 37/30*** | (2006.01) |
| ***A01N 37/34*** | (2006.01) |
| ***A01N 37/38*** | (2006.01) |
| ***A01N 37/40*** | (2006.01) |
| ***A01N 43/42*** | (2006.01) |
| ***A01N 43/54*** | (2006.01) |
| ***A01N 43/90*** | (2006.01) |
| ***A01P 13/00*** | (2006.01) |

(52) U.S. Cl.

CPC ............. *A01N 43/40* (2013.01); *A01N 37/10* (2013.01); *A01N 37/30* (2013.01); *A01N 37/34* (2013.01); *A01N 37/38* (2013.01); *A01N 37/40* (2013.01); *A01N 43/42* (2013.01); *A01N 43/54* (2013.01); *A01N 43/90* (2013.01); *A01P 13/00* (2021.08)

(58) Field of Classification Search

CPC ........ A01N 43/40; A01N 37/10; A01N 37/30; A01N 37/34; A01N 37/38; A01N 37/40; A01N 43/42; A01N 43/54; A01N 43/90; A01N 39/04; A01N 25/32; A01N 43/38; A01P 13/00

See application file for complete search history.

(56) References Cited

U.S. PATENT DOCUMENTS

| | | | | |
|---|---|---|---|---|
| 4,044,140 | A | 8/1977 | Sherlock | |
| 4,698,093 | A | 10/1987 | Lee et al. | |
| 4,877,897 | A | 10/1989 | Swithenbank et al. | |
| 9,179,676 | B2 | 11/2015 | Hoffmann et al. | |
| 9,521,847 | B2 * | 12/2016 | Satchivi | A01N 39/04 |
| 9,611,282 | B2 | 4/2017 | Eckelbarger et al. | |
| 9,763,445 | B2 | 9/2017 | Satchivi et al. | |
| 10,448,638 | B2 | 10/2019 | Satchivi et al. | |
| 11,363,812 | B2 | 6/2022 | Wang et al. | |
| 11,363,816 | B2 * | 6/2022 | Kister | C07D 401/10 |
| 12,029,217 | B2 * | 7/2024 | Satchivi | A01N 25/32 |
| 2003/0114311 | A1 | 6/2003 | Balko et al. | |
| 2007/0093390 | A1 | 4/2007 | Witschel et al. | |
| 2010/0137137 | A1 | 6/2010 | Rosinger et al. | |
| 2011/0245157 | A1 | 10/2011 | Meng | |
| 2015/0005156 | A1 | 1/2015 | Dash et al. | |
| 2015/0005165 | A1 * | 1/2015 | Hoffmann | A01N 43/40 546/281.1 |

(Continued)

FOREIGN PATENT DOCUMENTS

| | | | |
|---|---|---|---|
| CA | 3063094 | A1 | 11/2018 |
| GB | 1565056 | A | 4/1980 |

(Continued)

OTHER PUBLICATIONS

Bonneville Power Administration., "Sulfentrazone Herbicide Fact Sheet," U.S. Department of Energy, 2004, pp. 1-9.
Examination Report of Pakistan Patent Application No. 330/2018, mailed May 9, 2018, 5 Pages Applicant: (Dow Agrosciences LLC, dated Aug. 16, 2019).
Extended European Search Report for European Application No. 18798826.6, mailed Nov. 25, 2020, 8 Pages.
International Preliminary Report on Patentability for International Application No. PCT/US2018/031004, mailed Nov. 21, 2019, 7 Pages.
International Preliminary Report on Patentability for International Application No. PCT/US2019/058779, mailed May 20, 2021, 9 Pages.
International Preliminary Report on Patentability for International Application No. PCT/US2019/058788, mailed May 20, 2021, 09 Pages.

(Continued)

*Primary Examiner* — Marianne C Seidel
*Assistant Examiner* — Joshua A Atkinson

(57) ABSTRACT

Disclosed herein are compositions comprising (a) a pyridine carboxylate herbicide or an agriculturally acceptable N-oxide, salt, or ester thereof and (b) a synthetic auxin herbicide, an auxin transport inhibitor, agriculturally acceptable salts or esters thereof, or combinations thereof. Also disclosed herein are methods of controlling undesirable vegetation, comprising applying to vegetation or an area adjacent the vegetation or applying in soil or water to control the emergence or growth of vegetation (a) a pyridine carboxylate herbicide or an agriculturally acceptable N-oxide, salt, or ester thereof and (b) a synthetic auxin herbicide, an auxin transport inhibitor, agriculturally acceptable salts or esters thereof, or combinations thereof.

16 Claims, No Drawings

(56) References Cited

U.S. PATENT DOCUMENTS

| | | | | |
|---|---|---|---|---|
| 2016/0073632 | A1 | 3/2016 | Satchivi et al. | |
| 2016/0135457 | A1 | 5/2016 | Satchivi et al. | |
| 2016/0135458 | A1* | 5/2016 | Satchivi | C07D 405/04 504/136 |
| 2017/0064955 | A1 | 3/2017 | Satchivi et al. | |
| 2019/0069549 | A1 | 3/2019 | Satchivi et al. | |
| 2019/0069550 | A1 | 3/2019 | Satchivi et al. | |
| 2020/0068888 | A1 | 3/2020 | Kister et al. | |
| 2021/0161135 | A1 | 6/2021 | Satchivi et al. | |
| 2021/0352899 | A1 | 11/2021 | Kister et al. | |
| 2021/0386068 | A1 | 12/2021 | Kister et al. | |
| 2021/0392888 | A1 | 12/2021 | Satchivi et al. | |
| 2021/0392889 | A1 | 12/2021 | Kister et al. | |
| 2021/0392890 | A1 | 12/2021 | Kister et al. | |
| 2021/0392891 | A1 | 12/2021 | Kister et al. | |
| 2021/0392892 | A1 | 12/2021 | Satchivi et al. | |
| 2021/0400967 | A1 | 12/2021 | Satchivi et al. | |
| 2021/0400968 | A1 | 12/2021 | Satchivi et al. | |
| 2021/0400969 | A1 | 12/2021 | Satchivi et al. | |
| 2021/0400970 | A1 | 12/2021 | Satchivi et al. | |
| 2022/0000109 | A1 | 1/2022 | Satchivi et al. | |
| 2022/0000110 | A1 | 1/2022 | Satchivi et al. | |
| 2022/0007644 | A1 | 1/2022 | Kister et al. | |
| 2023/0022569 | A1 | 1/2023 | Kister et al. | |

FOREIGN PATENT DOCUMENTS

| | | | | |
|---|---|---|---|---|
| WO | 03/011853 | A1 | 2/2003 | |
| WO | 2009029518 | A2 | 3/2009 | |
| WO | 2013/014165 | A1 | 1/2013 | |
| WO | 2013085991 | A1 | 6/2013 | |
| WO | 2014018398 | A1 | 1/2014 | |
| WO | 2014018402 | A1 | 1/2014 | |
| WO | 2014018407 | A1 | 1/2014 | |
| WO | 2014116910 | A1 | 7/2014 | |
| WO | 2014116927 | A1 | 7/2014 | |
| WO | 2014/151005 | A1 | 9/2014 | |
| WO | 2016/044282 | A1 | 3/2016 | |
| WO | 2016/044285 | A1 | 3/2016 | |
| WO | 2016044229 | A2 | 3/2016 | |
| WO | 2016044276 | A1 | 3/2016 | |
| WO | 2016044283 | A1 | 3/2016 | |
| WO | WO-2018208582 | A1* | 11/2018 | A01N 43/40 |
| WO | 2019030614 | A1 | 2/2019 | |
| WO | 2019046666 | A1 | 3/2019 | |
| WO | 2019046667 | A1 | 3/2019 | |
| WO | 2019060366 | A1 | 3/2019 | |
| WO | 2019195495 | A1 | 10/2019 | |
| WO | 2019195496 | A1 | 10/2019 | |
| WO | PCT/US2019/059594 | | 3/2020 | |
| WO | PCT/US2019/059596 | | 4/2020 | |
| WO | 2020096832 | A1 | 5/2020 | |

OTHER PUBLICATIONS

International Preliminary Report on Patentability for International Application No. PCT/US2019/058795, mailed May 20, 2021, 9 Pages.
International Preliminary Report on Patentability for International Application No. PCT/US2019/059592, mailed May 20, 2021, 9 Pages.
International Preliminary Report on Patentability for International Application No. PCT/US2019/059594, mailed May 20, 2021, 09 Pages.
International Preliminary Report on Patentability for International Application No. PCT/US2019/059596, mailed May 20, 2021,10 Pages.
International Preliminary Report on Patentability for International Application No. PCT/US2019/059599, mailed May 20, 2021,10 Pages.
International Preliminary Report on Patentability for International Application No. PCT/US2019/059601, mailed May 20, 2021,10 Pages.
International Preliminary Report on Patentability for International Application No. PCT/US2019/059604, mailed May 20, 2021, 9 Pages.
International Preliminary Report on Patentability for International Application No. PCT/US2019/059605, mailed May 20, 2021, 9 Pages.
International Preliminary Report on Patentability for International Application No. PCT/US2019/059606, mailed May 20, 2021, 9 Pages.
International Preliminary Report on Patentability for International Application No. PCT/US2019/059609, mailed May 20, 2021, 9 Pages.
International Preliminary Report on Patentability for International Application No. PCT/US2019/059612, mailed May 20, 2021, 9 Pages.
International Preliminary Report on Patentability for International Application No. PCT/US2019/059613, mailed May 20, 2021, 9 Pages.
International Preliminary Report on Patentability for International Application No. PCT/US2019/059615, mailed May 20, 2021, 10 Pages.
International Preliminary Report on Patentability for International Application No. PCT/US2019/059617, mailed May 20, 2021, 9 Pages.
International Search Report and Written Opinion for International Application No. PCT/US2014/024745, mailed Jul. 7, 2014, 9 Pages.
International Search Report and Written Opinion for International Application No. PCT/US2018/031004, mailed Jul. 26, 2018, 8 Pages.
International Search Report and Written Opinion for International Application No. PCT/US2019/058779, mailed Feb. 19, 2020, 11 Pages.
International Search Report and Written Opinion for International Application No. PCT/US2019/058788, mailed Feb. 19, 2020, 11 Pages.
International Search Report and Written Opinion for International Application No. PCT/US2019/058795, mailed Feb. 19, 2020, 11 Pages.
International Search Report and Written Opinion for International Application No. PCT/US2019/059592, mailed Apr. 2, 2020, 12 Pages.
International Search Report and Written Opinion for International Application No. PCT/US2019/059599, mailed Mar. 19, 2020, 13 Pages.
International Search Report and Written Opinion for International Application No. PCT/US2019/059601, mailed Apr. 2, 2020, 13 Pages.
International Search Report and Written Opinion for International Application No. PCT/US2019/059604, mailed Apr. 2, 2020, 12 Pages.
International Search Report and Written Opinion for International Application No. PCT/US2019/059605, mailed Mar. 19, 2020, 12 Pages.
International Search Report and Written Opinion for International Application No. PCT/US2019/059606, mailed Apr. 2, 2020, 12 Pages.
International Search Report and Written Opinion for International Application No. PCT/US2019/059609, mailed Apr. 2, 2020, 12 Pages.
International Search Report and Written Opinion for International Application No. PCT/US2019/059612, mailed Mar. 19, 2020, 12 Pages.
International Search Report and Written Opinion for International Application No. PCT/US2019/059613, mailed Mar. 9, 2020, 12 Pages.
International Search Report and Written Opinion for International Application No. PCT/US2019/059615, mailed Apr. 24, 2020, 13 Pages.
International Search Report and Written Opinion for International Application No. PCT/US2019/059617, mailed Apr. 2, 2020, 12 Pages.

(56) References Cited

OTHER PUBLICATIONS

Official Action for Eurasian Patent Application No. 201992666, dated Nov. 23, 2021 for Dow Agrosciences LLC, Dec. 9, 2019, 3 Pages.
Official Action for Eurasian Patent Application No. 201992666, dated Feb. 24, 2021 for Dow Agrosciences LLC, Dec. 9, 2019, 3 Pages.
Aim EC Herbicide label, FMC Corporation, May 2, 2017.
Bayer., "An Integrated Approach to Manage Weeds," Crop Science, Retrieved from Internet URL: , No Pagination, 2016, pp. 1-3.
Official Action for Eurasian Patent Application No. 201992666, dated Feb. 17, 2021 for Dow Agrosciences LLC, English Translation Received Feb. 24, 2021, 6 Pages.
Official Action for Eurasian Patent Application No. 210992666, dated Nov. 9, 2021 for Dow AgroSciences LLC, English Translation Received Nov. 23, 2021, 5 Pages.
Van-Assche C. J., et al., "Photosystem li Inhibiting Chemicals: Molecular Interaction Between Inhibitors and a Common Target," Biochemical Responses Induced by Herbicides, ACS Publications, 1982, pp. 1-21.
Colby, S.R., "Calculating Synergistic and Antagonistic Responses of Herbicide Combinations", Weeds, 1967, vol. 15, No. 1, 20-22.
Richer D.L., "Synergism—a Patent View," Pesticide Science, 1987, vol. 19, No. 04, pp. 309-315.
Rummens F.H.A., "An Improved Definition of Synergistic and Antagonistic Effects," Weed Science, Jan. 1975, vol. 23, No. 1, pp. 4-6.

* cited by examiner

COMPOSITIONS COMPRISING PYRIDINE CARBOXYLATE HERBICIDES WITH SYNTHETIC AUXIN HERBICIDES OR AUXIN TRANSPORT INHIBITORS

CROSS REFERENCE TO RELATED APPLICATION

This application is the National Stage Entry of International Application No. PCT/US19/59596, filed on Nov. 4, 2019, which claims the benefit of priority of U.S. Provisional Application No. 62/756,708, filed Nov. 7, 2018, both of which are incorporated by reference herein in their entirety.

FIELD

The present disclosure includes compositions comprising (a) a pyridine carboxylate herbicide or an agriculturally acceptable N-oxide, salt, or ester thereof, and (b) a synthetic auxin herbicide, an auxin transport inhibitor, agriculturally acceptable salts or esters thereof, or combinations thereof. The present disclosure also includes methods of controlling undesirable vegetation using the same.

BACKGROUND

Many recurring problems in agriculture involve controlling the growth of undesirable vegetation that can, for instance, negatively affect the growth of desirable vegetation. To help control undesirable vegetation, researchers have produced a variety of chemicals and chemical formulations effective in controlling such unwanted growth. However, there exists a need for new herbicide compositions and methods to control the growth of undesirable vegetation in desired crops.

SUMMARY

Disclosed herein are compositions that may be used as herbicides, for example, in crops. The compositions may contain (a) a pyridine carboxylate herbicide or agriculturally acceptable N-oxide, salt, or ester thereof and (b) a synthetic auxin herbicide, an auxin transport inhibitor, agriculturally acceptable salts or esters thereof, or combinations thereof. The weight ratio of (a) to (b) can be from 1:8000 to 300:1 (e.g., from 1:2225 to 175:1, from 1:1500 to 100:1, from 1:1000 to 85:1, from 1:200 to 12:1, from 1:85 to 3.5:1, from 1:50 to 7.5:1, or from 1:30 to 5:1).

In some aspects, the composition comprises (a) a pyridine carboxylate herbicide defined by Formula (I):

Formula I

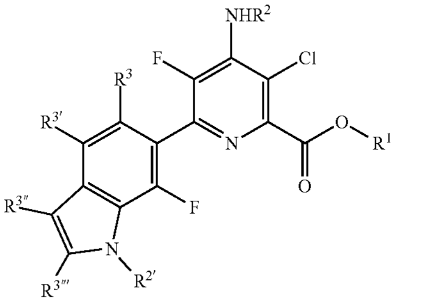

wherein:

$R^1$ is cyanomethyl or propargyl;

$R^2$ and $R^{2'}$ are independently hydrogen, $C_1$-$C_6$ alkyl, formyl, alkoxycarbonyl, or acyl;

$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;

or an agriculturally acceptable N-oxide, salt, or ester thereof; and (b) a synthetic auxin herbicide, an auxin transport inhibitor, agriculturally acceptable salts or esters thereof, or combinations thereof.

In some aspects, the composition comprises:

a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

Compound A

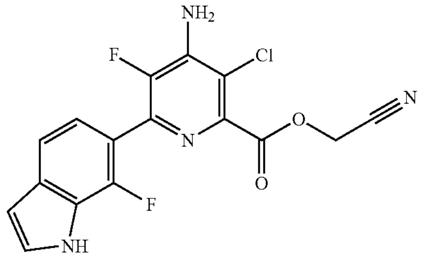

or an agriculturally acceptable N-oxide, salt, or ester thereof; and (b) a synthetic auxin herbicide, an auxin transport inhibitor, agriculturally acceptable salts or esters thereof, or combinations thereof.

In some aspects, the composition comprises:

(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

Compound B

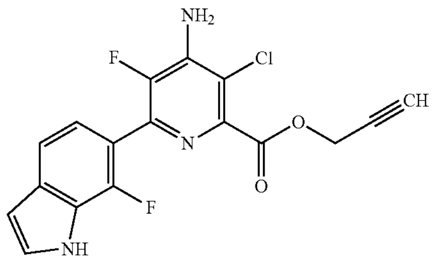

or an agriculturally acceptable N-oxide, salt, or ester thereof; and (b) a synthetic auxin herbicide, an auxin transport inhibitor, agriculturally acceptable salts or esters thereof, or combinations thereof.

In some aspects, (b) can comprise a synthetic auxin herbicide comprising a phenoxycarboxylic acid herbicide, a benzoic acid herbicide, an aryl picolinate herbicide, a pyridine carboxylate herbicide, a quinoline carboxylic acid herbicide, a pyrimidine carboxylic acid herbicide, a benzothiazole herbicide, agriculturally acceptable salts and esters thereof, or combinations thereof. In some aspects, (b) can include 2,4-D, 2,4-DB, MCPA, MCPB, 2,3,6-TBA, aminocyclopyrachl or, aminopyralid, benazolin-methyl, chloramben, clomeprop, clopyralid, dicamba, dichlorprop, florpyrauxifen, florpyrauxifen-benzyl, fluroxypyr, halauxifen (such as halauxifen-methyl), mecoprop, picloram, quinclorac, quinmerac, triclopyr, agriculturally acceptable salts and esters thereof, or combinations thereof.

In some aspects, (b) can comprise an auxin transport inhibitor comprising a semicarbazone herbicide, phthalamate herbicide, or other benzoic acid, agriculturally acceptable salts and esters thereof, or combinations thereof. In some aspects, (b) can include chlorflurenol, diflufenzopyr, naptalam, agriculturally acceptable salts and esters thereof, or combinations thereof.

In some aspects, the composition can further comprise an agriculturally acceptable adjuvant or carrier, a herbicidal safener, an additional pesticide, or combinations thereof. In some aspects, the only active ingredients in the composition are (a) and (b). In some aspects, the composition can be provided as a herbicidal concentrate.

Also disclosed herein are methods of controlling undesirable vegetation, comprising applying to vegetation, to an area adjacent the vegetation, or to soil or water to control the emergence or growth of vegetation, a composition comprising: (a) a pyridine carboxylate herbicide or an agriculturally acceptable N-oxide, salt, or ester thereof; and (b) a synthetic auxin herbicide, an auxin transport inhibitor, agriculturally acceptable salts or esters thereof, or combinations thereof. In some aspects, (a) and (b) are applied simultaneously. In some aspects, (a) and (b) are applied sequentially. In some aspects, (a) and (b) are applied pre-emergence of the undesirable vegetation. In some aspects, (a) and (b) are applied post-emergence of the undesirable vegetation. In some aspects, the undesirable vegetation is in cereals. In some aspects, the undesirable vegetation is in maize, wheat, barley, rice, sorghum, millet, or oats.

In some aspects, the pyridine carboxylate herbicide (a) can be applied in an amount of from 0.5 gram acid equivalent per hectare (g ae/ha) to 300 g ae/ha (e.g., from 30 g ae/ha to 40 g ae/ha). In some cases, the synthetic auxin herbicide (b) can be applied in an amount of from 0.25 g ai/ha to 1000 g ai/ha (e.g., from 3 g ai/ha to 40 g ai/ha). In some cases, (a) and (b) can be applied in a weight ratio of from 1:8000 to 300:1 (e.g., from 1:2225 to 175:1, from 1:1500 to 100:1, from 1:1000 to 85:1, from 1:200 to 12:1, from 1:85 to 3.5:1, from 1:50 to 7.5:1, or from 1:30 to 5:1).

The description below sets forth details of one or more aspect of the present disclosure. Other features, objects, and advantages will be apparent from the description and from the claims.

DETAILED DESCRIPTION

The present disclosure includes compositions comprising: (a) a pyridine carboxylate herbicide or an agriculturally acceptable N-oxide, salt, or ester thereof and (b) a synthetic auxin herbicide, an auxin transport inhibitor, agriculturally acceptable salts or esters thereof, or combinations thereof. The present disclosure also includes methods for controlling undesirable vegetation. In some aspects, the undesirable vegetation is in cereals. In some aspects, the undesirable vegetation is in maize, wheat, barley, rice, sorghum, millet, or oats.

I. Definitions

Terms used herein will have their customary meaning in the art unless specified otherwise. The singular forms "a" and "the" include plural references unless stated otherwise. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient. As used herein, the term "prevents" or similar terms such as "preventing" may be understood by a person of ordinary skill to include any combination that shows herbicidal effect or reduces the competitive capability of the weed with respect to a crop.

As used herein, "applying" a herbicide or herbicidal composition refers to delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" can include, for instance, dormant seeds, germinating seeds, emerging seedlings, plants propagating from vegetative propagules, immature vegetation, and established vegetation.

As used herein, the term "crop" refers to desired vegetation, for instance, plants that are grown to provide food, shelter, pasture, erosion control, etc. Example crops include cereals, legumes, vegetables, orchard and timber trees, grapevines, etc. Preferably, herbicides or herbicidal compositions have zero or minimal herbicidal effect on crops.

As used herein, the term "undesirable vegetation" refers to vegetation that is not wanted in a given area, for instance, weed species. Herbicides or herbicidal compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation, for example, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

130 g ai/ha *Z* salt*(100 Da *Z* acid/130 Da *Z* salt)=100 g ae/ha *Z* acid.

As used herein, unless otherwise specified, the term "acyl" may be understood to include a group of formula —C(O)R, where "C(O)" is short-hand notation for C═O. In the acyl group, the R may be alkyl (e.g., $C_1$-$C_6$ alkyl), haloalkyl (e.g., $C_1$-$C_6$ haloalkyl), alkenyl (e.g., $C_2$-$C_6$ alkenyl), haloalkenyl (e.g., $C_2$-$C_6$ haloalkenyl), alkynyl (e.g., $C_2$-$C_6$ alkynyl), aryl or heteroaryl, or arylalkyl (e.g., $C_7$-$C_{10}$ arylalkyl).

As used herein, the term "alkyl" may be understood to include saturated, straight-chained, branched, or cyclic saturated hydrocarbon moieties. Unless otherwise specified, $C_1$-$C_{20}$ (e.g., $C_1$-$C_{12}$, $C_1$-$C_6$, or $C_1$-$C_4$) alkyl groups are intended. Examples of alkyl groups include methyl, ethyl, propyl, cyclopropyl, 1-methyl-ethyl, butyl, cyclobutyl, 1-methyl-propyl, 2-methyl-propyl, 1,1-dimethyl-ethyl, pentyl, cyclopentyl, 1-methyl-butyl, 2-methyl-butyl, 3-methyl-butyl, 2,2-dimethyl-propyl, 1-ethyl-propyl, hexyl, cyclohexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "haloalkyl" may be understood to include straight-chained or branched alkyl groups, wherein the hydrogen atoms may partially or entirely be substituted with halogen atoms. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, and 1,1,1-trifluoroprop-2-yl. Haloalkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "alkoxy" may be understood to include a group of the formula R—O—, where R is unsubstituted or substituted alkyl as defined above. Unless otherwise specified, alkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-dimethyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "alkoxycarbonyl" may be understood to include a group of the formula —C(O)OR, where R is an unsubstituted or substituted alkyl as defined above. Unless otherwise specified, alkoxycarbonyl groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxycarbonyl, ethoxycarbonyl, propoxycarbonyl, 1-methyl-ethoxycarbonyl, butoxycarbonyl, 1-methyl-propoxycarbonyl, 2-methyl-propoxycarbonyl, 1,1-dimethyl-ethoxycarbonyl, pentoxycarbonyl, 1-methyl-butoxycarbonyl, 2-methyl-butoxycarbonyl, 3-methyl-butoxycarbonyl, 2,2-dimethyl-propoxycarbonyl, 1-ethyl-propoxycarbonyl, hexoxycarbonyl, 1,1-dimethyl-propoxycarbonyl, 1,2-dimethyl-propoxycarbonyl, 1-methyl-pentoxycarbonyl, 2-methyl-pentoxycarbonyl, 3-methyl-pentoxycarbonyl, 4-methyl-penoxycarbonyl, 1,1-dimethyl-butoxycarbonyl, 1,2-dimethyl-butoxycarbonyl, 1,3-dimethyl-butoxycarbonyl, 2,2-dimethyl-butoxycarbonyl, 2,3-dimethyl-butoxycarbonyl, 3,3-dimethyl-butoxycarbonyl, 1-ethyl-butoxycarbonyl, 2-ethylbutoxycarbonyl, 1,1,2-trimethyl-propoxycarbonyl, 1,2,2-trimethyl-propoxycarbonyl, 1-ethyl-1-methyl-propoxycarbonyl, and 1-ethyl-2-methyl-propoxycarbonyl.

As used herein, the term "haloalkoxy" may be understood to include a group of the formula R—O—, where R is unsubstituted or substituted haloalkyl as defined above. Unless otherwise specified, haloalkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy, and 1,1,1-trifluoroprop-2-oxy.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some aspects, the aryl group can be a phenyl, indanyl or naphthyl group.

As used herein, the term "heteroaryl," as well as derivative terms such as "heteroaryloxy," may be understood to include a 5- or 6-membered aromatic ring containing one or more heteroatoms, for example, N, O or S. Heteroaryl rings may be fused to other aromatic systems. The aryl or heteroaryl substituents may also be substituted with one or more chemical moieties. Examples of suitable substituents include, for example, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied. Preferred substituents include halogen, $C_1$-$C_4$ alkyl and $C_1$-$C_4$ haloalkyl.

As used herein, the term "halogen," including derivative terms such as "halo," refers to fluorine, chlorine, bromine and iodine.

As used herein, agriculturally acceptable salts and esters may be understood to include salts and esters that exhibit herbicidal activity, or that are or can be converted in plants, water, or soil to the referenced herbicide. Exemplary agriculturally acceptable esters are those that are or can be hydrolyzed, oxidized, metabolized, or otherwise converted, e.g., in plants, water, or soil, to the corresponding carboxylic acid which, depending on the pH, may be in the dissociated or undissociated form.

Compounds described herein can include N-oxides. Pyridine N-oxides can be obtained by oxidation of the corresponding pyridines. Suitable oxidation methods are described, for example, in Houben-Weyl, *Methoden der organischen Chemie* [*Methods in organic chemistry*], expanded and subsequent volumes to the 4th edition, volume E 7b, p. 565 f.

II. Pyridine Carboxylate Herbicides

Compositions and methods of the present disclosure include a composition comprising (a) a pyridine carboxylate herbicide defined by Formula (I):

Formula I

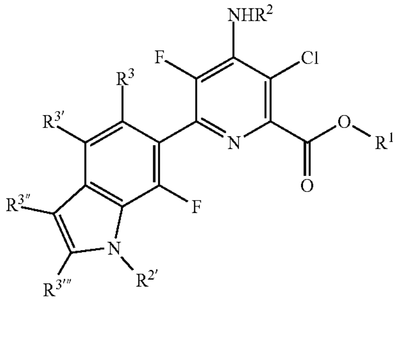

wherein:

$R^1$ is cyanomethyl or propargyl;

$R^2$ and $R^{2'}$ are independently hydrogen, $C_1$-$C_6$ alkyl, formyl, alkoxycarbonyl, or acyl;

$R^3$, $R^{3'}$, $R^{3''}$, and $R^{3'''}$_0 are independently hydrogen, halogen, $C_1$-$C_4$ alkyl, $C_1$-$C_4$ haloalkyl, $C_1$-$C_3$ alkoxy, or $C_1$-$C_3$ haloalkoxy;

or an agriculturally acceptable N-oxide, salt, or ester thereof; and (b) a synthetic auxin herbicide, an auxin transport inhibitor, agriculturally acceptable salts or esters thereof, or combinations thereof.

In some aspects, compositions and methods of the present disclosure include the composition comprising (a) the pyridine carboxylate herbicide cyanomethyl 4-amino-3-chloro-5-fluoro-6-(7-fluoro-1H-indol-6-yl)pyridine-2-carboxylate, Compound A:

Compound A

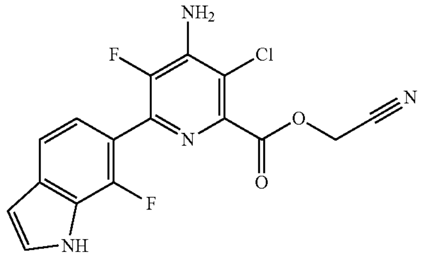

or an agriculturally acceptable N-oxide, salt, or ester thereof, and (b) a synthetic auxin herbicide, an auxin transport inhibitor, agriculturally acceptable salts or esters thereof, or combinations thereof.

In some aspects, compositions and methods of the present disclosure include the composition comprising (a) the pyridine carboxylate herbicide propargyl 4-amino-3-chloro-5-fluoro-6-(7-fluoro-1H-indol-6-yl)pyridine-2-carboxylate, Compound B:

Compound B

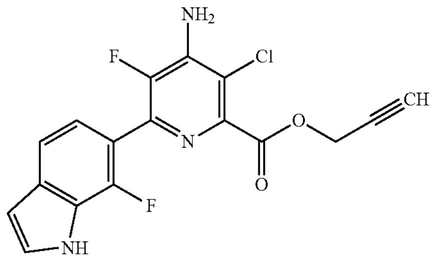

or an agriculturally acceptable N-oxide, salt, or ester thereof, and (b) a synthetic auxin herbicide, an auxin transport inhibitor, agriculturally acceptable salts or esters thereof, or combinations thereof.

Pyridine carboxylate herbicides defined by Formula (I), as well as methods of making these pyridine carboxylate herbicides, are disclosed in application PCT/US2018/031004, filed May 4, 2018, the entire disclosure of which is hereby expressly incorporated by reference.

In some aspects, the pyridine carboxylate herbicide can be provided as an agriculturally acceptable salt. Exemplary agriculturally acceptable salts of the pyridine carboxylate herbicides include, but are not limited to: sodium salts; potassium salts; ammonium salts or substituted ammonium salts, in particular mono-, di- and tri-$C_1$-$C_8$-alkylammonium salts such as methyl ammonium, dimethylammonium and isopropylammonium; mono-, di- and tri-hydroxy-$C_2$-$C_8$-alkylammonium salts such as hydroxyethylammonium, di(hydroxyethyl)ammonium, tri(hydroxyethyl)ammonium, hydroxypropylammonium, di(hydroxypropyl)ammonium and tri(hydroxypropyl)ammonium salts; olamine salts; diglycolamine salts; choline salts; and quaternary ammonium salts such as those represented by the formula $R^9R^{10}R^{11}R^{12}N^+$ and wherein $R^9$, $R^{10}$, $R^{11}$ and $R^{12}$ (e.g., $R^9$-$R^{12}$) each independently can represent hydrogen, $C_1$-$C_{10}$ alkyl, $C_2$-$C_8$ alkenyl, $C_2$-$C_8$ alkynyl, $C_1$-$C_8$ alkoxy, $C_1$-$C_8$ alkylthio, or aryl groups, provided that $R^9$-$R^{12}$ are sterically compatible.

In some aspects, the pyridine carboxylate herbicide can be provided as an agriculturally acceptable ester. Exemplary agriculturally acceptable esters of the pyridine carboxylate herbicides include, but are not limited to: methyl, ethyl, propyl, 1-methyl-ethyl, butyl, 1-methyl-propyl, 2-methyl-propyl, pentyl, 1-methyl-butyl, 2-methyl-butyl, 3-methyl-butyl, 1-ethyl-propyl, hexyl, 1-methyl-hexyl (mexyl), 2-ethylhexyl, heptyl, 1-methyl-heptyl (meptyl), octyl, isooctyl (isoctyl), butoxyethyl (butotyl), and benzyl.

The pyridine carboxylate herbicide, or an agriculturally acceptable N-oxide, salt, or ester thereof, can be applied to vegetation or an area adjacent the vegetation or applied to soil or water to prevent the emergence or growth of vegetation in an amount sufficient to induce a herbicidal effect. In some aspects, the pyridine carboxylate herbicide, or an agriculturally acceptable N-oxide, salt, or ester thereof, is applied to vegetation or an area adjacent the vegetation or applied to soil or water to prevent the emergence or growth of vegetation in an amount of 0.1 grams acid equivalent per hectare (g ae/ha) or greater, such as 0.2 g ae/ha or greater, 0.3 g ae/ha or greater, 0.4 g ae/ha or greater, 0.5 g ae/ha or greater, 0.6 g ae/ha or greater, 0.7 g ae/ha or greater, 0.8 g ae/ha or greater, 0.9 g ae/ha or greater, 1 g ae/ha or greater, 1.1 g ae/ha or greater, 1.2 g ae/ha or greater, 1.3 g ae/ha or greater, 1.4 g ae/ha or greater, 1.5 g ae/ha or greater, 1.6 g ae/ha or greater, 1.7 g ae/ha or greater, 1.8 g ae/ha or greater, 1.9 g ae/ha or greater, 2 g ae/ha or greater, 2.25 g ae/ha or greater, 2.5 g ae/ha or greater, 2.75 g ae/ha or greater, 3 g ae/ha or greater, 4 g ae/ha or greater, 5 g ae/ha or greater, 6 g ae/ha or greater, 7 g ae/ha or greater, 8 g ae/ha or greater, 9 g ae/ha or greater, 10 g ae/ha or greater, 11 g ae/ha or greater, 12 g ae/ha or greater, 13 g ae/ha or greater, 14 g ae/ha or greater, 15 g ae/ha or greater, 16 g ae/ha or greater, 17 g ae/ha or greater, 18 g ae/ha or greater, 19 g ae/ha or greater, 20 g ae/ha or greater, 22 g ae/ha or greater, 24 g ae/ha or greater, 25 g ae/ha or greater, 26 g ae/ha or greater, 28 g ae/ha or greater, 30 g ae/ha or greater, 32 g ae/ha or greater, 34 g ae/ha or greater, 35 g ae/ha or greater, 36 g ae/ha or greater, 38 g ae/ha or greater, 40 g ae/ha or greater, 42.5 g ae/ha or greater, 45 g ae/ha or greater, 47.5 g ae/ha or greater, 50 g ae/ha or greater, 52.5 g ae/ha or greater, 55 g ae/ha or greater, 57.5 g ae/ha or greater, 60 g ae/ha or greater, 65 g ae/ha or greater, 70 g ae/ha or greater, 75 g ae/ha or greater, 80 g ae/ha or greater, 85 g ae/ha or greater, 90 g ae/ha or greater, 95 g ae/ha or greater, 100 g ae/ha or greater, 110 g ae/ha or greater, 120 g ae/ha or greater, 130 g ae/ha or greater, 140 g ae/ha or greater, 150 g ae/ha or greater, 160 g ae/ha or greater, 170 g ae/ha or greater, 180 g ae/ha or greater, 190 g ae/ha or greater, 200 g ae/ha or greater, 210 g ae/ha or greater, 220 g ae/ha or greater, 230 g ae/ha or greater, 240 g ae/ha or greater, 250 g ae/ha or greater, 260 g ae/ha or greater, 270 g ae/ha or greater, 280 g ae/ha or greater, or 290 g ae/ha or greater; in an amount of 300 g ae/ha or less, such as 290 g ae/ha or less, 280 g ae/ha or less, 270 g ae/ha or less, 260 g ae/ha or less, 250 g ae/ha or less, 240 g ae/ha or less, 230 g ae/ha or less, 220 g ae/ha or less, 210 g ae/ha or less, 200 g ae/ha or less, 190 g ae/ha or less, 180 g ae/ha or less, 170 g ae/ha or less, 160 g ae/ha or less, 150 g ae/ha or less, 140 g ae/ha or less, 130 g ae/ha or less, 120 g ae/ha or less, 110 g ae/ha or less, 100 g ae/ha or less, 95 g ae/ha or less, 90 g ae/ha or less, 85 g ae/ha or less, 80 g ae/ha or less, 75 g ae/ha or less, 70 g ae/ha or less, 65 g ae/ha or less, 60 g ae/ha or less, 57.5 g ae/ha or less, 55 g ae/ha or less, 52.5 g ae/ha or less, 50 g ae/ha or less, 47.5 g ae/ha or less, 45 g ae/ha or less, 42.5 g ae/ha or less, 40 g ae/ha or less, 38 g ae/ha or less, 36 g ae/ha or less, 35 g ae/ha or less, 34 g ae/ha or less, 32 g ae/ha or less, 30 g ae/ha or less, 28 g ae/ha or less, 26 g ae/ha or less, 25 g ae/ha or less, 24 g ae/ha or less, 22 g ae/ha or less, 20 g ae/ha or less, 19 g ae/ha or less, 18 g ae/ha or less, 17 g ae/ha or less, 16 g ae/ha or less, 15 g ae/ha or less, 14 g ae/ha or less, 13 g ae/ha or less, 12 g ae/ha or less, 11 g ae/ha or less, 10 g ae/ha or less, 9 g ae/ha or less, 8 g ae/ha or less, 7 g ae/ha or less, 6 g ae/ha or less, 5 g ae/ha or less, 4 g ae/ha or less, 3 g ae/ha or less, 2.75 g ae/ha or less, 2.5 g ae/ha or less, 2.25 g ae/ha or less, 2 g ae/ha or less, 1.9 g ae/ha or less, 1.8 g ae/ha or less, 1.7 g ae/ha or less, 1.6 g ae/ha or less, 1.5 g ae/ha or less, 1.4 g ae/ha or less, 1.3 g ae/ha or less, 1.2 g ae/ha or less, 1.1 g ae/ha or less, 1 g ae/ha or less, 0.9 g ae/ha or less, 0.8 g ae/ha or less, 0.7 g ae/ha or less, 0.6 g ae/ha or less, 0.5 g ae/ha or less, 0.4 g ae/ha or less, 0.3 g ae/ha or less, or 0.2 g ae/ha or less; or in an amount within any range defined between any pair of the preceding values, such as 0.1-300 g ae/ha, 1-150 g ae/ha, 10-200 g ae/ha, 25 g ae/ha-75 g ae/ha, or 40-100 g ae/ha.

III. Synthetic Auxin Herbicides

In addition to the pyridine carboxylate herbicide or agriculturally acceptable N-oxide, salt or ester thereof, the compositions can include a synthetic auxin herbicide. Synthetic auxin herbicides mimic natural plant hormones and can inhibit cell division and growth. Synthetic auxin herbicides include phenoxy herbicides, benzoic acid herbicides, aryl picolinate herbicides, pyridine carboxylate herbicides, quinoline carboxylic acid herbicides, pyrimidine carboxylic acid herbicides, and benzothiazole herbicides, as well as agriculturally acceptable salts and esters thereof.

In some aspects, the composition can include a synthetic auxin herbicide selected from the group consisting of 2,4-D; 2,4-DB; 2,3,6-TBA, aminocyclopyrachlor, aminopyralid, benazolin-ethyl, chloramben, clomeprop, clopyralid, dichlorprop, dichlorprop-P, dicamba, florpyrauxifen (such as florpyrauxifen-benzyl), fluroxypyr, fluroxypyr-MHE, halauxifen, halauxifen-methyl, mecoprop, mecoprop-P, MCPA, MCPA-thioethyl, MCPB, picloram, quinclorac, quinmerac, triclopyr, agriculturally acceptable salts and esters thereof, and combinations thereof. In some aspects, the synthetic auxin herbicide can comprise 2,4-D, MCPA, aminopyralid, clopyralid, dicamba, florpyrauxifen, fluroxypyr, halauxifen, quinclorac, agriculturally acceptable salts and esters thereof, and combinations thereof.

The synthetic auxin herbicide or agriculturally acceptable salt or ester thereof can be applied to vegetation or an area adjacent the vegetation or applied to soil or water to prevent the emergence or growth of vegetation in an amount sufficient to induce a herbicidal effect. In some aspects, the synthetic auxin herbicide or agriculturally acceptable salt or ester thereof is applied to vegetation or an area adjacent the vegetation or applied to soil or water to prevent the emergence or growth of vegetation in an amount of 1 gram acid equivalent per hectare (g ai) or more, such as 1.5 g ai or more, 2 g ai or more, 2.5 g ai or more, 3 g ai or more, 3.5 g ai or more, 4 g ai or more, 4.5 g ai or more, 5 g ai or more, 6 g ai or more, 7 g ai or more, 8 g ai or more, 9 g ai or more, 10 g ai or more, 15 g ai or more, 20 g ai or more, 25 g ai or more, 30 g ai or more, 35 g ai or more, 40 g ai or more, 45 g ai or more, 50 g ai or more, 55 g ai or more, 60 g ai or more, 65 g ai or more, 70 g ai or more, 75 g ai or more, 80 g ai or more, 85 g ai or more, 90 g ai or more, 95 g ai or more, 100 g ai or more, 110 g ai or more, 120 g ai or more, 130 g ai or more, 140 g ai or more, 150 g ai or more, 160 g ai or more, 170 g ai or more, 180 g ai or more, 190 g ai or more, 200 g ai or more, 220 g ai or more, 240 g ai or more, 250 g ai or more, 260 g ai or more, 280 g ai or more, 300 g ai or more, 320 g ai or more, 340 g ai or more, 350 g ai or more, 360 g ai or more, 380 g ai or more, 400 g ai or more, 450 g ai or more, 500 g ai or more, 550 g ai or more, 600 g ai or more, 650 g ai or more, 700 g ai or more, 750 g ai or more, 800 g ai or more, 850 g ai or more, 900 g ai or more, 950 g ai or more, 1000 g ai or more, 1050 g ai or more, 1100 g ai or more, 1150 g ai or more, 1200 g ai or more, 1250 g ai or more, 1300 g ai or more, 1350 g ai or more, 1400 g ai or more, 1450 g ai or more, 1500 g ai or more, 1600 g ai or more, 1700 g ai or more, 1800 g ai or more, 1900 g ai or more, 2000 g ai or more, 2050 g ai or more, 2100 g ai or more, 2150 g ai or more, 2200 g ai or more, 2240 g ai or more, 2250 g ai or more, 2300 g ai or more, 2350 g ai or more, 2400 g ai or more, 2450 g ai or more, 2500 g ai or more, 2600 g ai or more, 2700 g ai or more, 2750 g ai or more, 2800 g ai or more, 2900 g ai or more, 3000 g ai or more, 3050 g ai or more, 3100 g ai or more, 3150 g ai or more, 3200 g ai or more, 3250 g ai or more, 3300 g ai or more, 3350 g ai or more, 3400 g ai or more, 3450 g ai or more, 3500 g ai or more, 3600 g ai or more, 3700 g ai or more, 3750 g ai or more, 3800 g ai or more, 3900 g ai or more, or 3950 g ai or more; in an amount of 4000 g ai or less, such as 3950 g ai or less, 3900 g ai or less, 3800 g ai or less, 3750 g ai or less, 3700 g ai or less, 3600 g ai or less, 3500 g ai or less, 3450 g ai or less, 3400 g ai or less, 3350 g ai or less, 3300 g ai or less, 3250 g ai or less, 3200 g ai or less, 3150 g ai or less, 3100 g ai or less, 3050 g ai or less, 3000 g ai or less, 2900 g ai or less, 2800 g ai or less, 2750 g ai or less, 2700 g ai or less, 2600 g ai or less, 2500 g ai or less, 2450 g ai or less, 2400 g ai or less, 2350 g ai or less, 2300 g ai or less, 2250 g ai or less, 2240 g ai or less, 2200 g ai or less, 2150 g ai or less, 2100 g ai or less, 2050 g ai or less, 2000 g ai or less, 1900 g ai or less, 1800 g ai or less, 1750 g ai or less, 1700 g ai or less, 1600 g ai or less, 1500 g ai or less, 1450 g ai or less, 1400 g ai or less, 1350 g ai or less, 1300 g ai or less, 1250 g ai or less, 1240 g ai or less, 1200 g ai or less, 1150 g ai or less, 1100 g ai or less, 1050 g ai or less, 1000 g ai or less, 950 g ai or less, 900 g ai or less, 850 g ai or less, 800 g ai or less, 750 g ai or less, 700 g ai or less, 650 g ai or less, 600 g ai or less, 550 g ai or less, 500 g ai or less, 450 g ai or less, 400 g ai or less, 380 g ai or less, 360 g ai or less, 350 g ai or less, 340 g ai or less, 320 g ai or less, 300 g ai or less, 280 g ai or less, 260 g ai or less, 250 g ai or less, 240 g ai or less, 220 g ai or less, 200 g ai or less, 190 g ai or less, 180 g ai or less, 170 g ai or less, 160 g ai or less, 150 g ai or less, 140 g ai or less, 130 g ai or less, 120 g ai or less, 110 g ai or less, 100 g ai or less, 95 g ai or less, 90 g ai or less, 85 g ai or less, 80 g ai or less, 75 g ai or less, 70 g ai or less, 65 g ai or less, 60 g ai or less, 55 g ai or less, 50 g ai or less, 45 g ai or less, 40 g ai or less, 35 g ai or less, 30 g ai or less, 25 g ai or less, 20 g ai or less, 15 g ai or less, 10 g ai or less, 9 g ai or less, 8 g ai or less, 7 g ai or less, 6 g ai or less, 5 g ai or less, 4.5 g ai or less, 4 g ai or less, 3.5 g ai or less, 3 g ai or less, 2.5 g ai or less, 2 g ai or less, 1.5 g ai or less, or 1 g ai or less; or in an amount ranging from any of the minimum values described above to any of the maximum values described above, such as 1-4000 g ai, 1-2240 g ai, 1-150 g ai, 1.5-3150 g ai, 2-900 g ai, 2.5-3200 g ai, 3-1250 g ai, 5-260 g ai, 6-750 g ai, 7-2100 g ai, 10-2240 g ai, 20-3600 g ai, 40-3950 g ai, 50-400 g ai, 70-1250 g ai, 100-1400 g ai, or 250-1700 g ai.

A. Phenoxycarboxylic Acids

In some aspects, the composition contains (a) a pyridine carboxylate herbicide or an agriculturally acceptable N-oxide, salt, or ester thereof, and (b) 2,4-D, 2,4-DB2, clomeprop, dichlorprop, mecoprop, MCPA, MCPB, or agriculturally acceptable salts or esters thereof.

2,4-D

In some aspects, the synthetic auxin herbicide can comprise 2,4-D or an agriculturally acceptable salt or ester thereof. 2,4-D, shown below, is a phenoxycarboxylic acid herbicide that provides broad spectrum control of many annual, biannual and perennial broad-leaved weeds and aquatic broad-leaved weeds in cereals, maize, sorghum, grasslands, established turf, grass seed crops, orchards (pome fruit and stone fruit), cranberries, asparagus, sugar cane, rice, forestry, and on non-crop land (including areas adjacent to water). 2,4-D, as well as methods of preparing 2,4-D, are known in the art. Its herbicidal activity is described, for example, in *The Pesticide Manual*, Seventeenth Edition, 2016.

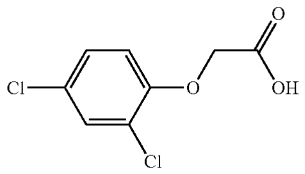 [SMILES: O=C(O)COc1ccc(Cl)cc1Cl]

In some aspects, 2,4-D can be provided as an agriculturally acceptable salt or ester of 2,4-D. Exemplary agriculturally acceptable salts and esters of 2,4-D include, but are not limited to, 2,4-D-ammonium 2,4-D-butotyl, 2,4-D-2-butoxypropyl, 2,4-D-3-butoxypropyl, 2,4-D-butyl, 2,4-D choline, 2,4-D-diethylammonium, 2,4-D-dimethylammonium (2,4-D DMA), 2,4-D-diolamine, 2,4-D-dodecylammonium, 2,4-D-ethyl, 2,4-D-2-ethylhexyl (2,4-D EHE), 2,4-D-heptylammonium, 2,4-D-isobutyl, 2,4-D-isoctyl, 2,4-D-isopropyl, 2,4-D-isopropylammonium, 2,4-D-lithium, 2,4-D-meptyl, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl)ammonium, 2,4-D-trolamine, and clacyfos. In some aspects, the 2,4-D can be provided as 2,4-D-2-ethylhexyl (2,4-D EHE), shown below.

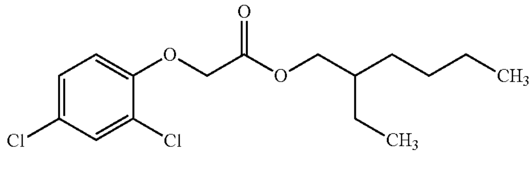

In some aspects, 2,4-D can be provided as 2,4-D DMA, shown below.

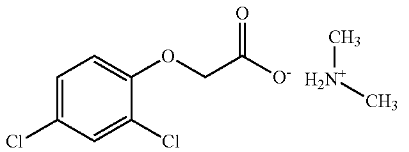

In some aspects, the 2,4-D can be provided as 2,4-D choline, shown below.

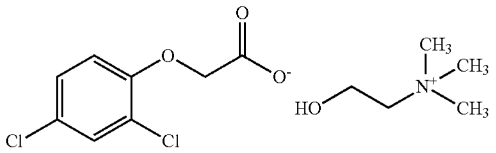

Exemplary uses of 2,4-D-choline include, but are not limited to, controlling annual and perennial broadleaf weeds, including, but not limited to, glyphosate-resistant broadleaf weeds. 2,4-D-Choline can be used in crops that have been made tolerant to 2,4-D, including, but not limited to, 2,4-D-tolerant soybeans, maize, and cotton. 2,4-D-Choline is generally, but is not required to be, applied post-emergent. 2,4-D-Choline can also be used for weed control in non-crop and perennial cropping systems.

2,4-D can be applied to vegetation or an area adjacent the vegetation or applied to soil or water to prevent the emergence or growth of vegetation in an amount sufficient to induce a herbicidal effect. In some aspects, 2,4-D is applied to vegetation or an area adjacent the vegetation or applied to soil or water to prevent the emergence or growth of vegetation in an amount of 1 gram active ingredient per hectare (g ai/ha) or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

2,4-DB

In some aspects, the synthetic auxin herbicide can comprise 2,4-DB is a phenoxycarboxylic acid herbicide that provides post-emergence control of many annual and perennial broadleaf weeds in alfalfa, clovers, cereals, grassland, forage, legumes, soybeans, and peanuts. 2,4-DB, as well as methods of making 2,4-DB, are known in the art. Its herbicidal activity is described in *The Pesticide Manual*, Seventeenth Edition, 2016.

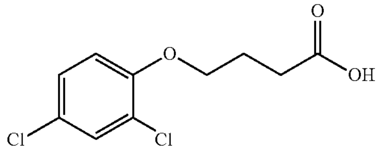 [SMILES: O=C(O)CCCOc1ccc(Cl)cc1Cl]

In some aspects, 2,4-DB can be provided as an agriculturally acceptable salt or ester of 2,4-DB. Exemplary agriculturally acceptable salts and esters of 2,4-DB include, but are not limited to, 2,4-DB-butyl, 2,4-DB-dimethylammonium (2,4-DB DMA), 2,4-DB-isoctyl, 2,4-DB-potassium, and 2,4-DB-sodium.

2,4-DB can be applied to vegetation or an area adjacent the vegetation or applied to soil or water to prevent the emergence or growth of vegetation in an amount sufficient to induce a herbicidal effect. In some aspects, 2,4-DB is applied to vegetation or an area adjacent the vegetation or applied to soil or water to prevent the emergence or growth of vegetation in an amount of 1 g ai/ha or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

Clomeprop

In some aspects, the synthetic auxin herbicide can comprise clomeprop or an agriculturally acceptable salt or ester thereof. Clomeprop, shown below, is a phenoxycarboxylic acid herbicide that provides pre- to early post-emergence control of broad-leaf and sedge weeds in paddy rice. Clomeprop, as well as methods of preparing clomeprop, are known in the art. Its herbicidal activity is described, for example, in *The Pesticide Manual*, Seventeenth Edition, 2016.

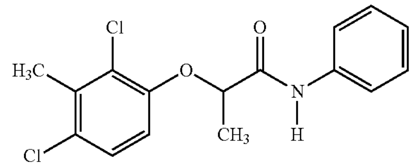 [SMILES: Cc1c(Cl)ccc(OC(C)C(=O)Nc2ccccc2)c1Cl]

Dichlorprop

In some aspects, the synthetic auxin herbicide can comprise dichlorprop or an agriculturally acceptable salt or ester thereof. Dichlorprop, shown below, is a phenoxycarboxylic herbicide that provides broad-spectrum control of annual and perennial broad-leaved weeds in cereals and grasslands; brush control in non-crop land; control of broad-leaved aquatic weeds; and maintenance of embankments and roadside verges. Dichlorprop, as well as methods of making dichlorprop, are known in the art. Its herbicidal activity is described, for example, in *The Pesticide Manual*, Seventeenth Edition, 2016.

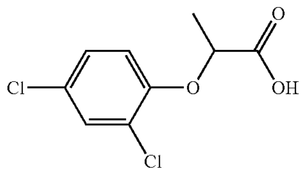

In some aspects, dichlorprop can be provided as an agriculturally acceptable salt or ester of dichlorprop. Exemplary agriculturally acceptable salts and esters of dichlorprop include, but are not limited to, dichlorprop-butotyl, dichlorprop-dimethylammonium, dichlorprop-ethylammonium, dichlorprop-2-ethylhexyl, dichlorprop-isoctyl, dichlorprop-methyl, dichlorprop-potassium, dichlorprop-sodium, dichlorprop-P, dichlorprop-P-dimethylammonium, dichlorprop-P-2-ethylhexyl, dichlorprop-P-potassium, and dichlorprop-P-sodium. In some aspects, the dichlorprop can be provided as the stereoisomer dichlorprop-P, shown below.

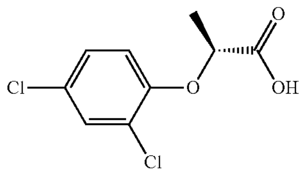

Dichlorprop can be applied to vegetation or an area adjacent the vegetation or applied to soil or water to prevent the emergence or growth of vegetation in an amount sufficient to induce a herbicidal effect. In some aspects, dichlorprop is applied to vegetation or an area adjacent the vegetation or applied to soil or water to prevent the emergence or growth of vegetation in an amount of 1 g ai/ha or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

Mecoprop

In some aspects, the synthetic auxin herbicide can comprise mecoprop or an agriculturally acceptable salt or ester thereof. Mecoprop, shown below, is a phenoxy carboxylic acid herbicide that provides broad-spectrum control of broad-leaved weeds in wheat, barley, oats, herbage seed crops, grassland, and under fruit trees and vines. Mecoprop also provides control of docks (*Rumex* spp.) in meadows and pastures. Mecoprop, as well as methods of making mecoprop, are known in the art. Its herbicidal activity is described in *The Pesticide Manual*, Seventeenth Edition, 2016.

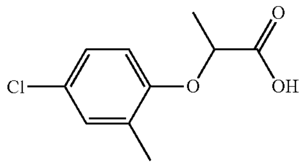

In some aspects, mecoprop can be provided as an agriculturally acceptable salt or ester of mecoprop. Exemplary agriculturally acceptable salts and esters of mecoprop include, but are not limited to, mecoprop-butotyl, mecoprop-potassium, mecoprop-sodium, mecoprop-dimethylammonium, mecoprop-diolamine, mecoprop-ethadyl, mecoprop-2-ethylhexyl, mecoprop-isoctyl, mecoprop-methyl, mecoprop-trolamine, mecoprop-P, mecoprop-P-butotyl, mecoprop-P-dimethylammonium, mecoprop-P-ethylhexyl, and mecoprop-P-potassium. In some aspects, the mecoprop can be provided as the stereoisomer mecoprop-P, shown below.

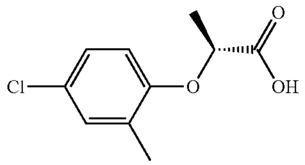

Mecoprop can be applied to vegetation or an area adjacent the vegetation or applied to soil or water to prevent the emergence or growth of vegetation in an amount sufficient to induce a herbicidal effect. In some aspects, mecoprop is applied to vegetation or an area adjacent the vegetation or applied to soil or water to prevent the emergence or growth of vegetation in an amount of 1 g ai/ha or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

MCPA

In some aspects, the synthetic auxin herbicide can comprise MCPA or an agriculturally acceptable salt or ester thereof. MCPA, shown below, is a phenoxycarboxylic acid herbicide that provides broad-spectrum control of many annual, biannual, and perennial broad-leaved weeds, woody weeds, and aquatic broad-leaved weeds in cereals, herbage seed crops, flax, rice, vines, peas, potatoes, asparagus, grassland, turf, under fruit trees, forestry, and on roadside verges and embankments. MCPA, as well as methods of preparing MCPA, are known in the art. Its herbicidal activity is described, for example, in *The Pesticide Manual*, Seventeenth Edition, 2016.

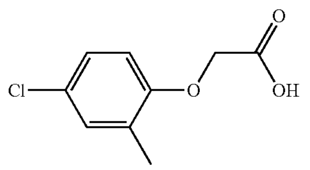

In some aspects, MCPA can be provided as an agriculturally acceptable salt or ester of MCPA. Exemplary agriculturally acceptable salts of MCPA include, but are not limited to, MCPA-butotyl, MCPA-butyl, MCPA-dimethyl ammonium (MCPA-DMA), MCPA-diolamine, MCPA-ethyl, MCPA-2-ethylhexyl (MCPA EHE), MCPA-isobutyl, MCPA-isoctyl, MCPA-isopropyl, MCPA-methyl, MCPA-olamine, MCPA-potassium, MCPA-sodium, MCPA-trolamine. In some aspects, the MCPA can be provided as MCPA-2-ethylhexyl (MCPA EHE), shown below.

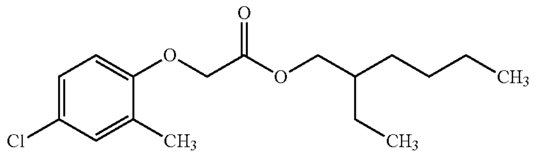 [SMILES: CCCCC(CC)COC(=O)COc1ccc(Cl)cc1C]

In some aspects, the MCPA can be provided as MCPA-dimethylammonium (MCPA-DMA), shown below.

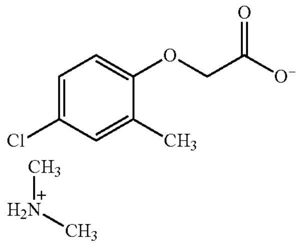

MCPA can be applied to vegetation or an area adjacent the vegetation or applied to soil or water to prevent the emergence or growth of vegetation in an amount sufficient to induce a herbicidal effect. In some aspects, MCPA is applied to vegetation or an area adjacent the vegetation or applied to soil or water to prevent the emergence or growth of vegetation in an amount of 1 g ai/ha or more such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

MCPB

In some aspects, the synthetic auxin herbicide can comprise MCPB or an agriculturally acceptable salt or ester thereof. MCPB, shown below, is a phenoxycarboxylic acid herbicide that provides broad-spectrum control of many broad-leaved weeds, woody weeds, and aquatic broad-leaved weeds in rice, cereals, clovers, sainfoin, peas, peanuts, grassland, turf, and forestry. MCPB, as well as methods of preparing MCPB, are known in the art. Its herbicidal activity is described, for example, in *The Pesticide Manual*, Seventeenth Edition, 2016.

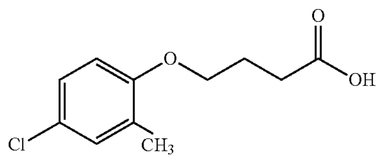

In some aspects, MCPB can be provided as an agriculturally acceptable salt or ester of MCPB. Exemplary agriculturally acceptable salts of MCPB include, but are not limited to, MCPB-ethyl, MCPB-potassium, and MCPB-sodium.

MCPB can be applied to vegetation or an area adjacent the vegetation or applied to soil or water to prevent the emergence or growth of vegetation in an amount sufficient to induce a herbicidal effect. In some aspects, MCPB is applied to vegetation or an area adjacent the vegetation or applied to soil or water to prevent the emergence or growth of vegetation in an amount of 1 g ai/ha or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2240 g ai/ha or more, 2250 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2250 g ai/ha or less, 2240 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-4000 g ai/ha, 1-150 g ai/ha, 2-3100 g ai/ha, 2-900 g ai/ha, 3-2600 g ai/ha, 3-1200 g ai/ha, 5-275 g ai/ha, 6-750 g ai/ha, 7-2100 g ai/ha, 10-2240 g ai/ha, 20-3300 g ai/ha, 40-3950 g ai/ha, 50-400 g ai/ha, 70-2400 g ai/ha, 100-950 g ai/ha, or 250-1700 g ai/ha.

B. Benzoic Acids

In some aspects, the composition contains (a) a pyridine carboxylate herbicide or an agriculturally acceptable N-oxide, salt, or ester thereof, and (b) chloramben, dicamba, TBA, or agriculturally acceptable salts or esters thereof.

Chloramben

In some aspects, the synthetic auxin herbicide can comprise chloramben or an agriculturally acceptable salt or ester thereof. Chloramben, shown below, is a benzoic acid herbicide that provides pre-planting and pre-emergence control of grasses and broad-leaved weeds in asparagus, navy beans, peanuts, maize, sweet potatoes, pumpkins, soybeans, squash, sunflowers, and certain ornamentals. Chloramben, as well as methods of preparing chloramben, are known in the art. Its herbicidal activity is described, for example, in *The Pesticide Manual*, Seventeenth Edition, 2016.

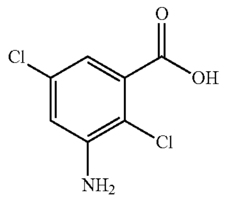 [SMILES: Nc1cc(Cl)cc(C(=O)O)c1Cl]

Dicamba

In some aspects, the synthetic auxin herbicide can comprise dicamba or an agriculturally acceptable salt or ester thereof. Dicamba, shown below, is a benzoic acid herbicide that provides broad-spectrum control of annual and perennial broad-leaved weeds and brush species in cereals, maize, sorghum, sugar cane, asparagus, perennial seed grasses, turf, pastures, rangeland, and non-crop land. Dicamba, as well as methods of making dicamba, are known in the art. Its herbicidal activity is described, for example, in *The Pesticide Manual*, Seventeenth Edition, 2016.

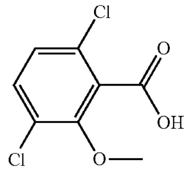

In some aspects, dicamba can be provided as an agriculturally acceptable salt or ester of dicamba. Exemplary agriculturally acceptable salts and esters of dicamba include, but are not limited to, dicamba-diglycolammonium, dicamba-dimethylammonium, dicamba-diolamine, dicamba-isopropylammonium, dicamba-methyl, dicamba-olamine, dicamba-potassium, dicamba-sodium, dicamba-trolamine, and cambendichlor.

In some aspects, dicamba can be provided as dicamba-diglycolammonium, shown below.

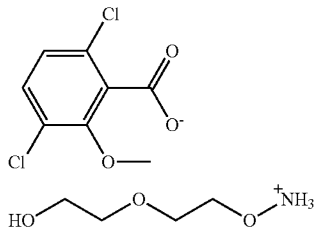

Dicamba can be applied to vegetation or an area adjacent the vegetation or applied to soil or water to prevent the emergence or growth of vegetation in an amount sufficient to induce a herbicidal effect. In some aspects, dicamba is applied to vegetation or an area adjacent the vegetation or applied to soil or water to prevent the emergence or growth of vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 310 g ai/ha or more, 320 g ai/ha or more, 325 g ai/ha or more, 330 g ai/ha or more, 340 g ai/ha or more, 350 g ai/ha or more, 360 g ai/ha or more, 370 g ai/ha or more, 375 g ai/ha or more, 380 g ai/ha or more, 390 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 560 g ai/ha or more, 570 g ai/ha or more, 575 g ai/ha or more, 580 g ai/ha or more, 590 g ai/ha or more, or 600 g ai/ha or more; in an amount of 600 g ai/ha or less such as 590 g ai/ha or less, 580 g ai/ha or less, 575 g ai/ha or less, 570 g ai/ha or less, 560 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 390 g ai/ha or less, 380 g ai/ha or less, 375 g ai/ha or less, 370 g ai/ha or less, 360 g ai/ha or less, 350 g ai/ha or less, 340 g ai/ha or less, 330 g ai/ha or less, 325 g ai/ha or less, 320 g ai/ha or less, 310 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, or 55 g ai/ha or less; or in an amount ranging from any of the minimum values described above to any of the maximum values described above, such as 50-600 g ai/ha, 55-150 g ai/ha, 60-310 g ai/ha, 65-190 g ai/ha, 80-560 g ai/ha, 85-300 g ai/ha, 100-275 g ai/ha, 120-475 g ai/ha, 140-390 g ai/ha, 150-250 g ai/ha, or 250-400 g ai/ha.

2,3,6-TBA

In some aspects, the synthetic auxin herbicide can comprise 2,3,6-TBA or an agriculturally acceptable salt or ester thereof. 2,3,6-TBA, shown below, is a benzoic acid herbicide

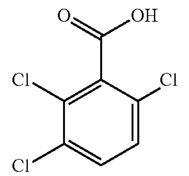 [SMILES: O=C(O)c1c(Cl)ccc(Cl)c1Cl]

that provides post-emergence control of certain broad-leaved annual and perennial weeds in cereals and grass seed crops. 2,3,6-TBA, as well as methods of preparing 2,3,6-

TBA, are known in the art. Its herbicidal activity is described, for example, in *The Pesticide Manual*, Seventeenth Edition, 2016.

C. Aryl Picolinates

In some aspects, the composition contains (a) a pyridine carboxylate herbicide or an agriculturally acceptable N-oxide, salt, or ester thereof, and (b) florpyrauxifen, halauxifen, or agriculturally acceptable salts or esters thereof.

Florpyrauxifen

In some aspects, the synthetic auxin herbicide can comprise florpyrauxifen or an agriculturally acceptable salt or ester thereof. Florpyrauxifen is aryl picolinic acid that has been described in U.S. Pat. No. 7,314,849 B2. Exemplary uses of florpyrauxifen include controlling undesirable vegetation, including grass, broadleaf and sedge weeds, in multiple non-crop and cropping situations.

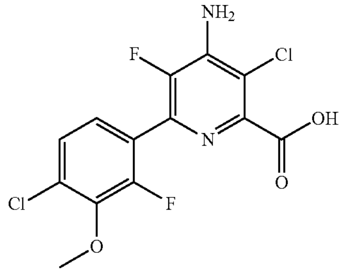 [SMILES: COc1c(Cl)ccc(-c2nc(C(=O)O)c(Cl)c(N)c2F)c1F]

In some aspects, florpyrauxifen can be provided as an agriculturally acceptable salt or ester of florpyrauxifen. Exemplary agriculturally acceptable salts and esters of florpyrauxifen include, but are not limited to, florpyrauxifen-benzyl, shown below.

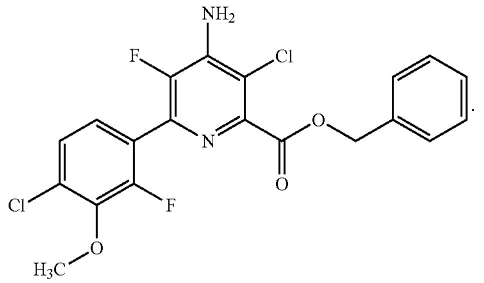 [SMILES: COc1c(Cl)ccc(-c2nc(C(=O)OCc3ccccc3)c(Cl)c(N)c2F)c1F]

Florpyrauxifen can be applied to vegetation or an area adjacent the vegetation or applied to soil or water to prevent the emergence or growth of vegetation in an amount sufficient to induce a herbicidal effect. In some aspects, florpyrauxifen is applied to vegetation or an area adjacent the vegetation or applied to soil or water to prevent the emergence or growth of vegetation in an amount of 1 g ai/ha or more, such as 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 142.5 g ai/ha or more, 145 g ai/ha or more, 147.5 g ai/ha or more, or 149 g ai/ha or more; in an amount of 150 g ai/ha or less, such as 149 g ai/ha or less, 147.5 g ai/ha or less, 145 g ai/ha or less, 142.5 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount ranging from any of the minimum values described above to any of the maximum values described above, such as 1-150 g ai/ha, 2-130 g ai/ha, 2-45 g ai/ha, 3-70 g ai/ha, 4-147.5 g ai/ha, 5-100 g ai/ha, 6-75 g ai/ha, 7-50 g ai/ha, 10-149 g ai/ha, 20-120 g ai/ha, 25-90 g ai/ha, 30-60 g ai/ha, 50-150 g ai/ha, 60-130 g ai/ha, or 100-145 g ai/ha.

Halauxifen

In some aspects, the synthetic auxin herbicide can comprise halauxifen or an agriculturally acceptable salt or ester thereof. Halauxifen, shown below, is a aryl picolinic acid herbicide that provides broad-spectrum control of broadleaved weeds in cereal crops.

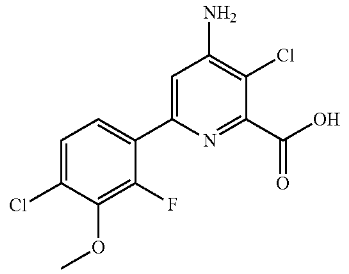 [SMILES: COc1c(Cl)ccc(-c2cc(N)c(Cl)c(C(=O)O)n2)c1F]

In some aspects, halauxifen can be provided as an agriculturally acceptable salt or ester of halauxifen. Exemplary agriculturally acceptable salts and esters of halauxifen include, but are not limited to, halauxifen-methyl. In some aspects, the halauxifen is provided as halauxifen-methyl, shown below.

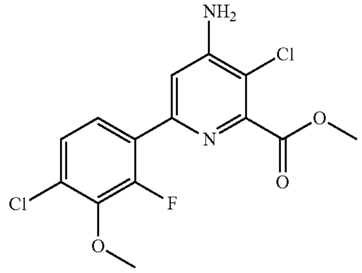 [SMILES: COC(=O)c1nc(-c2ccc(Cl)c(OC)c2F)cc(N)c1Cl]

Halauxifen can be applied to vegetation or an area adjacent the vegetation or applied to soil or water to prevent the emergence or growth of vegetation in an amount sufficient to induce a herbicidal effect. In some aspects, halauxifen is applied to vegetation or an area adjacent the vegetation or applied to soil or water to prevent the emergence or growth of vegetation in an amount of 1 g ai/ha or more, such as 2 g ai/ha or more, 2.5 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 142.5 g ai/ha or more, 145 g ai/ha or more, 147.5 g ai/ha or more, or 149 g ai/ha or more; in an amount of 150 g ai/ha or less, such as 149 g ai/ha or less, 147.5 g ai/ha or less, 145 g ai/ha or less, 142.5 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2.5 g ai/ha or less, or 2 g ai/ha or less; or in an amount ranging from any of the minimum values described above to any of the maximum values described above, such as 1-150 g ai/ha, 2-130 g ai/ha, 2.5-45 g ai/ha, 3-70 g ai/ha, 4-147.5 g ai/ha, 5-100 g ai/ha, 6-75 g ai/ha, 7-50 g ai/ha, 10-149 g ai/ha, 20-120 g ai/ha, 25-90 g ai/ha, 30-60 g ai/ha, 50-150 g ai/ha, 60-130 g ai/ha, or 100-145 g ai/ha.

D. Pyridine Carboxylates

In some aspects, the composition contains (a) a pyridine carboxylate herbicide or an agriculturally acceptable N-oxide, salt, or ester thereof, and (b) aminopyralid, clopyralid, fluroxypyr, picloram, triclopyr, or agriculturally acceptable salts or esters thereof.

Aminopyralid

In some aspects, the synthetic auxin herbicide can comprise aminopyralid or an agriculturally acceptable salt or ester thereof. Aminopyralid is a pyridine carboxylate herbicide that provides pre- and post-emergence control of certain annual and perennial broadleaf weeds in grasslands. Aminopyralid, as well as methods of making aminopyralid, are known in the art. Its herbicidal activity is described in *The Pesticide Manual*, Seventeenth Edition, 2016.

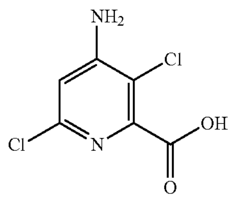 [SMILES: Nc1cc(Cl)nc(C(=O)O)c1Cl]

In some aspects, aminopyralid can be provided as an agriculturally acceptable salt or ester of aminopyralid. Exemplary agriculturally acceptable salts and esters of aminopyralid include, but are not limited to, for example, aminopyralid-triisopropanolammonium (TWA), shown below.

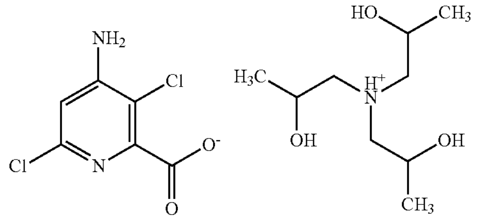

Aminopyralid can be applied to vegetation or an area adjacent the vegetation or applied to soil or water to prevent the emergence or growth of vegetation in an amount sufficient to induce a herbicidal effect. In some aspects, aminopyralid is applied to vegetation or an area adjacent the vegetation or applied to soil or water to prevent the emergence or growth of vegetation in an amount of 1 g ai/ha or more, such as 2 g ai/ha or more, 2.5 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 142.5 g ai/ha or more, 145 g ai/ha or more, 147.5 g ai/ha or more, or 149 g ai/ha or more; in an amount of 150 g ai/ha or less, such as 149 g ai/ha or less, 147.5 g ai/ha or less, 145 g ai/ha or less, 142.5 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2.5 g ai/ha or less, or 2 g ai/ha or less; or in an amount ranging from any of the minimum values described above to any of the maximum values described above, such as 1-150 g ai/ha, 2-130 g ai/ha, 2.5-45 g ai/ha, 3-70 g ai/ha, 4-147.5 g ai/ha, 5-100 g ai/ha, 6-75 g ai/ha, 7-50 g ai/ha, 10-149 g ai/ha, 20-120 g ai/ha, 25-90 g ai/ha, 30-60 g ai/ha, 50-150 g ai/ha, 60-130 g ai/ha, or 100-145 g ai/ha.

Clopyralid

In some aspects, the synthetic auxin herbicide can comprise clopyralid or an agriculturally acceptable salt or ester thereof. Clopyralid, shown below, is a pyridine carboxylate herbicide that provides post-emergence control of many annual and perennial broad-leaved weeds in sugar beet, fodder beet, oilseed rape, maize, cereals, brassicas, onions, leeks, strawberries, flax, grassland, and non-crop lands. Clopyralid, as well as methods of making clopyralid, are known in the art. Its herbicidal activity is described, for example, in *The Pesticide Manual*, Seventeenth Edition, 2016.

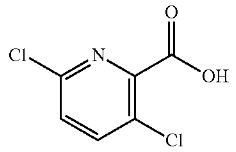 [SMILES: O=C(O)c1nc(Cl)ccc1Cl]

In some aspects, clopyralid can be provided as an agriculturally acceptable salt or ester of clopyralid. Exemplary agriculturally acceptable salts and esters of clopyralid include, but are not limited to, clopyralid-methyl, clopyralid-potassium, clopyralid-tris(2-hydroxypropyl)ammonium, and clopyralid-olamine, shown below.

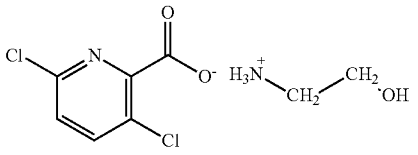

Clopyralid can be applied to vegetation or an area adjacent the vegetation or applied to soil or water to prevent the emergence or growth of vegetation in an amount sufficient to induce a herbicidal effect. In some aspects, clopyralid is applied to vegetation or an area adjacent the vegetation or applied to soil or water to prevent the emergence or growth of vegetation in an amount of 25 g ai/ha or more, such as 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 310 g ai/ha or more, 320 g ai/ha or more, 325 g ai/ha or more, 330 g ai/ha or more, 340 g ai/ha or more, 350 g ai/ha or more, 360 g ai/ha or more, 370 g ai/ha or more, 375 g ai/ha or more, 380 g ai/ha or more, or 390 g ai/ha or more; in an amount of 400 g ai/ha or less, such as 390 g ai/ha or less, 380 g ai/ha or less, 375 g ai/ha or less, 370 g ai/ha or less, 360 g ai/ha or less, 350 g ai/ha or less, 340 g ai/ha or less, 330 g ai/ha or less, 325 g ai/ha or less, 320 g ai/ha or less, 310 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, or 55 g ai/ha or less, 50 g ai/ha or less, 45 g ai/ha or less, 40 g ai/ha or less, 35 g ai/ha or less, or 30 g ai/ha or less; or in an amount ranging from any of the minimum values described above to any of the maximum values described above, such as 25-400 g ai/ha, 55-150 g ai/ha, 60-310 g ai/ha, 65-190 g ai/ha, 80-260 g ai/ha, 85-300 g ai/ha, 100-275 g ai/ha, 120-330 g ai/ha, 140-390 g ai/ha, 150-250 g ai/ha, or 30-400 g ai/ha.

Fluroxypyr

In some aspects, the synthetic auxin herbicide can comprise fluroxypyr or an agriculturally acceptable salt or ester thereof. Fluroxypyr, shown below, is a pyridine carboxylate herbicide that provides post-emergence control against certain broad-leaved weeds in small grain crops, pastures, grasslands, orchards, plantation crops, maize, and forestry. Fluroxypyr, as well as methods of making fluroxypyr, are known in the art. Its herbicidal activity is described, for example, in *The Pesticide Manual*, Seventeenth Edition, 2016.

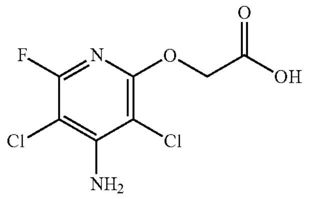 [SMILES: Nc1c(Cl)c(F)nc(OCC(=O)O)c1Cl]

In some aspects, fluroxypyr can be provided as an agriculturally acceptable salt or ester of fluroxypyr. Exemplary agriculturally acceptable salts and esters of fluroxypyr include, but are not limited to, fluroxypyr-2-butoxy-1-methylethyl (fluroxypyr-butometyl) and fluroxypyr-meptyl (fluroxypyr-MHE). In some aspects, the fluroxypyr can be provided as fluroxypyr-meptyl (fluroxypyr-MHE), shown below.

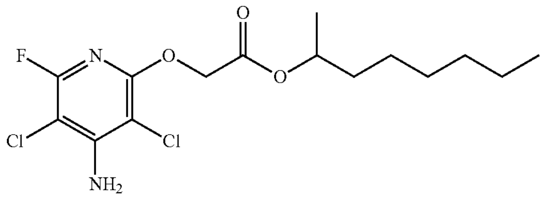 [SMILES: CCCCCCC(C)OC(=O)COc1nc(F)c(Cl)c(N)c1Cl]

Fluroxypyr can be applied to vegetation or an area adjacent the vegetation or applied to soil or water to prevent the emergence or growth of vegetation in an amount sufficient to induce a herbicidal effect. In some aspects, fluroxypyr is applied to vegetation or an area adjacent the vegetation or applied to soil or water to prevent the emergence or growth of vegetation in an amount of 35 g ai/ha or more, such as 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 310 g ai/ha or more, 320 g ai/ha or more, 325 g ai/ha or more, 330 g ai/ha or more, 340 g ai/ha or more, 350 g ai/ha or more, 360 g ai/ha or more, 370 g ai/ha or more, 375 g ai/ha or more, 380 g ai/ha or more, or 390 g ai/ha or more; in an amount of 400 g ai/ha or less, such as 390 g ai/ha or less, 380 g ai/ha or less, 375 g ai/ha or less, 370 g ai/ha or less, 360 g ai/ha or less, 350 g ai/ha or less, 340 g ai/ha or less, 330 g ai/ha or less, 325 g ai/ha or less, 320 g ai/ha or less, 310 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, or 35 g ai/ha or less; or in an amount ranging from any of the minimum values described above to any of the maximum values described above, such as 35-400 g ai/ha, 55-150 g ai/ha, 60-310 g ai/ha, 45-190 g ai/ha, 80-260 g ai/ha, 85-300 g ai/ha, 100-275 g ai/ha, 120-330 g ai/ha, 140-390 g ai/ha, 150-250 g ai/ha, or 250-400 g ai/ha.

Picloram

In some aspects, the synthetic auxin herbicide can comprise picloram or an agriculturally acceptable salt or ester thereof. Picloram is a pyridine carboxylate herbicide that provides management of unwanted vegetation in rangeland, grass pastures, forestry, as well as non-crop land and right-of-way sites. Picloram, as well as methods of making picloram, is known in the art. Its herbicidal activity is described in *The Pesticide Manual*, Seventeenth Edition, 2016.

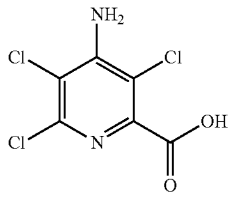 [SMILES: Nc1c(Cl)c(Cl)nc(C(=O)O)c1Cl]

In some aspects, picloram can be provided as an agriculturally acceptable salt or ester of picloram. Exemplary agriculturally acceptable salts and esters of picloram include, but are not limited to, picloram-dimethylammonium, picloram-isoctyl, picloram-potassium, picloram-triethylammonium, picloram-triisopropanolammonium (TWA), picloram-triisopropylammonium, and picloram-trolamine (triethanolammonium). In some aspects, the picloram can be provided as picloram-potassium, shown below.

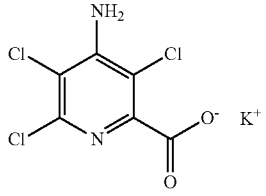 [SMILES: Nc1c(Cl)c(Cl)nc(C(=O)[O-])c1Cl ; [K+]]

In some aspects, the picloram can be provided as picloram-TIPA, shown below.

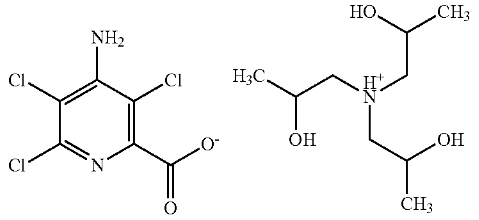

Picloram can be applied to vegetation or an area adjacent the vegetation or applied to soil or water to prevent the emergence or growth of vegetation in an amount sufficient to induce a herbicidal effect. In some aspects, picloram is applied to vegetation or an area adjacent the vegetation or applied to soil or water to prevent the emergence or growth of vegetation in an amount of 10 g ai/ha or more, such as 12 g ai/ha or more, 14 g ai/ha or more, 15 g ai/ha or more, 16 g ai/ha or more, 18 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, or 2220 g ai/ha or more; in an amount of 22400 g ai/ha or less, such as 2220 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 18 g ai/ha or less, 16 g ai/ha or less, 15 g ai/ha or less, 14 g ai/ha or less, or 12 g ai/ha or less; or in an amount ranging from any of the minimum values described above to any of the maximum values described above, such as 10-2240 g ai/ha, 12-1500 g ai/ha, 14-2100 g ai/ha, 15-900 g ai/ha, 18-1600 g ai/ha, 30-1200 g ai/ha, 50-275 g ai/ha, 70-1000 g ai/ha, 100-2220 g ai/ha, 250-1300 g ai/ha, 450-2000 g ai/ha, or 500-1900 g ai/ha.

Triclopyr

In some aspects, the synthetic auxin herbicide can comprise triclopyr or an agriculturally acceptable salt or ester thereof. Triclopyr is a pyridine carboxylate herbicide that provides control of woody plants and broadleaf weed species in grassland, rangeland, industrial areas, coniferous forests, rice, and plantation crops. Triclopyr, as well as methods of making triclopyr, are known in the art. Its herbicidal activity is described in *The Pesticide Manual*, Seventeenth Edition, 2016.

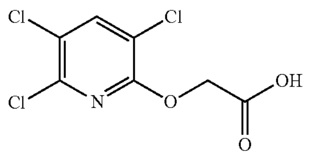 [SMILES: O=C(O)COc1nc(Cl)c(Cl)cc1Cl]

In some aspects, triclopyr can be provided as an agriculturally acceptable salt or ester of triclopyr. Exemplary agriculturally acceptable salts and esters of triclopyr include, but are not limited to, for example, triclopyr-triethylammonium (TEA), triclopyr choline, and triclopyr-butotyl (butoxyethyl or BEE). In some aspects, the triclopyr can be provided as triclopyr-triethylammonium (TEA), shown below.

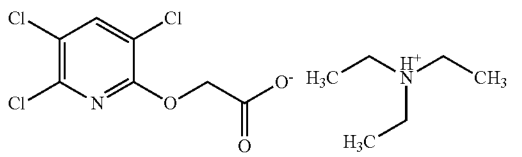

In some aspects, the triclopyr can be provided as triclopyr-choline, shown below.

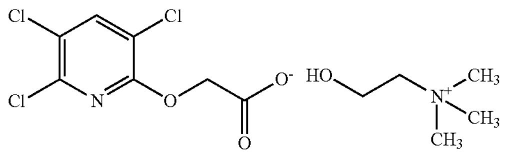

In some aspects, the triclopyr can be provided as triclopyr-BEE, shown below.

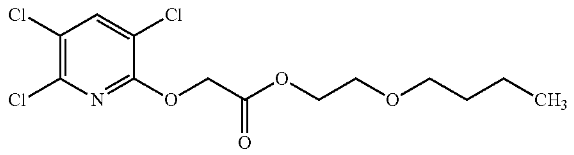 [SMILES: CCCCOCCOC(=O)COc1nc(Cl)c(Cl)cc1Cl]

Triclopyr can be applied to vegetation or an area adjacent the vegetation or applied to soil or water to prevent the emergence or growth of vegetation in an amount sufficient to induce a herbicidal effect. In some aspects, triclopyr is applied to vegetation or an area adjacent the vegetation or applied to soil or water to prevent the emergence or growth of vegetation in an amount of 10 g ai/ha or more, such as 12 g ai/ha or more, 14 g ai/ha or more, 15 g ai/ha or more, 16 g ai/ha or more, 18 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, or 2220 g ai/ha or more; in an amount of 22400 g ai/ha or less, such as 2220 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 18 g ai/ha or less, 16 g ai/ha or less, 15 g ai/ha or less, 14 g ai/ha or less, or 12 g ai/ha or less; or in an amount ranging from any of the minimum values described above to any of the maximum values described above, such as 10-2240 g ai/ha, 12-1500 g ai/ha, 14-2100 g ai/ha, 15-900 g ai/ha, 18-1600 g ai/ha, 30-1200 g ai/ha, 50-275 g ai/ha, 70-1000 g ai/ha, 100-2220 g ai/ha, 250-1300 g ai/ha, 450-2000 g ai/ha, or 500-1900 g ai/ha.

E. Quinoline Carboxylic Acids

In some aspects, the composition contains (a) a pyridine carboxylate herbicide or an agriculturally acceptable N-oxide, salt, or ester thereof, and (b) quinclorac, quinmerac, or agriculturally acceptable salts or esters thereof.

Quinclorac

In some aspects, the synthetic auxin herbicide can comprise quinclorac or an agriculturally acceptable salt or ester thereof. Quinclorac, shown below, is a quinoline carboxylic acid herbicide that provides pre- and post-emergence control of certain grass weeds and other weeds in direct-seeded and transplanted rice. Quinclorac, as well as methods of making quinclorac, are known in the art. Its herbicidal activity is described in *The Pesticide Manual*, Seventeenth Edition, 2016.

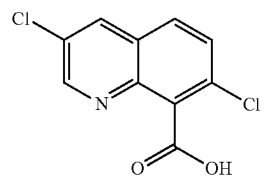 [SMILES: O=C(O)c1c(Cl)ccc2cc(Cl)cnc12]

In some aspects, quinclorac can be provided as an agriculturally acceptable salt or ester of quinclorac. Exemplary agriculturally acceptable salts and esters of quinclorac include, but are not limited to, quinclorac-dimethylammonium.

Quinclorac can be applied to vegetation or an area adjacent the vegetation or applied to soil or water to prevent the emergence or growth of vegetation in an amount sufficient to induce a herbicidal effect. In some aspects, quinclorac is applied to vegetation or an area adjacent the vegetation or applied to soil or water to prevent the emergence or growth of vegetation in an amount of 10 g ai/ha or more, such as 12 g ai/ha or more, 14 g ai/ha or more, 15 g ai/ha or more, 16 g ai/ha or more, 18 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, or 2220 g ai/ha or more; in an amount of 22400 g ai/ha or less, such as 2220 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 18 g ai/ha or less, 16 g ai/ha or less, 15 g ai/ha or less, 14 g ai/ha or less, or 12 g ai/ha or less; or in an amount ranging from any of the minimum values described above to any of the maximum values described above, such as 10-2240 g ai/ha, 12-1500 g ai/ha, 14-2100 g ai/ha, 15-900 g ai/ha, 18-1600 g ai/ha, 30-1200 g ai/ha, 50-275 g ai/ha, 70-1000 g ai/ha, 100-2220 g ai/ha, 250-1300 g ai/ha, 450-2000 g ai/ha, or 500-1900 g ai/ha.

Quinmerac

In some aspects, the synthetic auxin herbicide can comprise quinmerac or an agriculturally acceptable salt or ester thereof. Quinmerac, shown below, is a quinoline carboxylic acid herbicide that provides control of certain broad-leaved weeds in cereals, oilseed rape, and sugar beets. Quinmerac, as well as methods of making quinmerac, are known in the art. Its herbicidal activity is described in *The Pesticide Manual*, Seventeenth Edition, 2016.

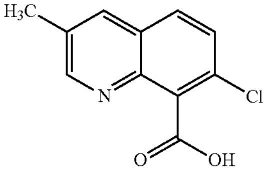

Quinmerac can be applied to vegetation or an area adjacent the vegetation or applied to soil or water to prevent the emergence or growth of vegetation in an amount sufficient to induce a herbicidal effect. In some aspects, quinmerac is applied to vegetation or an area adjacent the vegetation or applied to soil or water to prevent the emergence or growth of vegetation in an amount of 10 g ai/ha or more, such as 12 g ai/ha or more, 14 g ai/ha or more, 15 g ai/ha or more, 16 g ai/ha or more, 18 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, or 2220 g ai/ha or more; in an amount of 22400 g ai/ha or less, such as 2220 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 75 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 18 g ai/ha or less, 16 g ai/ha or less, 15 g ai/ha or less, 14 g ai/ha or less, or 12 g ai/ha or less; or in an amount ranging from any of the minimum values described above to any of the maximum values described above, such as 10-2240 g ai/ha, 12-1500 g ai/ha, 14-2100 g ai/ha, 15-900 g ai/ha, 18-1600 g ai/ha, 30-1200 g ai/ha, 50-275 g ai/ha, 70-1000 g ai/ha, 100-2220 g ai/ha, 250-1300 g ai/ha, 450-2000 g ai/ha, or 500-1900 g ai/ha.

F. Other Synthetic Auxin Herbicides

In some aspects, the composition contains (a) a pyridine carboxylate herbicide or an agriculturally acceptable N-oxide, salt, or ester thereof, and (b) aminocyclopyrachlor, benazolin, or agriculturally acceptable salts or esters thereof.

Aminocyclopyrachlor

In some aspects, the synthetic auxin herbicide can comprise aminocyclopyrachlor or an agriculturally acceptable salt or ester thereof. Aminocyclopyrachlor, shown below, is a pyrimidine carboxylic acid herbicide that provides control of certain broadleaf weeds and woody species, e.g., in rights-of-way, industrial sites, rangeland, permanent grass pastures and natural areas. Aminocyclopyrachlor, as well as methods of making aminocyclopyrachlor, are known in the art. Its herbicidal activity is described in *The Pesticide Manual*, Seventeenth Edition, 2016.

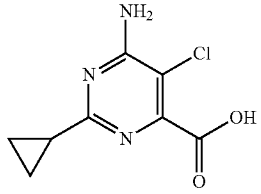 [SMILES: Nc1nc(C2CC2)nc(C(=O)O)c1Cl]

In some aspects, aminocyclopyrachlor can be provided as an agriculturally acceptable salt or ester of aminocyclopyrachlor. Exemplary agriculturally acceptable salts and esters of aminocyclopyrachlor include, but are not limited to, aminocyclopyrachlor-potassium and aminocyclopyrachlor-methyl.

Aminocyclopyrachlor can be applied to vegetation or an area adjacent the vegetation or applied to soil or water to prevent the emergence or growth of vegetation in an amount sufficient to induce a herbicidal effect. In some aspects, aminocyclopyrachlor is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 310 g ai/ha or more, 320 g ai/ha or more, 325 g ai/ha or more, 330 g ai/ha or more, 340 g ai/ha or more, 350 g ai/ha or more, 360 g ai/ha or more, 370 g ai/ha or more, 375 g ai/ha or more, 380 g ai/ha or more, or 390 g ai/ha or more; in an amount of 400 g ai/ha or less, such as 390 g ai/ha or less, 380 g ai/ha or less, 375 g ai/ha or less, 370 g ai/ha or less, 360 g ai/ha or less, 350 g ai/ha or less, 340 g ai/ha or less, 330 g ai/ha or less, 325 g ai/ha or less, 320 g ai/ha or less, 310 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, or 25 g ai/ha or less; or in an amount ranging from any of the minimum values described above to any of the maximum values described above, such as 20-400 g ai/ha, 55-150 g ai/ha, 40-310 g ai/ha, 65-190 g ai/ha, 80-260 g ai/ha, 85-300 g ai/ha, 100-275 g ai/ha, 120-330 g ai/ha, 140-390 g ai/ha, 150-250 g ai/ha, or 25-400 g ai/ha.

Benazolin

In some aspects, the synthetic auxin herbicide can comprise benazolin or an agriculturally acceptable salt or ester thereof. Benazolin, shown below, is a benzothiazole herbicide that provides post-emergence control of certain annual broad-leaved weeds in cereals, oilseed rape, grassland, clover, alfalfa, and flax. Benazolin, as well as methods of making benazolin, are known in the art. Its herbicidal activity is described in *The Pesticide Manual*, Seventeenth Edition, 2016.

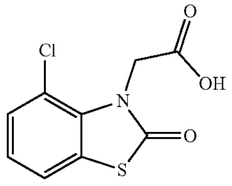 [SMILES: O=C(O)Cn1c(=O)sc2cccc(Cl)c21]

In some aspects, benazolin can be provided as an agriculturally acceptable salt or ester of benazolin. Exemplary agriculturally acceptable salts and esters of benazolin include, but are not limited to, benazolin-ethyl.

IV. Auxin Transport Inhibitors

In addition the pyridine carboxylic acid herbicide or agriculturally acceptable N-oxide, salt or ester thereof, the compositions can include an auxin transport inhibitor. Auxin transport inhibitors inhibit polar transport of naturally occurring auxin, indole acetic acid (IAA), and synthetic auxin-mimicking herbicides in sensitive plants. Examples of auxin transport inhibitors include phthalamate herbicides, semicarbazone herbicides and others.

In some aspects, the composition can include an auxin transport inhibitor selected from the group consisting of: chlorflurenol; diflufenzopyr; naptalam; 2,3,5-triiodobenzoic acid (2,3,5-TIBA); agriculturally acceptable salts and esters thereof; and combinations thereof.

Chlorflurenol

In some aspects, the auxin transport inhibitor can comprise chlorflurenol or an agriculturally acceptable salt or ester thereof. Chlorflurenol, shown below, is a herbicide that is a

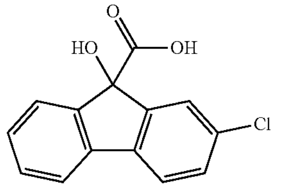 [SMILES: O=C(O)C1(O)c2ccccc2-c2ccc(Cl)cc21]

growth retardant and weed suppressant in amenity grass, roadsides, railways, ditch banks, etc. Chlorflurenol, as well as methods of preparing chlorflurenol, are known in the art. Its herbicidal activity is described, for example, in *The Pesticide Manual*, Seventeenth Edition, 2016.

Chlorflurenol can be applied to vegetation or an area adjacent the vegetation or applied to soil or water to prevent the emergence or growth of vegetation in an amount sufficient to induce a herbicidal effect. In some aspects, chlorflurenol is applied to vegetation or an area adjacent the vegetation or applied to soil or water to prevent the emergence or growth of vegetation in an amount of 100 g ai/ha or greater, such as 110 g ai/ha or greater, 120 g ai/ha or greater, 130 g ai/ha or greater, 140 g ai/ha or greater, 150 g ai/ha or greater, 160 g ai/ha or greater, 170 g ai/ha or greater, 180 g ai/ha or greater, 190 g ai/ha or greater, 200 g ai/ha or greater, 220 g ai/ha or greater, 240 g ai/ha or greater, 250 g ai/ha or greater, 260 g ai/ha or greater, 280 g ai/ha or greater, 300 g ai/ha or greater, 320 g ai/ha or greater, 340 g ai/ha or greater, 350 g ai/ha or greater, 360 g ai/ha or greater, 380 g ai/ha or greater, 400 g ai/ha or greater, 420 g ai/ha or greater, 440 g ai/ha or greater, 460 g ai/ha or greater, 480 g ai/ha or greater, 500 g ai/ha or greater, 525 g ai/ha or greater, 550 g ai/ha or greater, 575 g ai/ha or greater, 600 g ai/ha or greater, 625 g ai/ha or greater, 650 g ai/ha or greater, 675 g ai/ha or greater, 700 g ai/ha or greater, 725 g ai/ha or greater, 750 g ai/ha or greater, 775 g ai/ha or greater, 800 g ai/ha or greater, 825 g ai/ha or greater, 850 g ai/ha or greater, 875 g ai/ha or greater, 900 g ai/ha or greater, 925 g ai/ha or greater, 950 g ai/ha or greater, 975 g ai/ha or greater, 1000 g ai/ha or greater, 1100 g ai/ha or greater, 1200 g ai/ha or greater, 1300 g ai/ha or greater, 1400 g ai/ha or greater, 1500 g ai/ha or greater, 1600 g ai/ha or greater, 1700 g ai/ha or greater, 1800 g ai/ha or greater, 1900 g ai/ha or greater, 2000 g ai/ha or greater, 2200 g ai/ha or greater, 2400 g ai/ha or greater, 2600 g ai/ha or greater, 2800 g ai/ha or greater, 3000 g ai/ha or greater, 3200 g ai/ha or greater, 3400 g ai/ha or greater, 3600 g ai/ha or greater, 3800 g ai/ha or greater, 3850 g ai/ha or greater, 3900 g ai/ha or greater, or 3950 g ai/ha or greater; in an amount of 4000 g ai/ha or less, such as 3950 g ai/ha or less, 3900 g ai/ha or less, 3850 g ai/ha or less, 3800 g ai/ha or less, 3600 g ai/ha or less, 3400 g ai/ha or less, 3200 g ai/ha or less, 3000 g ai/ha or less, 2800 g ai/ha or less, 2600 g ai/ha or less, 2400 g ai/ha or less, 2200 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 480 g ai/ha or less, 460 g ai/ha or less, 440 g ai/ha or less, 420 g ai/ha or less, 400 g ai/ha or less, 380 g ai/ha or less, 360 g ai/ha or less, 350 g ai/ha or less, 340 g ai/ha or less, 320 g ai/ha or less, 300 g ai/ha or less, 280 g ai/ha or less, 260 g ai/ha or less, 250 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, or 110 g ai/ha or less; or in an amount ranging from any of the minimum values described above to any of the maximum values described above, such as from 100-4000 g ai/ha, from 130-750 g ai/ha, from 320-2000 g ai/ha, from 240-1500 g ai/ha, from 450-650 g ai/ha, from 120-600 g ai/ha, from 140-3300 g ai/ha, from 300-4500 g ai/ha, from 1400-3400 g ai/ha, from 750-2900 g ai/ha, or from 110-3950 g ai/ha.

Diflufenzopyr

In some aspects, the auxin transport inhibitor can comprise diflufenzopyr or an agriculturally acceptable salt or ester thereof. Diflufenzopyr, shown below, is a semicarbazone herbicide that provides post-emergence control of annual and perennial broad-leaved weeds in maize, pastures, rangeland, and non-crop areas. Diflufenzopyr, as well as methods of preparing diflufenzopyr, are known in the art. Its herbicidal activity is described, for example, in *The Pesticide Manual*, Seventeenth Edition, 2016. Exemplary forms of diflufenzopyr include its sodium salt.

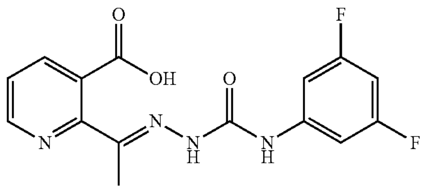 [SMILES: C/C(=N\NC(=O)Nc1cc(F)cc(F)c1)c1ncccc1C(=O)O]

Diflufenzopyr can be applied to vegetation or an area adjacent the vegetation or applied to soil or water to prevent the emergence or growth of vegetation in an amount sufficient to induce a herbicidal effect. In some aspects, diflufenzopyr is applied to vegetation or an area adjacent the vegetation or applied to soil or water to prevent the emergence or growth of vegetation in an amount of 1 g ai/ha or greater, such as 1.5 g ai/ha or greater, 2 g ai/ha or greater, 2.5 g ai/ha or greater, 3 g ai/ha or greater, 3.5 g ai/ha or greater, 4 g ai/ha or greater, 5 g ai/ha or greater, 6 g ai/ha or greater, 7 g ai/ha or greater, 8 g ai/ha or greater, 9 g ai/ha or greater, 10 g ai/ha or greater, 15 g ai/ha or greater, 20 g ai/ha or greater, 25 g ai/ha or greater, 30 g ai/ha or greater, 35 g ai/ha or greater, 40 g ai/ha or greater, 45 g ai/ha or greater, 50 g ai/ha or greater, 55 g ai/ha or greater, 60 g ai/ha or greater, 65 g ai/ha or greater, 70 g ai/ha or greater, 75 g ai/ha or greater, 80 g ai/ha or greater, 85 g ai/ha or greater, 90 g ai/ha or greater, 95 g ai/ha or greater, 100 g ai/ha or greater, 110 g ai/ha or greater, 120 g ai/ha or greater, 130 g ai/ha or greater, 140 g ai/ha or greater, 150 g ai/ha or greater, 160 g ai/ha or greater, 170 g ai/ha or greater, 180 g ai/ha or greater, 190 g ai/ha or greater, 200 g ai/ha or greater, 210 g ai/ha or greater, 220 g ai/ha or greater, 230 g ai/ha or greater, 240 g ai/ha or greater, 250 g ai/ha or greater, 260 g ai/ha or greater, 270 g ai/ha or greater, 280 g ai/ha or greater, 290 g ai/ha or greater, 300 g ai/ha or greater, 310 g ai/ha or greater, 320 g ai/ha or greater, 330 g ai/ha or greater, 340 g ai/ha or greater, 350 g ai/ha or greater, 360 g ai/ha or greater, 370 g ai/ha or greater, 380 g ai/ha or greater, 390 g ai/ha or greater, 400 g ai/ha or greater, 420 g ai/ha or greater, 440 g ai/ha or greater, 460 g ai/ha or greater, 480 g ai/ha or greater, 500 g ai/ha or greater, 520 g ai/ha or greater, 540 g ai/ha or greater, 560 g ai/ha or greater, 580 g ai/ha or greater, 600 g ai/ha or greater, 625 g ai/ha or greater, 650 g ai/ha or greater, 675 g ai/ha or greater, 700 g ai/ha or greater, 725 g ai/ha or greater, 750 g ai/ha or greater, 775 g ai/ha or greater, 800 g ai/ha or greater, 825 g ai/ha or greater, 850 g ai/ha or greater, 875 g ai/ha or greater, 900 g ai/ha or greater, 925 g ai/ha or greater, 950 g ai/ha or greater, or 975 g ai/ha or greater; in an amount of 1000 g ai/ha or less, such as 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3.5 g ai/ha or less, 3 g ai/ha or less, 2.5 g ai/ha or less, 2 g ai/ha or less, or 1.5 g ai/ha or less; or in an amount ranging from any of the minimum values described above to any of the maximum values described above, such as from 1-1000 g ai/ha, from 1-750 g ai/ha, from 3.5-750 g ai/ha, from 3.5-700 g ai/ha, from 3.5-650 g ai/ha, from 3.5-460 g ai/ha, from 3-280 g ai/ha, from 5-260 g ai/ha, from 35-240 g ai/ha, from 7-220 g ai/ha, from 2.5-500 g ai/ha, from 20-750 g ai/ha, from 1-50 g ai/ha, from 10-560 g ai/ha, from 20-500 g ai/ha, from 30-460 g ai/ha, from 40-400 g ai/ha, from 90-875 g ai/ha, from 60-300 g ai/ha, from 70-700 g ai/ha, from 100-140 g ai/ha, from 100-280 g ai/ha, or from 1.5-975 g ai/ha.

Naptalam

In some aspects, the auxin transport inhibitor can comprise naptalam or an agriculturally acceptable salt or ester thereof. Naptalam is a phthalamate herbicide that provides pre-emergence control of many broad-leaved weeds and some grasses in cucurbits, asparagus, peanuts, soybeans, and established woody ornamentals. It is described in *The Pesticide Manual*, Seventeenth Edition, 2016. Exemplary forms of naptalam include its sodium salt.

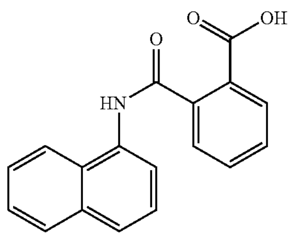 [SMILES: O=C(O)c1ccccc1C(=O)Nc1cccc2ccccc12]

Naptalam can be applied to vegetation or an area adjacent the vegetation or applied to soil or water to prevent the emergence or growth of vegetation in an amount sufficient to induce an herbicidal effect. In some aspects, naptalam is applied to vegetation or an area adjacent the vegetation or applied to soil or water to prevent the emergence or growth of vegetation in an amount of 140 g ai/ha or greater, such as 150 g ai/ha or greater, 200 g ai/ha or greater, 300 g ai/ha or greater, 400 g ai/ha or greater, 500 g ai/ha or greater, 600 g ai/ha or greater, 700 g ai/ha or greater, 750 g ai/ha or greater, 800 g ai/ha or greater, 900 g ai/ha or greater, 1000 g ai/ha or greater, 1100 g ai/ha or greater, 1200 g ai/ha or greater, 1250 g ai/ha or greater, 1300 g ai/ha or greater, 1400 g ai/ha or greater, 1500 g ai/ha or greater, 1600 g ai/ha or greater, 1700 g ai/ha or greater, 1800 g ai/ha or greater, 1900 g ai/ha or greater, 2000 g ai/ha or greater, 2200 g ai/ha or greater, 2400 g ai/ha or greater, 2600 g ai/ha or greater, 2800 g ai/ha or greater, 3000 g ai/ha or greater, 3200 g ai/ha or greater, 3400 g ai/ha or greater, 3600 g ai/ha or greater, 3800 g ai/ha or greater, 3850 g ai/ha or greater, 3900 g ai/ha or greater, 3950 g ai/ha or greater, 4000 g ai/ha or greater, 4050 g ai/ha or greater, 4100 g ai/ha or greater, 4150 g ai/ha or greater, 4200 g ai/ha or greater, 4250 g ai/ha or greater, 4300 g ai/ha or greater, 4350 g ai/ha or greater, 4400 g ai/ha or greater, 4450 g ai/ha or greater, 4500 g ai/ha or greater, 4550 g ai/ha or greater, 4600 g ai/ha or greater, 4650 g ai/ha or greater, 4700 g ai/ha or greater, 4750 g ai/ha or greater, 4800 g ai/ha or greater, 4850 g ai/ha or greater, 4900 g ai/ha or greater, 4950 g ai/ha or greater, 5000 g ai/ha or greater, 5050 g ai/ha or greater, 5100 g ai/ha or greater, 5150 g ai/ha or greater, 5200 g ai/ha or greater, 5250 g ai/ha or greater, 5300 g ai/ha or greater, 5350 g ai/ha or greater, 5400 g ai/ha or greater, or 5450 g ai/ha or greater; in an amount of 5500 g ai/ha or less, such as 5450 g ai/ha or less, 5400 g ai/ha or less, 5350 g ai/ha or less, 5300 g ai/ha or less, 5250 g ai/ha or less, 5200 g ai/ha or less, 5150 g ai/ha or less, 5100 g ai/ha or less, 5050 g ai/ha or less, 5000 g ai/ha or less, 4950 g ai/ha or less, 4900 g ai/ha or less, 4850 g ai/ha or less, 4800 g ai/ha or less, 4750 g ai/ha or less, 4700 g ai/ha or less, 4650 g ai/ha or less, 4600 g ai/ha or less, 4550 g ai/ha or less, 4500 g ai/ha or less, 4450 g ai/ha or less, 4400 g ai/ha or less, 4350 g ai/ha or less, 4300 g ai/ha or less, 4250 g ai/ha or less, 4200 g ai/ha or less, 4150 g ai/ha or less, 4100 g ai/ha or less, 4050 g ai/ha or less, 4000 g ai/ha or less, 3950 g ai/ha or less, 3900 g ai/ha or less, 3850 g ai/ha or less, 3800 g ai/ha or less, 3600 g ai/ha or less, 3400 g ai/ha or less, 3200 g ai/ha or less, 3000 g ai/ha or less, 2800 g ai/ha or less, 2600 g ai/ha or less, 2400 g ai/ha or less, 2200 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1250 g ai/ha or less, 1200 g ai/ha or less, 1100 g ai/ha or less, 1000 g ai/ha or less, 900 g ai/ha or less, 800 g ai/ha or less, 750 g ai/ha or less, 700 g ai/ha or less, 600 g ai/ha or less, 500 g ai/ha or less, 400 g ai/ha or less, 300 g ai/ha or less, 200 g ai/ha or less, 150 g ai/ha or less, or 140 g ai/ha or less; or in an amount ranging from any of the minimum values described above to any of the maximum values described above, such as from 140-5500 g ai/ha, 2400-3000 g ai/ha, 3000-5500 g ai/ha, 700-1700 g ai/ha, 300-3500 g ai/ha, 750-4000 g ai/ha, 4250-5400 g ai/ha, 2600-4400 g ai/ha, 3000-4000 g ai/ha, 1600-2800 g ai/ha, 1900-4100 g ai/ha, 1500-3600 g ai/ha, or 150-5450 g ai/ha.

2,3,5-Triiodobenzoic acid (2,3,5-TIBA)

In some aspects, the auxin transport inhibitor can comprise 2,3,5-triiodobenzoic acid (2,3,5-TIBA) or an agriculturally acceptable salt or ester thereof 2,3,5-TIBA is an auxin transport inhibitor that inhibits plant top growth, dwarves plants, promotes the growth of lateral buds, accelerates bud formation and flowering, and promotes rooting.

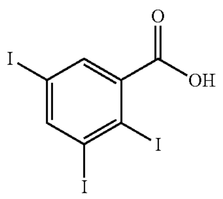 [SMILES: O=C(O)c1cc(I)cc(I)c1I]

2,3,5-TIBA can be applied to vegetation or an area adjacent the vegetation or applied to soil or water to prevent the emergence or growth of vegetation in an amount sufficient to induce an herbicidal effect. In some aspects, 2,3,5-TIBA is applied to vegetation or an area adjacent the vegetation or applied to soil or water to prevent the emergence or growth of vegetation in an amount of 140 g ai/ha or greater, such as 150 g ai/ha or greater, 200 g ai/ha or greater, 300 g ai/ha or greater, 400 g ai/ha or greater, 500 g ai/ha or greater, 600 g ai/ha or greater, 700 g ai/ha or greater, 750 g ai/ha or greater, 800 g ai/ha or greater, 900 g ai/ha or greater, 1000 g ai/ha or greater, 1100 g ai/ha or greater, 1200 g ai/ha or greater, 1250 g ai/ha or greater, 1300 g ai/ha or greater, 1400 g ai/ha or greater, 1500 g ai/ha or greater, 1600 g ai/ha or greater, 1700 g ai/ha or greater, 1800 g ai/ha or greater, 1900 g ai/ha or greater, 2000 g ai/ha or greater, 2200 g ai/ha or greater, 2400 g ai/ha or greater, 2600 g ai/ha or greater, 2800 g ai/ha or greater, 3000 g ai/ha or greater, 3200 g ai/ha or greater, 3400 g ai/ha or greater, 3600 g ai/ha or greater, 3800 g ai/ha or greater, 3850 g ai/ha or greater, 3900 g ai/ha or greater, 3950 g ai/ha or greater, 4000 g ai/ha or greater, 4050 g ai/ha or greater, 4100 g ai/ha or greater, 4150 g ai/ha or greater, 4200 g ai/ha or greater, 4250 g ai/ha or greater, 4300 g ai/ha or greater, 4350 g ai/ha or greater, 4400 g ai/ha or greater, 4450 g ai/ha or greater, 4500 g ai/ha or greater, 4550 g ai/ha or greater, 4600 g ai/ha or greater, 4650 g ai/ha or greater, 4700 g ai/ha or greater, 4750 g ai/ha or greater, 4800 g ai/ha or greater, 4850 g ai/ha or greater, 4900 g ai/ha or greater, 4950 g ai/ha or greater, 5000 g ai/ha or greater, 5050 g ai/ha or greater, 5100 g ai/ha or greater, 5150 g ai/ha or greater, 5200 g ai/ha or greater, 5250 g ai/ha or greater, 5300 g ai/ha or greater, 5350 g ai/ha or greater, 5400 g ai/ha or greater, or 5450 g ai/ha or greater; in an amount of 5500 g ai/ha or less, such as 5450 g ai/ha or less, 5400 g ai/ha or less, 5350 g ai/ha or less, 5300 g ai/ha or less, 5250 g ai/ha or less, 5200 g ai/ha or less, 5150 g ai/ha or less, 5100 g ai/ha or less, 5050 g ai/ha or less, 5000 g ai/ha or less, 4950 g ai/ha or less, 4900 g ai/ha or less, 4850 g ai/ha or less, 4800 g ai/ha or less, 4750 g ai/ha or less, 4700 g ai/ha or less, 4650 g ai/ha or less, 4600 g ai/ha or less, 4550 g ai/ha or less, 4500 g ai/ha or less, 4450 g ai/ha or less, 4400 g ai/ha or less, 4350 g ai/ha or less, 4300 g ai/ha or less, 4250 g ai/ha or less, 4200 g ai/ha or less, 4150 g ai/ha or less, 4100 g ai/ha or less, 4050 g ai/ha or less, 4000 g ai/ha or less, 3950 g ai/ha or less, 3900 g ai/ha or less, 3850 g ai/ha or less, 3800 g ai/ha or less, 3600 g ai/ha or less, 3400 g ai/ha or less, 3200 g ai/ha or less, 3000 g ai/ha or less, 2800 g ai/ha or less, 2600 g ai/ha or less, 2400 g ai/ha or less, 2200 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1250 g ai/ha or less, 1200 g ai/ha or less, 1100 g ai/ha or less, 1000 g ai/ha or less, 900 g ai/ha or less, 800 g ai/ha or less, 750 g ai/ha or less, 700 g ai/ha or less, 600 g ai/ha or less, 500 g ai/ha or less, 400 g ai/ha or less, 300 g ai/ha or less, 200 g ai/ha or less, 150 g ai/ha or less, or 140 g ai/ha or less; or in an amount ranging from any of the minimum values described above to any of the maximum values described above, such as from 140-5500 g ai/ha, 2400-3000 g ai/ha, 300-5500 g ai/ha, 700-2000 g ai/ha, 1250-4500 g ai/ha, 2800-5000 g ai/ha, 4250-5400 g ai/ha, 2600-4400 g ai/ha, 3000-4000 g ai/ha, 600-2800 g ai/ha, 1900-4100 g ai/ha, 1500-3600 g ai/ha, or 150-5450 g ai/ha.

V. Compositions

A composition comprising (a) a pyridine carboxylate herbicide or an agriculturally acceptable N-oxide, salt, or ester thereof may be mixed with or applied in combination with (b) a synthetic auxin herbicide, an auxin transport inhibitor, agriculturally acceptable salts or esters thereof, or combinations thereof.

In some aspects, (a) and (b) are used in an amount sufficient to induce an unexpectedly enhanced herbicidal effect (e.g., increased damage or injury to undesirable vegetation) while still showing good crop compatibility (e.g., no increased damage to crops) when compared to the individual application of the herbicidal compounds (a) or (b). In some aspects, the damage or injury to undesirable vegetation caused by the compositions and methods disclosed herein is evaluated using a scale from 0% to 100%, when compared with the untreated control vegetation, wherein 0% indicates no damage to the undesirable vegetation and 100% indicates complete destruction of the undesirable vegetation.

In some aspects, the joint action of (a) the pyridine carboxylate herbicide or an agriculturally acceptable N-oxide, salt, or ester thereof and (b) the synthetic auxin herbicide, auxin transport inhibitor, agriculturally acceptable salts or esters thereof, or combinations thereof results in unexpectedly enhanced herbicidal effect against undesirable vegetation, even at application rates below those typically used for the herbicide to have a herbicidal effect on its own. In some aspects, the compositions and methods disclosed herein can, based on the individual components, be used at lower application rates to achieve a herbicidal effect comparable to the effect produced by the individual components at normal application rates.

In some aspects, the weight ratio of (a) the pyridine carboxylate herbicide or an agriculturally acceptable N-oxide or salt thereof (in g ae/ha) to (b) the synthetic auxin herbicide, auxin transport inhibitor, agriculturally acceptable salts or esters thereof, or combinations thereof (in g ai/ha) may be 1:8000 or more, such as 1:7500 or more, 1:7000 or more, 1:6500 or more, 1:6000 or more, 1:5500 or more, 1:5000 or more, 1:4500 or more, 1:4000 or more, 1:3800 or more, 1:3600 or more, 1:3400 or more, 1:3200 or more, 1:3000 or more, 1:2800 or more, 1:2600 or more, 1:2400 or more, 1:2200 or more, 1:2000 or more, 1:1800 or more, 1:1600 or more, 1:1400 or more, 1:1200 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:20 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 20:1 or more, 30:1 or more, 40:1 or more, 50:1 or more, 60:1 or more, 70:1 or more, 80:1 or more, 90:1 or more, 100:1 or more, 200:1 or more, 300:1 or more, 400:1 or more, 500:1 or more, 600:1 or more, 700:1 or more, 800:1 or more, 900:1 or more, 1000:1 or more, or 1100:1 or more; the weight ratio of (a) to (b) may be 1200:1 or less, such as 1100:1 or less, 1000:1 or less, 900:1 or less, 800:1 or less, 700:1 or less, 600:1 or less, 500:1 or less, 400:1 or less, 300:1 or less, 200:1 or less, 100:1 or less, 90:1 or less, 80:1 or less, 70:1 or less, 60:1 or less, 50:1 or less, 40:1 or less, 30:1 or less, 20:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:600 or less, 1:700 or less, 1:800 or less, 1:900 or less, 1:1000 or less, 1:1200 or less, 1:1400 or less, 1:1600 or less, 1:1800 or less, 1:2000 or less, 1:2200 or less, 1:2400 or less, 1:2600 or less, 1:2800 or less, 1:3000 or less, 1:3200 or less, 1:3400 or less, 1:3600 or less, 1:3800 or less, 1:4000 or less, 1:4500 or less, 1:5000 or less, 1:5500 or less, 1:6000 or less, 1:6500 or less, 1:7000 or less, or 1:7500 or less; or the weight ratio of (a) to (b) may range from any of the minimum ratios to any of the maximum ratios provided above, such as from 1:8000 to 1200:1, from 1:6500 to 600:1, from 1:4500 to 90:1, from 1:100 to 16:1, from 1:14 to 10:1, or from 1:5 to 5:1.

In some aspects, the active ingredients in the compositions disclosed herein consist of (a) a pyridine carboxylate herbicide or an agriculturally acceptable N-oxide, salt, or ester thereof and (b) a synthetic auxin herbicide, an auxin transport inhibitor, agriculturally acceptable salts or esters thereof, or combinations thereof. In some aspects, the composition may include other components, such as safeners or adjuvants, but does not include a herbicidal active ingredient in addition to (a) and (b).

In some aspects, (a) and (b), independently, can be employed in a purity of from 90% to 100% such as from 95% to 100%) according to nuclear magnetic resonance (NMR) spectroscopy.

VI. Formulations

The present disclosure also includes formulations of the compositions and methods disclosed herein.

A. Additives

The compositions and methods disclosed herein can also be mixed with or applied with an additive. In some aspects, the additive is added sequentially. In some aspects, the additive is added simultaneously. In some aspects, the additive is premixed with the pyridine carboxylate herbicide or agriculturally acceptable N-oxide, salt, or ester thereof

1. Other Pesticides

Some aspects of the described herbicidal compositions includes adding one or more additional pesticide active ingredients to the herbicidal compositions. These pesticide active ingredients may include one or more of an herbicide, an insecticide, a fungicide, a nematocide, a miticide, a arthropodicide, a bactericide, a plant growth regulator, or combinations thereof that are compatible with the compositions of the present disclosure.

In some aspects, the additive is an additional herbicide. For example, the compositions described herein can be applied in conjunction with one or more additional herbicides to control undesirable vegetation. The composition can be formulated with the one or more additional herbicides, tank mixed with the one or more additional herbicides, or applied sequentially with the one or more additional herbicides. Exemplary additional herbicides include, but are not limited to: 4-CPA; 4-CPB; 4-CPP; 2;4-D; 2;4-D choline salt; 2,4-D salts, esters and amines; 2,4-DB; 3,4-DA; 3,4-DB; 2,4-DEB; 2,4-DEP; 2,4-DP; 3,4-DP; 2,3,6-TBA; 2,4,5-T; 2,4,5-TB; acetochlor; acifluorfen; aclonifen; acrolein; alachlor; allidochlor; alloxydim; allyl alcohol; alorac; ametridione; ametryne; amibuzin; amicarbazone; amidosulfuron; aminocyclopyrachlor; 4-aminopicolinic acid based herbicides, such as halauxifen, halauxifen-methyl, florpyrauxifen, and those described in U.S. Pat. Nos. 7,314,849 and 7,432,227 to Balko, et al.; aminopyralid; amiprofos-methyl; amitrole; ammonium sulfamate; anilofos; anisuron; asulam; atraton; atrazine; azafenidin; azimsulfuron; aziprotryne; barban; BCPC; beflubutamid; benazolin; bencarbazone; benfluralin; benfuresate; bensulide; bensulfuron; benthiocarb; bentazone; benzadox; benzfendizone; benzipram; benzobicyclon; benzofenap; benzofluor; benzoylprop; benzthiazuron; bialaphos; bicyclopyrone; bifenox; bilanafos; bispyribac; borax; bromacil; bromobonil; bromobutide; bromofenoxim; bromoxynil; brompyrazon; butachlor; butafenacil; butamifos; butenachlor; buthidazole; buthiuron; butralin; butroxydim; buturon; butylate; cacodylic acid; cafenstrole; calcium chlorate; calcium cyanamide; cambendichlor; carbasulam; carbetamide; carboxazole; chlorprocarb; carfentrazone-ethyl; CDEA; CEPC; chlomethoxyfen; chloramben; chloranocryl; chlorazifop; chlorazine; chlorobromuron; chlorbufam; chloreturon; chlorfenac; chlorfenprop; chlorflurazole; chlorflurenol; chloridazon; chlorimuron; chlornitrofen; chloropon; chlorotoluron; chloroxuron; chloroxynil; chlorpropham; chlorsulfuron; chlorthal; chlorthiamid; cinidon-ethyl; cinmethylin; cinosulfuron; cisanilide; clacyfos; clethodim; cliodinate; clodinafop-propargyl; clofop; clomazone; clomeprop; cloprop; cloproxydim; clopyralid; cloransulam-methyl; CMA; copper sulfate; CPMF; CPPC; credazine; cresol; cumyluron; cyanatryn; cyanazine; cycloate; cyclopyrimorate; cyclosulfamuron; cycl oxydim; cycluron; cyhalofop-butyl; cyperquat; cyprazine; cyprazole; cypromid; daimuron; dalapon; dazomet; delachlor; desmedipham; desmetryn; di-allate; dicamba; dichlobenil; dichloralurea; dichlormate; dichlorprop; dichlorprop-P; diclofop-methyl; diclosulam; diethamquat; diethatyl; difenopenten; difenoxuron; difenzoquat; diflufenican; diflufenzopyr; dimefuron; dimepiperate; dimethachlor; dimethametryn; dimethenamid; dimethenamid-P; dimexano; dimidazon; dinitramine; dinofenate; dinoprop; dinosam; dinoseb; dinoterb; diphenamid; dipropetryn; diquat; disul; dithiopyr; diuron; DMPA; DNOC; DSMA; EBEP; eglinazine; endothal; epronaz; EPTC; erbon; esprocarb; ethalfluralin; ethametsulfuron; ethbenzamide; ethametsulfuron; ethidimuron; ethiolate; ethobenzamid; ethofumesate; ethoxyfen; ethoxysulfuron; etinofen; etnipromid; etobenzanid; EXD; fenasulam; fenoprop; fenoxaprop; fenoxaprop-P-ethyl; fenoxaprop-P-ethyl+isoxadifen-ethyl; fenoxasulfone; fenquinotrione; fenteracol; fenthiaprop; fentrazamide; fenuron; ferrous sulfate; flamprop; flamprop-M; flazasulfuron; florasulam; fluazifop; fluazifop-P-butyl; fluazolate; flucarbazone; flucetosulfuron; fluchloralin; flufenacet; flufenican; flufenpyr-ethyl; flumetsulam; flumezin; flumiclorac-pentyl; flumioxazin; flumipropyn; fluometuron; fluorodifen; fluoroglycofen; fluoromidine; fluoronitrofen; fluothiuron; flupoxam; flupropacil; flupropanate; flupyrsulfuron; fluridone; flurochloridone; fluroxypyr; fluroxypyr-meptyl; flurtamone; fluthiacet; fomesafen; foramsulfuron; fosamine; fumiclorac; furyloxyfen; glufosinate; glufosinate-ammonium; glufosinate-P-ammonium; glyphosate salts and esters; halosafen; halosulfuron; haloxydine; haloxyfop; hexachloroacetone; hexaflurate; hexazinone; imazamethabenz; imazamox; imazapic; imazapyr; imazaquin; imazethapyr; imazosulfuron; indanofan; indaziflam; iodobonil; iodomethane; iodosulfuron; iodosulfuron-ethyl-sodium; iofensulfuron; ioxynil; ipazine; ipfencarbazone; iprymidam; isocarbamid; isocil; isomethiozin; isonoruron; isopolinate; isopropalin; isoproturon; isouron; isoxaben; isoxachlortole; isoxaflutole; isoxapyrifop; karbutilate; ketospiradox; lactofen; lenacil; linuron; MAA; MAMA; MCPA esters and amines; MCPA-thioethyl; MCPB; mecoprop; mecoprop-P; medinoterb; mefenacet; mefluidide; mesoprazine; mesosulfuron; mesotrione; metam; metamifop; metamitron; metazachlor; metflurazon; methabenzthiazuron; methalpropalin; methazole; methiobencarb; methiozolin; methiuron; methometon; methoprotryne; methyl bromide; methyl isothiocyanate; methyldymron; metobenzuron; metobromuron; metolachlor; metosulam; metoxuron; metribuzin; metsulfuron; molinate; monalide; monisouron; monochloroacetic acid; monolinuron; monuron; morfamquat; MSMA; naproanilide; napropamide; napropamide-M; naptalam; neburon; nicosulfuron; nipyraclofen; nitralin; nitrofen; nitrofluorfen; norflurazon; noruron; OCH; orbencarb; ortho-dichlorobenzene; orthosulfamuron; oryzalin; oxadiargyl; oxadiazon; oxapyrazon; oxasulfuron; oxaziclomefone; oxyfluorfen; paraflufen-ethyl; parafluron; paraquat; pebulate; pelargonic acid; pendimethalin; penoxsulam; pentachlorophenol; pentanochlor; pentoxazone; perfluidone; pethoxamid; phenisopham; phenmedipham; phenmedipham-ethyl; phenobenzuron; phenylmercury acetate; picloram; picolinafen; pinoxaden; piperophos; potassium arsenite; potassium azide; potassium cyanate; pretilachlor; primisulfuron; procyazine; prodiamine; profluazol; profluralin; profoxydim; proglinazine; prohexadione-calcium; prometon; prometryne; pronamide; propachlor; propanil; propaquizafop; propazine; propham; propisochlor; propoxycarbazone; propyrisulfuron; propyzamide; prosulfalin; prosulfocarb; prosulfuron; proxan; prynachlor; pydanon; pyraclonil; pyraflufen; pyrasulfotole; pyrazogyl; pyrazone; pyrazolynate; pyrazosulfuron; pyrazoxyfen; pyribenzoxim; pyributicarb; pyriclor; pyridafol; pyridate; pyriftalid; pyriminobac; pyrimisulfan; pyrithiobac-sodium; pyroxasulfone; pyroxsulam; quinclorac; quinmerac; quinoclamine; quinonamid; quizalofop; quizalofop-P-ethyl; quizalofop-P-tefuryl; rhodethanil; rimsulfuron; saflufenacil; S-metolachlor; sebuthylazine; secbumeton; sethoxydim; siduron; simazine; simeton; simetryn; SMA; sodium arsenite; sodium azide; sodium chlorate; sulcotrione; sulfallate; sulfentrazone; sulfometuron; sulfosate; sulfosulfuron; sulfuric acid; sulglycapin; swep; TCA; tebutam; tebuthiuron; tefuryltrione; tembotrione; tepraloxydim; terbacil; terbucarb; terbuchlor; terbumeton; terbuthylazine; terbutryne; tetrafluron; thenylchlor; thiameturon; thiazafluron; thiazopyr; thidiazimin; thidiazuron; thiencarbazone; thifensulfuron; thiobencarb; tiafenacil; tiocarbazil; tioclorim; tolpyralate; topramezone; tralkoxydim; tri-allate; triafamone; triasulfuron; triaziflam; tribenuron; tribenuron; tricamba; triclopyr choline salt; triclopyr esters and amines; tridiphane; trietazine; trifloxysulfuron; trifludimoxazin; trifluralin; triflusulfuron; trifop; trifopsime; trihydroxytriazine; trimeturon; tripropindan; tritac; tritosulfuron; vernolate; xylachlor; and salts, esters, optically active isomers, and mixtures thereof.

In some aspects, the additional pesticide or an agriculturally acceptable salt or ester thereof is provided in a premixed formulation with (a), (b), or combinations thereof. In some aspects, the pyridine carboxylate herbicide or an agriculturally acceptable N-oxide, salt, or ester thereof is provided in a premixed formulation with an additional pesticide. In some aspects, the synthetic auxin herbicide or an agriculturally acceptable salt or ester thereof is provided in a premixed formulation with an additional pesticide.

In some aspects, the compositions may include one or more herbicidal active ingredients in addition to (a). In some aspects, the compositions do not include an herbicidal active ingredient in addition to (a). In some aspects, the compositions may exclude one or more herbicidal active ingredients specified above. In some aspects, the compositions may include one or more herbicidal active ingredients in addition to (a), but may exclude one or more herbicidal ingredients specified above.

2. Adjuvants

In some aspects, the additive includes an agriculturally acceptable adjuvant. Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, adhesives (for instance, for use in seed formulations), surfactants, protective colloids, emulsifiers, tackifiers, and mixtures thereof.

Exemplary agriculturally acceptable adjuvants include, but are not limited to, crop oil concentrates (e.g., 85% mineral oil+15% emulsifiers); nonylphenol ethoxylates; benzylcocoalkyldimethyl quaternary ammonium salts; blends of petroleum hydrocarbon, alkyl esters, organic acids, and anionic surfactants; $C_9$-$C_{11}$ alkylpolyglycoside; phosphate alcohol ethoxylates; natural primary alcohol ($C_{12}$-$C_{16}$) ethoxylate; di-sec-butylphenol EO-PO block copolymers; polysiloxane-methyl cap; nonylphenol ethoxylate+urea ammonium nitrates; emulsified methylated seed oils; tridecyl alcohol (synthetic) ethoxylates (e.g., 8 EO); tallow amine ethoxylates (e.g., 15 EO); and PEG(400) dioleate-99.

Exemplary surfactants (e.g., wetting agents, tackifiers, dispersants, emulsifiers) include, but are not limited to: the alkali metal salts, alkaline earth metal salts and ammonium salts of fatty acids or of aromatic sulfonic acids (e.g., lignosulfonic acids, phenolsulfonic acids, naphthalenesulfonic acids, and dibutylnaphthalenesulfonic acid); alkyl- and alkyl aryl sulfonates; alkyl sulfates, lauryl ether sulfates and fatty alcohol sulfates; salts of sulfated hexa-, hepta- and octadecanols; salts of fatty alcohol glycol ethers; condensates of sulfonated naphthalene and its derivatives with formaldehyde; condensates of naphthalene or of the naphthalene sulfonic acids with phenol and formaldehyde; polyoxyethylene octylphenol ether; ethoxylated isooctyl-, octyl- or nonylphenol, alkylphenyl or tributylphenyl polyglycol ether; alkyl aryl polyether alcohols; isotridecyl alcohol; fatty alcohol/ethylene oxide condensates; ethoxylated castor oil; polyoxyethylene alkyl ethers or polyoxypropylene alkyl ethers; lauryl alcohol polyglycol ether acetate; sorbitol esters; lignosulfite waste liquors and proteins; denatured proteins, polysaccharides (e.g., methylcellulose); hydrophobically modified starches; and polyvinyl alcohol, polycarboxylates, polyalkoxylates, polyvinyl amine, polyethyleneimine, polyvinylpyrrolidone, and copolymers thereof.

Exemplary thickeners include, but are not limited to, polysaccharides (e.g., xanthan gum), organic and inorganic sheet minerals, and mixtures thereof.

Exemplary antifoam agents include, but are not limited to, silicone emulsions, long-chain alcohols, fatty acids, fatty acid salts, organofluorine compounds, and mixtures thereof.

Exemplary antimicrobial agents include, but are not limited to: bactericides based on dichlorophen and benzyl alcohol hemiformal; isothiazolinone derivatives, such as alkylisothiazolinones and benzisothiazolinones; and mixtures thereof.

Exemplary antifreeze agents, include, but are not limited to ethylene glycol, propylene glycol, urea, glycerol, and mixtures thereof.

Exemplary colorants include, but are not limited to, the dyes known under the names Rhodamine B, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108, and mixtures thereof.

Exemplary adhesives include, but are not limited to, polyvinylpyrrolidone, polyvinyl acetate, polyvinyl alcohol, tylose, and mixtures thereof 3. Safeners In some aspects, the additive is a safener. Safeners are compounds leading to better crop plant compatibility when applied with a herbicide. In some aspects, the safener itself is herbicidally active. In some aspects, the safener acts as an antidote or antagonist in the crop plants and can protect the crop plants from damage that might otherwise occur from an applied herbicide. Exemplary safeners include, but are not limited to, AD-67 (MON 4660), benoxacor, benthiocarb, brassinolide, cloquintocet, cloquintocet-mexyl, cyometrinil, cyprosulfamide, daimuron, dichlormid, dicyclonon, dietholate, dimepiperate, disulfoton, fenchlorazole, fenchlorazole-ethyl, fenclorim, flurazole, fluxofenim, furilazole, harpin proteins, isoxadifen-ethyl, jiecaowan, jiecaoxi, mefenpyr, mefenpyr-diethyl, mephenate, naphthalic anhydride, 2,2,5-trimethyl-3-(dichloroacetyl)-1,3-oxazolidine, 4-(dichloroacetyl)-1-oxa-4-azaspiro [4.5]decane, oxabetrinil, R29148, and N-phenyl-sulfonylbenzoic acid amides, as well as thereof agriculturally acceptable salts and, provided they have a carboxyl group, their agriculturally acceptable derivatives. In some aspects, the safener can be cloquintocet or an ester or salt thereof, such as cloquintocet-mexyl. In some aspects, the safener can be mefenpyr or an ester or salt thereof, such as mefenpyr-diethyl. In some aspects, the safener is employed in rice, cereal, or maize. For example, mefenpyr or cloquintocet can be used to antagonize harmful effects of the compositions on rice, row crops, and cereals.

4. Carriers

In some aspects, the additive includes a carrier. In some aspects, the additive includes a liquid or solid carrier. In some aspects, the additive includes an organic or inorganic carrier. Exemplary liquid carriers include, but are not limited to: water; petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like; toluene; xylene; petroleum naphtha; crop oil; acetone; methyl ethyl ketone; cyclohexanone; trichloroethylene; perchloroethylene; ethyl acetate; amyl acetate; butyl acetate; propylene glycol monomethyl ether and diethylene glycol monomethyl ether; methyl alcohol; ethyl alcohol; isopropyl alcohol; amyl alcohol; ethylene glycol; propylene glycol; glycerol; N-methyl-2-pyrrolidinone; N;N-dimethyl alkylamides; dimethyl sulfoxide; and liquid fertilizers, as well as mixtures thereof. Exemplary solid carriers include, but are not limited to: silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

B. Physical States

In some aspects, the formulation of (a) the pyridine carboxylate herbicide or an agriculturally acceptable N-oxide, salt, or ester thereof and (b) the synthetic auxin herbicide, auxin transport inhibitor, agriculturally acceptable salts or esters thereof, or combinations thereof may be present in suspended, emulsified, dissolved, or solid form. Exemplary formulations include, but are not limited to, aqueous solutions, aqueous suspensions, aqueous dispersions, aqueous emulsions, aqueous microemulsions, aqueous suspo-emulsions, oil solutions, oil suspensions, oil dispersions, oil emulsions, oil microemulsions, oil suspo-emulsions, self-emulsifying formulations, pastes, powders, dusts, granules, and materials for spreading.

In some aspects, (a) and (b) may be aqueous solutions that can be diluted before use. In various aspects, (a) and (b) may be provided as a high-strength formulation such as a concentrate. In some aspects, the concentrate is stable and retains potency during storage and shipping. In various aspects, the concentrate is a clear, homogeneous liquid that is stable at temperatures of 54° C. or greater. In some aspects, the concentrate does not exhibit any precipitation of solids at temperatures of −10° C. or higher. In some aspects, the concentrate does not exhibit separation, precipitation, or crystallization of any components at low temperatures. For example, the concentrate remains a clear solution at temperatures below 0° C. (e.g., below −5° C., below −10° C., below −15° C.). In some aspects, the concentrate exhibits a viscosity of less than 50 centipoise (50 megapascals), even at temperatures as low as 5° C. In some aspects, the concentrate does not exhibit separation, precipitation, or crystallization of any components during storage for a period of 2 weeks or greater (e.g., 4 weeks, 6 weeks, 8 weeks, 3 months, 6 months, 9 months, or 12 months or greater).

In some aspects, emulsions, pastes, or oil dispersions can be prepared by homogenizing (a) and (b) in water with a wetting agent, tackifier, dispersant, or emulsifier. In some aspects, concentrates suitable for dilution with water can be prepared, comprising (a), (b), a wetting agent, a tackifier, and a dispersant or emulsifier.

In some aspects, powders, materials for spreading, or dusts can be prepared by mixing or concomitant grinding of (a) and (b) and optionally other additives with a solid carrier.

In some aspects, granules (e.g., coated granules, impregnated granules and homogeneous granules) can be prepared by binding the (a) and (b) to solid carriers.

In some aspects, the formulations comprise, by total weight of (a) and (b), from 1% to 99% of (a) and 1% to 99% of (b) (e.g., 95% of (a) and 5% of (b); 70% of (a) and 30% of (b); or 40% of (a) and 60% of (b)). In formulations designed to be employed as concentrates, the total amount of (a) and (b) can be present in a concentration of from about 0.1 to about 98 weight percent (wt. %), based on the total weight of the formulation. For example, the total amount of (a) and (b) can be present in a concentration as little as about 1 wt. %, about 2.5 wt. %, about 5 wt. %, about 7.5 wt. %, about 10 wt. %, about 15 wt. %, about 20 wt. %, about 25 wt. %, about 30 wt. %, about 35 wt. %, about 40 wt. %, about 45 wt. %, as high as about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 97 wt. %, or within any range defined between any two of the forgoing values, such as between about 1 wt. % to about 97 wt. %, between about 10 wt. % to about 90 wt. %, between about 20 wt. % to about 45 wt. %, and about 25 wt. % to about 50 wt. % based on the total weight of the formulation. Concentrates can be diluted with an inert carrier, such as water, prior to application. The diluted formulations applied to undesirable vegetation or the locus of undesirable vegetation can contain from 0.0006 to 8.0 wt. % of the total amount of (a) and (b) (e.g., from 0.001 to 5.0 wt. %), based on the total weight of the diluted formulation.

C. Packaging

In some aspects, the formulation can be in the form of a single package formulation including both: (a) the pyridine carboxylate herbicide or an agriculturally acceptable N-oxide, salt, or ester thereof and (b) the synthetic auxin herbicide, auxin transport inhibitor, agriculturally acceptable salts or esters thereof, or combinations thereof. In some aspects, the formulation can be in the form of a single package formulation including both (a) and (b) and further including at least one additive. In some aspects, the formulation can be in the form of a multi-package formulation, such as a two-package formulation, wherein one package contains (a) and optionally at least one additive while the other package contains (b) and optionally at least one additive. In some aspects of the two-package formulation, the formulation including (a) and optionally at least one additive and the formulation including (b) and optionally at least one additive are mixed before application and then applied simultaneously. In some aspects, the mixing is performed as a tank mix (e.g., the formulations are mixed immediately before or upon dilution with water). In some aspects, the formulation including (a) and the formulation including (b) are not mixed but are applied sequentially (in succession), for example, immediately or within 1 hour, within 2 hours, within 4 hours, within 8 hours, within 16 hours, within 24 hours, within 2 days, or within 3 days, of each other.

VII. Methods of Use

The compositions disclosed herein can be applied in any known technique for applying herbicides. Exemplary application techniques include, but are not limited to, spraying, atomizing, dusting, spreading, or direct application into water. The method of application can vary depending on the intended purpose. In some aspects, the method of application can be chosen to ensure the finest possible distribution of the compositions disclosed herein.

In some aspects, a method of controlling undesirable vegetation which comprises contacting the vegetation or the locus thereof with or applying to the soil or water to prevent the emergence or growth of vegetation any of the compositions is disclosed herein.

The compositions disclosed herein can be applied pre-emergence (before the emergence of undesirable vegetation) or post-emergence (e.g., during and/or after emergence of the undesirable vegetation). In some aspects, the composition is applied post-emergence to the undesirable vegetation. In some aspects, the pyridine carboxylate herbicide and synthetic auxin herbicide or auxin transport inhibitor are applied simultaneously. In some aspects, the pyridine carboxylate herbicide and synthetic auxin herbicide or auxin transport inhibitor are applied sequentially, for example, immediately or with minimal delay, within about 10 minutes, within about 20 minutes, within about 30 minutes, within about 40 minutes, within about 1 hour, within about 2 hours, within about 4 hours, within about 8 hours, within about 16 hours, within about 24 hours, within about 2 days, or within about 3 days, of each other.

When the compositions are used in crops, the compositions can be applied after seeding and before or after the emergence of the crop plants. In some aspects, the compositions disclosed herein show good crop tolerance even when the crop has already emerged and can be applied during or after the emergence of the crop plants. In some aspects, when the compositions are used in crops, the compositions can be applied before seeding of the crop plants.

In some aspects, the compositions disclosed herein are applied to vegetation or an area adjacent the vegetation or applying to soil or water to prevent the emergence or growth of vegetation by spraying (e.g., foliar spraying). In some aspects, the spraying techniques use, for example, water as carrier and spray volume rates of from 2 liters per hectare (L/ha) to 2000 L/ha (e.g., from 10-1000 L/ha or from 50-500 L/ha). In some aspects, the compositions disclosed herein are applied by the low-volume or the ultra-low-volume method, wherein the application is in the form of micro granules. In some aspects, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or on the bare soil (e.g., post-directed or lay-by). In some aspects, the compositions disclosed herein can be applied as dry formulations (e.g., granules, powders, or dusts).

In some aspects, wherein the undesirable vegetation is treated post-emergence, the compositions disclosed herein are applied by foliar application. In some aspects, herbicidal activity is exhibited by the compounds of the mixture when they are applied directly to the plant or to the locus of the plant at any stage of growth or before planting or emergence. The effect observed can depend upon the type of undesirable vegetation to be controlled, the stage of growth of the undesirable vegetation, the application parameters of dilution and spray drop size, the particle size of solid components, the environmental conditions at the time of use, the specific compound employed, the specific adjuvants and carriers employed, the soil type, and the like, as well as the amount of chemical applied. In some aspects, these and other factors can be adjusted to promote non-selective or selective herbicidal action.

The compositions and methods disclosed herein can be used to control undesirable vegetation in a variety of applications. The compositions and methods disclosed herein can be used for controlling undesirable vegetation in areas including, but not limited to, farmland, turfgrass, pastures, grasslands, rangelands, fallow land, rights-of-way, aquatic settings, tree and vine, wildlife management areas, or rangeland. In some aspects, the undesirable vegetation is controlled in a row crop. Exemplary crops include, but are not limited to, wheat, barley, triticale, rye, teff, oats, maize, cotton, soy, sorghum, rice, millet, sugarcane and range land (e.g., pasture grasses). In some aspects, the compositions and methods disclosed herein can be used for controlling undesirable vegetation in maize, wheat, barley, rice, sorghum, millet, oats, or combinations thereof. In some aspects, the compositions and methods disclosed herein can be used in industrial vegetation management (IVM) or for utility, pipeline, roadside, and railroad rights-of-way applications. In some aspects, the compositions and methods disclosed herein can also be used in forestry (e.g., for site preparation or for combating undesirable vegetation in plantation forests). In some aspects, the compositions and methods disclosed herein can be used to control undesirable vegetation in conservation reserve program lands (CRP), trees, vines, grasslands, and grasses grown for seeds. In some aspects, the compositions and methods disclosed herein can be used on lawns (e.g., residential, industrial, and institutional), golf courses, parks, cemeteries, athletic fields, and sod farms.

The compositions and methods disclosed herein can also be used in crop plants that are resistant to, for instance, herbicides, pathogens, and/or insects. In some aspects, the compositions and methods disclosed herein can be used in crop plants that are resistant to one or more herbicides because of genetic engineering or breeding. In some aspects, the compositions and methods disclosed herein can be used in crop plants that are resistant to one or more pathogens such as plant pathogenic fungi owing to genetic engineering or breeding. In some aspects, the compositions and methods disclosed herein can be used in crop plants that are resistant to attack by insects owing to genetic engineering or breeding. Exemplary resistant crops include, but are not limited to, crops that are resistant to photosystem II inhibitors, or crop plants that, owing to introduction of the gene for *Bacillus thuringiensis* (or Bt) toxin by genetic modification, are resistant to attack by certain insects. In some aspects, the compositions and methods described herein can be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil to control vegetation in crops tolerant to glyphosate, glufosinate, dicamba, phenoxy auxins, pyridyloxy auxins, aryloxyphenoxypropionates, ACCase inhibitors, imidazolinones, synthetic auxin herbicide, HPPD inhibitors, PPO inhibitors, triazines, bromoxynil, or combinations thereof. In some aspects, the undesirable vegetation is controlled in glyphosate, glufosinate, dicamba, phenoxy auxins, pyridyloxy auxins, aryloxyphenoxypropionates, ACCase inhibitors, synthetic auxin herbicide, HPPD inhibitors, PPO inhibitors, triazines, and bromoxynil tolerant crops possessing single, multiple or stacked traits conferring tolerance to single or multiple chemistries and/or multiple modes of action. In some aspects, the undesirable vegetation can be controlled in a crop that is ACCase-tolerant, ALS-tolerant, or a combination thereof. The combination of (a) and (b) can be used in combination with one or more herbicides that are selective for the crop being treated and which complement the spectrum of weeds controlled by these compounds at the application rate employed. In some aspects, the compositions described herein and other complementary herbicides are applied at the same time, either as a combination formulation or as a tank mix, or as sequential applications. The compositions and methods may be used in controlling undesirable vegetation in crops possessing agronomic stress tolerance (including but not limited to drought, cold, heat, salt, water, nutrient, fertility, pH), pest tolerance (including but not limited to insects, fungi and pathogens), and crop improvement traits (including but not limited to yield; protein, carbohydrate, or oil content; protein, carbohydrate, or oil composition; plant stature and plant architecture).

In some aspects, the compositions disclosed herein can be used for controlling undesirable vegetation including grasses, broadleaf weeds, sedge weeds, and combinations thereof. In some aspects, the compositions disclosed herein can be used for controlling undesirable vegetation including, but not limited to, *Polygonum* species, *Amaranthus* species, *Chenopodium* species, *Sida* species, *Ambrosia* species, *Cyperus* species, *Setaria* species, *Sorghum* species, *Acanthospermum* species, *Anthemis* species, *Atriplex* species, *Brassica* species, *Cirsium* species, *Convolvulus* species, *Conyza* species, *Cassia* species, *Commelina* species, *Datura* species, *Euphorbia* species, *Geranium* species, *Galinsoga* species, *Ipomea* species, *Lamium* species, *Lolium* species, *Malva* species, *Matricaria* species, *Prosopis* species, *Rumex* species, *Sisymbrium* species, *Solanum* species, *Trifolium* species, *Xanthium* species, *Veronica* species, and *Viola* species. In some aspects, the undesired vegetation includes common chickweed (*Stellaria media*), velvetleaf (*Abutilon theophrasti*), hemp sesbania (*Sesbania exaltata Cory*), *Anoda cristata, Bidens pilosa, Brassica kaber*, shepherd's purse (*Capsella bursa pastoris*), cornflower (*Centaurea cyanus* or *Cyanus segetum*), hempnettle (*Galeopsis tetrahit*), cleavers (*Galium aparine*), volunteer soybean (*Glycine max*), ivyleaf morningglory (*Ipomoea hederacea*), common sunflower (*Helianthus annuus*), *Desmodium tortuosum*, Italian ryegrass (*Lolium multiflorum*), kochia (*Kochia scoparia*), *Medicago arabica, Mercurialis annua, Myosotis arvensis*, common poppy (*Papaver rhoeas*), *Raphanus raphanistrum*, broad-leaf dock (*Rumex obtusifolius*), Russian thistle (*Salsola kali*), wild mustard (*Sinapis arvensis*), *Sonchus arvensis, Thlaspi arvense, Tagetes minuta, Richardia brasiliensis, Plantago major, Plantago lanceolata*, bird's-eye speedwell (*Veronica persica*), pigweed (*Amaranthus retroflexus*), winter rape (*Brassica napus*), lambsquarters (*Chenopodium album*), Canadian thistle (*Cirsium arvense*), nutsedge (*Cyperus esculentus*), poinsettia (*Euphorbiaheterophylla*), prickly lettuce (*Lactuca serriola*), purple deadnettle (*Lamium purpureum*), wild chamomile (*Matricaria chamomilla*), false chamomile (*Matricaria inodora*), field chamomile (*Anthemis arvensis*), common buckwheat (*Fagopyrum esculentum*), wild buckwheat (*Polygonum convulvus*), giant foxtail (*Setaria faberi*), green foxtail (*Setaria viridis*), common sorghum (*Sorghum vulgare*), wild pansy (*Viola tricolor*), or combinations thereof.

The compositions described herein can be used to control herbicide resistant or tolerant weeds. The methods employing the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones), photosystem II (PS-II) inhibitors (e.g., phenylcarbamates, pyridazinones, triazines, triazinones, uracils, amides, ureas, benzothiadiazinones, nitriles, phenylpyridazines), acetyl CoA carboxylase (ACCase) inhibitors (e.g., aryloxyphenoxypropionates, cyclohexanediones, phenylpyrazolines), synthetic auxins (such as benzoic acids, phenoxycarboxylic acids, pyridine carboxylates, quinoline carboxylic acids), auxin transport inhibitors (e.g., phthalamates, semicarbazones), photosystem I inhibitors (e.g., bipyridyliums), 5-enolpyruvylshikimate-3-phosphate (EP SP) synthase inhibitors (e.g., glyphosate), glutamine synthetase inhibitors (e.g., glufosinate, bialaphos), microtubule assembly inhibitors (e.g., benzamides, benzoic acids, dinitroanilines, phosphoramidates, pyridines), mitosis inhibitors (e.g., carbamates), very long chain fatty acid (VLCFA) inhibitors (e.g., acetamides, chloroacetamides, oxyacetamides, tetrazolinones), fatty acid and lipid synthesis inhibitors (e.g., phosphorodithioates, thiocarbamates, benzofuranes, chlorocarbonic acids), protoporphyrinogen oxidase (PPO) inhibitors (e.g., diphenylethers, N-phenylphthalimides, oxadiazoles, oxazolidinediones, phenylpyrazoles, pyrimidindiones, thiadiazoles, triazolinones), carotenoid biosynthesis inhibitors (e.g., clomazone, amitrole, aclonifen), phytoene desaturase (PDS) inhibitors (e.g., amides, anilidex, furanones, phenoxybutanamides, pyridiazinones, pyridines), 4-hydroxyphenyl-pyruvate-dioxygenase (HPPD) inhibitors (e.g., callistemones, isoxazoles, pyrazoles, triketones), cellulose biosynthesis inhibitors (e.g., nitriles, benzamides, quinclorac, triazolocarboxamides), herbicides with multiple modes of action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, biotypes with resistance or tolerance to multiple chemical classes, biotypes with resistance or tolerance to multiple herbicide modes of action, and biotypes with multiple resistance or tolerance mechanisms (e.g., target site resistance or metabolic resistance).

By way of non-limiting illustration, examples of some aspects of the present disclosure are given below. Parts and percentages are on a per weight basis unless otherwise indicated.

EXAMPLES

Greenhouse Trial Methodology—Evaluation of Postemergence Herbicidal Effect

Seeds of the desired test plant species were planted in a 90:10% v/v (volume/volume) mixture of PRO-MIX® BX (Premier Tech Horticulture, Quakertown, PA, USA) and PROFILE® GREENS GRADE™ (Profile Products LLC, Buffalo Grove, IL, USA) planting mixture, which typically has a pH of 5.2 to 6.2 and an organic matter content of at least 50 percent, in plastic pots with a surface area of 103.2 square centimeters ($cm^2$). In some aspects, to ensure good germination and healthy plants, a fungicide treatment and/or other chemical or physical treatment was applied. The plants were grown for 7-36 days (d) in a greenhouse with an approximate 14-hour (h) photo-period which was maintained at about 23° C. during the day and 22° C. during the night. Nutrients and water were added on a regular basis and supplemental lighting was provided with overhead metal halide 1000-Watt lamps as necessary. The plants were employed for testing when they reached the second or third true leaf stage.

Emulsifiable concentrates of each of each pyridine carboxylate herbicide (Compound A or Compound B) were prepared at 100 grams acid equivalent per liter (g ae/L). The emulsifiable concentrates also included a safener, cloquintocet-mexyl, at 120 grams active ingredient per liter (g ai/L), unless otherwise noted below. An aliquot of each emulsifiable concentrate was placed in a 25 mL glass vial and diluted with an aqueous mixture of 1.25% (v/v) ACTIROB® B esterified rapeseed oil (Bayer Crop Science, Research Triangle Park, NC, USA) or MSO® Concentrate with LECI-TECH® methylated soybean oil (Loveland Products, Loveland, CO, USA) to obtain concentrated stock solutions at the highest application rate for each herbicide, based upon a 12 milliliter (mL) application volume at a rate of 187 liters per hectare (L/ha). The concentrated stock solutions were further diluted with an aqueous mixture of 1.25% v/v ACTIROB® B or MSO® Concentrate with LECI-TECH® to obtain stock solutions at reduced application rates for each herbicide. Spray solutions of the herbicide combinations (Compound A or Compound B plus synthetic auxin herbicide or auxin transport inhibitor) were prepared by adding weighed amounts or aliquots of the synthetic auxin herbicide or auxin transport inhibitor to the stock solutions of Compound A or Compound B to form 12-mL spray solutions in two-way combinations.

The spray solutions were applied to the plant material with an overhead Mandel track sprayer equipped with 8002E nozzles calibrated to deliver 187 L/ha over an application area of 0.503 square meters ($m^2$) at a spray height of 18 inches (43 centimeters (cm)) above the average plant canopy. Control plants were sprayed in the same manner with the solvent blank. All pyridine carboxylate herbicide (component a) application rates are given as "g ae/ha" and all synthetic auxin herbicide or auxin transport inhibitor (component b) application rates are given as "g ai/ha."

The treated plants and control plants were placed in a greenhouse as described above and watered by sub-irrigation to prevent wash-off of the test compounds. After 20-22 d, the condition of the test plants as compared with that of the control plants was determined visually and scored on a scale of 0 to 100 percent where 0 corresponds to no injury and 100 corresponds to complete kill.

The details of the compositions and the crops tested are specified in the following Examples.

Example 1

Compositions comprising Compound A and MCPA-dimethylammonium (MCPA-DMA) were tested on undesirable vegetation species, including winter rape (BRSNW, *Brassica napus*), wild buckwheat (POLCO, *Polygonum convolvulus*), Canadian thistle (CIRAR, *Cirsium arvense*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), and wild chamomile (MATCH, *Matricaria chamomilla*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 1 below.

TABLE 1

Herbicidal Effects (% visual injury) of Compound A and MCPA-DMA on weed and grain crops.

| | Application rate (g/ha) Compound A | | | | |
|---|---|---|---|---|---|
| | 7.5 | 10 | 0 | 7.5 | 10 |
| | MCPA-DMA | | | | |
| | 0 | 0 | 400 | 400 | 400 |
| BRSNW | 35 | 43 | 68 | 100 | 99 |
| POLCO | 78 | 93 | 10 | 93 | 100 |
| CIRAR | 30 | 40 | 40 | 65 | 70 |
| SINAR | 88 | 90 | 95 | 99 | 100 |
| SASKR | 60 | 63 | 45 | 68 | 70 |
| KCHSC | 63 | 63 | 3 | 65 | 65 |
| CHEAL | 88 | 93 | 75 | 93 | 93 |

TABLE 1-continued

Herbicidal Effects (% visual injury) of Compound A and MCPA-DMA on weed and grain crops.

| | Application rate (g/ha) Compound A | | | | |
|---|---|---|---|---|---|
| | 7.5 | 10 | 0 | 7.5 | 10 |
| | MCPA-DMA | | | | |
| | 0 | 0 | 400 | 400 | 400 |
| AMARE | 78 | 73 | 63 | 85 | 98 |
| MATCH | 20 | 30 | 5 | 10 | 20 |
| TRZAS | 0 | 0 | 0 | 0 | 0 |
| HORVS | 0 | 0 | 0 | 0 | 0 |

g/ha = grams per hectare
BRSNW = *Brassica napus* (winter rape)
POLCO = *Polygonum convolvulus* (wild buckwheat)
CIRAR = *Cirsium arvense* (Canadian thistle)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
TRZAS = *Triticum aestivum* (spring wheat)
HORVS = *Hordeum vulgare* (spring barley)

Example 2

Compositions comprising Compound A and 2,4-D-2-ethylhexyl (2,4-D-EHE) were tested to determine the efficacy of the compositions on undesirable vegetation species, including winter rape (BRSNW, *Brassica napus*), wild buckwheat (POLCO, *Polygonum convolvulus*), wild chamomile (MATCH, *Matricaria chamomilla*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 2 below.

TABLE 2

Herbicidal Effects (% visual injury) of Compound A and 2,4-D-EHE on weed and grain crops.

| | Application rate (g/ha) Compound A | | | | |
|---|---|---|---|---|---|
| | 7.5 | 10 | 0 | 7.5 | 10 |
| | 2,4-D-EHE | | | | |
| | 0 | 0 | 280 | 280 | 280 |
| BRSNW | 35 | 43 | 63 | 93 | 100 |
| POLCO | 78 | 93 | 58 | 99 | 100 |
| MATCH | 20 | 30 | 5 | 50 | 40 |
| SINAR | 88 | 90 | 83 | 92 | 100 |
| SASKR | 60 | 63 | 58 | 63 | 65 |
| KCHSC | 63 | 63 | 8 | 65 | 70 |
| CHEAL | 88 | 93 | 75 | 97 | 99 |

TABLE 2-continued

Herbicidal Effects (% visual injury) of Compound A and 2,4-D-EHE on weed and grain crops.

| | Application rate (g/ha) Compound A | | | | |
|---|---|---|---|---|---|
| | 7.5 | 10 | 0 | 7.5 | 10 |
| | 2,4-D-EHE | | | | |
| | 0 | 0 | 280 | 280 | 280 |
| AMARE | 78 | 73 | 70 | 90 | 99 |
| CIRAR | 30 | 40 | 45 | 65 | 63 |
| TRZAS | 0 | 0 | 0 | 0 | 0 |
| HORVS | 0 | 0 | 3 | 0 | 0 |

g/ha = grams per hectare
BRSNW = *Brassica napus* (winter rape)
POLCO = *Polygonum convolvulus* (wild buckwheat)
MATCH = *Matricaria chamomilla* (wild chamomile)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
CIRAR = *Cirsium arvense* (Canadian thistle)
TRZAS = *Triticum aestivum* (spring wheat)
HORVS = *Hordeum vulgare* (spring barley)

Example 3

Compositions comprising Compound A and dicamba were tested to determine the efficacy of the compositions on undesirable vegetation species, including winter rape (BRSNW, *Brassica napus*), pigweed (AMARE, *Amaranthus retroflexus*), Canadian thistle (CIRAR, *Cirsium arvense*), common lambsquarters (CHEAL, *Chenopodium album* L.), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 3 below.

TABLE 3

Herbicidal Effects (% visual injury) of Compound A and Dicamba on weed and grain crops.

| | Application rate (g/ha) Compound A | | | | |
|---|---|---|---|---|---|
| | 7.5 | 10 | 0 | 7.5 | 10 |
| | Dicamba | | | | |
| | 0 | 0 | 140 | 140 | 140 |
| BRSNW | 35 | 43 | 13 | 78 | 80 |
| AMARE | 78 | 73 | 50 | 93 | 100 |
| CIRAR | 30 | 40 | 30 | 68 | 73 |
| CHEAL | 88 | 93 | 48 | 95 | 100 |
| POLCO | 78 | 93 | 60 | 91 | 93 |
| SINAR | 88 | 90 | 70 | 96 | 100 |
| SASKR | 60 | 63 | 35 | 68 | 68 |

TABLE 3-continued

Herbicidal Effects (% visual injury) of Compound A and Dicamba on weed and grain crops.

| | Application rate (g/ha) Compound A | | | | |
|---|---|---|---|---|---|
| | 7.5 | 10 | 0 | 7.5 | 10 |
| | Dicamba | | | | |
| | 0 | 0 | 140 | 140 | 140 |
| KCHSC | 63 | 63 | 58 | 65 | 70 |
| MATCH | 20 | 30 | 10 | 18 | 35 |
| TRZAS | 0 | 0 | 0 | 0 | 0 |
| HORVS | 0 | 0 | 0 | 3 | 5 |

g/ha = grams per hectare
BRSNW = *Brassica napus* (winter rape)
AMARE = *Amaranthus retroflexus* (pigweed)
CIRAR = *Cirsium arvense* (Canadian thistle)
CHEAL = *Chenopodium album* L. (common lambsquarters)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
MATCH = *Matricaria chamomilla* (wild chamomile)
TRZAS = *Triticum aestivum* (spring wheat)
HORVS = *Hordeum vulgare* (spring barley)

Example 4

Compositions comprising Compound A and quinclorac were tested to determine the efficacy of the compositions on undesirable vegetation species, including winter rape (BRSNW, *Brassica napus*), kochia (KCHSC, *Kochia scoparia*), pigweed (AMARE, *Amaranthus retroflexus*), Canadian thistle (CIRAR, *Cirsium arvense*), wild buckwheat (POLCO, *Polygonum convolvulus*), wild mustard (SINAR, *Sinapis arvensis*), Russian thistle (SASKR, *Salsola kali*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 4 below.

TABLE 4

Herbicidal Effects (% visual injury) of Compound A and Quinclorac on weed and grain crops.

| | Application rate (g/ha) Compound A | | | | |
|---|---|---|---|---|---|
| | 7.5 | 10 | 0 | 7.5 | 10 |
| | Quinclorac | | | | |
| | 0 | 0 | 140 | 140 | 140 |
| BRSNW | 35 | 43 | 5 | 55 | 68 |
| KCHSC | 63 | 63 | 5 | 70 | 73 |
| AMARE | 78 | 73 | 0 | 96 | 95 |
| CIRAR | 30 | 40 | 0 | 58 | 60 |
| POLCO | 78 | 93 | 0 | 85 | 70 |
| SINAR | 88 | 90 | 0 | 70 | 73 |
| SASKR | 60 | 63 | 8 | 65 | 65 |

TABLE 4-continued

Herbicidal Effects (% visual injury) of Compound A and Quinclorac on weed and grain crops.

| | Application rate (g/ha) Compound A | | | | |
|---|---|---|---|---|---|
| | 7.5 | 10 | 0 | 7.5 | 10 |
| | Quinclorac | | | | |
| | 0 | 0 | 140 | 140 | 140 |
| CHEAL | 88 | 93 | 0 | 85 | 93 |
| MATCH | 20 | 30 | 0 | 10 | 18 |
| TRZAS | 0 | 0 | 0 | 0 | 0 |
| HORVS | 0 | 0 | 5 | 0 | 0 |

g/ha = grams per hectare
BRSNW = *Brassica napus* (winter rape)
KCHSC = *Kochia scoparia* (kochia)
AMARE = *Amaranthus retroflexus* (pigweed)
CIRAR = *Cirsium arvense* (Canadian thistle)
POLCO = *Polygonum convolvulus* (wild buckwheat)
SINAR = *Sinapis arvensis* (wild mustard)
SASKR = *Salsola kali* (Russian thistle)
CHEAL = *Chenopodium album* L. (common lambsquarters)
MATCH = *Matricaria chamomilla* (wild chamomile)
TRZAS = *Triticum aestivum* (spring wheat)
HORVS = *Hordeum vulgare* (spring barley)

Example 5

Compositions comprising Compound A and aminopyralid were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella bursa pastoris*), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian thistle (CIRAR, *Cirsium arvense*), to determine the efficacy of the compositions on these undesirable vegetation species. The compositions were also tested on winter wheat (TRZAW), spring wheat (TRZAS), spring barley (HORVS), and winter barley (HORVW), and the phytotoxicity of the compositions on each crop was measured.

The results are summarized in Table 5 below.

TABLE 5

Herbicidal Effects (% visual injury) of Compound A and Aminopyralid on weed and grain crops.

| | Application rate (g/ha) Compound A | | | | | | |
|---|---|---|---|---|---|---|---|
| | 7.5 | 10 | 15 | 0 | 7.5 | 10 | 15 |
| | Aminopyralid | | | | | | |
| | 0 | 0 | 0 | 5 | 5 | 5 | 5 |
| BRSNW | 70 | 75 | 75 | 0 | 80 | 85 | 90 |
| POLCO | 90 | 95 | 97 | 70 | 95 | 99 | 99 |
| SINAR | 97 | 95 | 97 | 20 | 90 | 95 | 95 |

TABLE 5-continued

| Herbicidal Effects (% visual injury) of Compound A and Aminopyralid on weed and grain crops. | | | | | | | |
|---|---|---|---|---|---|---|---|
| | Application rate (g/ha) Compound A | | | | | | |
| | 7.5 | 10 | 15 | 0 | 7.5 | 10 | 15 |
| | Aminopyralid | | | | | | |
| | 0 | 0 | 0 | 5 | 5 | 5 | 5 |
| SASKR | 70 | 70 | 75 | 0 | 75 | 75 | 75 |
| KCHSC | 70 | 75 | 75 | 0 | 70 | 70 | 83 |
| CENCY | 95 | 93 | 95 | 50 | 90 | 100 | 100 |
| VIOAR | 5 | 5 | 5 | 25 | 30 | 35 | 40 |
| GALAP | 25 | 25 | 35 | 60 | 65 | 60 | 65 |
| LAMPU | 70 | 75 | 75 | 0 | 75 | 75 | 80 |
| VERHE | 75 | 80 | 80 | 0 | 80 | 85 | 90 |
| PAPRH | 85 | 100 | 100 | 30 | 95 | 100 | 100 |
| VERVE | 90 | 93 | 95 | 0 | 87 | 95 | 97 |
| PAPRH-R | 95 | 93 | 93 | 50 | 85 | 85 | 100 |
| VIOTR | 5 | 10 | 10 | 0 | 10 | 15 | 20 |
| CAPBP | 75 | 70 | 80 | 0 | 70 | 75 | 80 |
| STEME | 70 | 100 | 100 | 0 | 70 | 100 | 100 |
| ANTAR | 80 | 90 | 95 | 10 | 97 | 100 | 97 |
| MATCH | 20 | 40 | 50 | 0 | 20 | 15 | 25 |
| MATMT | 10 | 15 | 30 | 0 | 30 | 85 | 85 |
| MATIN | 97 | 100 | 100 | 10 | 97 | 97 | 100 |
| CIRAR | 40 | 40 | 65 | 35 | 75 | 80 | 80 |
| TRZAW | 0 | 0 | 0 | 0 | 0 | 0 | 0 |
| TRZAS | 0 | 0 | 0 | 0 | 0 | 0 | 0 |
| HORVS | 0 | 0 | 0 | 0 | 0 | 0 | 0 |
| HORVW | 0 | 0 | 0 | 0 | 0 | 0 | 0 |

g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CENCY = *Cyanus segetum* (cornflower)
VIOAR = *Viola arvensis* (field violet)
GALAP = *Galium aparine* (cleavers)
LAMPU = *Lamium purpureum* (purple deadnettle)
VERHE = *Veronica hederifolia* (ivyleaf speedwell)
PAPRH = *Papaver rhoeas* (corn poppy)
VERPE = *Veronica persica* (bird's-eye speedwell)
PAPRH-R = *Papaver rhoeas* (corn poppy), herbicide-resistant
VIOTR = *Viola tricolor* (wild pansy)
CAPBP = *Capsella bursa-pastoris* (shepherd's purse)
STEME = *Stellaria media* (chickweed)
ANTAR = *Anthemis arvensis* (field chamomile)
MATCH = *Matricaria chamomilla* (wild chamomile)
MATMT = *Matricaria discoidea* (pineapple weed)
MATIN = *Matricaria inodora* (false chamomile)
CIRAR = *Cirsium arvense* (Canadian thistle)
TRZAW = *Triticum aestivum* (winter wheat)
TRZAS = *Triticum aestivum* (spring wheat)
HORVS = *Hordeum vulgare* (spring barley)
HORVW = *Hordeum vulgare* (winter barley)

Example 6

Compositions comprising Compound A and clopyralid were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella bursa-pastoris*), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian thistle (CIRAR, *Cirsium arvense*), to determine the efficacy of the compositions on these undesirable vegetation species. The compositions were also tested on winter wheat (TRZAW), spring wheat (TRZAS), spring barley (HORVS), and winter barley (HORVW), and the phytotoxicity of the compositions on each crop was measured.

The results are summarized in Table 6 below.

TABLE 6

| Herbicidal Effects (% visual injury) of Compound A and Clopyralid on weed and grain crops. | | | | | | | | | | | | | | | |
|---|---|---|---|---|---|---|---|---|---|---|---|---|---|---|---|
| | Application rate (g/ha) Compound A | | | | | | | | | | | | | | |
| | 7.5 | 10 | 15 | 0 | 0 | 0 | 7.5 | 10 | 15 | 7.5 | 10 | 15 | 7.5 | 10 | 15 |
| | Clopyralid | | | | | | | | | | | | | | |
| | 0 | 0 | 0 | 30 | 60 | 120 | 30 | 30 | 30 | 60 | 60 | 60 | 120 | 120 | 120 |
| BRSNW | 70 | 75 | 75 | 0 | 0 | 0 | 80 | 90 | 93 | 60 | 75 | 80 | 60 | 70 | 75 |
| POLCO | 90 | 95 | 97 | 85 | 90 | 97 | 95 | 95 | 100 | 95 | 95 | 100 | 97 | 97 | 97 |
| SINAR | 97 | 95 | 97 | 0 | 0 | 0 | 90 | 90 | 95 | 90 | 90 | 95 | 85 | 85 | 97 |
| SASKR | 70 | 70 | 75 | 0 | 0 | 0 | 75 | 80 | 85 | 70 | 75 | 75 | 70 | 75 | 75 |
| KCHSC | 70 | 75 | 75 | 0 | 0 | 0 | 70 | 75 | 80 | 65 | 75 | 70 | 65 | 70 | 70 |
| CENCY | 95 | 93 | 95 | 60 | 65 | 70 | 95 | 100 | 97 | 93 | 97 | 99 | 90 | 100 | 100 |
| VIOAR | 5 | 5 | 5 | 0 | 5 | 15 | 5 | 10 | 5 | 5 | 5 | 10 | 0 | 10 | 5 |
| GALAP | 25 | 25 | 35 | 0 | 0 | 0 | 50 | 30 | 40 | 30 | 60 | 65 | 30 | 60 | 65 |
| LAMPU | 70 | 75 | 75 | 0 | 0 | 0 | 70 | 75 | 75 | 75 | 85 | 85 | 90 | 85 | 93 |

TABLE 6-continued

Herbicidal Effects (% visual injury) of Compound A and Clopyralid on weed and grain crops.

| | Application rate (g/ha) Compound A | | | | | | | | | | | | | | |
|---|---|---|---|---|---|---|---|---|---|---|---|---|---|---|---|
| | 7.5 | 10 | 15 | 0 | 0 | 0 | 7.5 | 10 | 15 | 7.5 | 10 | 15 | 7.5 | 10 | 15 |
| | Clopyralid | | | | | | | | | | | | | | |
| | 0 | 0 | 0 | 30 | 60 | 120 | 30 | 30 | 30 | 60 | 60 | 60 | 120 | 120 | 120 |
| VERHE | 75 | 80 | 80 | 0 | 0 | 0 | 93 | 90 | 93 | 65 | 75 | 85 | 85 | 85 | 90 |
| PAPRH | 85 | 100 | 100 | 0 | 0 | 0 | 97 | 100 | 97 | 97 | 100 | 100 | 80 | 100 | 97 |
| VERVE | 90 | 93 | 95 | 0 | 10 | 10 | 87 | 100 | 97 | 90 | 95 | 95 | 90 | 99 | 97 |
| PAPRH-R | 95 | 93 | 93 | 0 | 0 | 0 | 85 | 100 | 100 | 90 | 95 | 100 | 97 | 100 | 100 |
| VIOTR | 5 | 10 | 10 | 0 | 0 | 0 | 0 | 5 | 0 | 5 | 5 | 0 | 10 | 10 | 5 |
| CAPBP | 75 | 70 | 80 | 0 | 0 | 0 | 65 | 75 | 85 | 70 | 70 | 75 | 65 | 70 | 70 |
| STEME | 70 | 100 | 100 | 0 | 0 | 0 | 85 | 95 | 95 | 70 | 70 | 100 | 65 | 60 | 65 |
| ANTAR | 80 | 90 | 95 | 50 | 65 | 70 | 85 | 97 | 95 | 99 | 100 | 100 | 99 | 99 | 99 |
| MATCH | 20 | 40 | 50 | 0 | 15 | 25 | 0 | 50 | 60 | 50 | 40 | 60 | 20 | 70 | 75 |
| MATMT | 10 | 15 | 30 | 15 | 25 | 30 | 35 | 60 | 50 | 60 | 65 | 60 | 80 | 70 | 95 |
| MATIN | 97 | 100 | 100 | 35 | 35 | 35 | 40 | 95 | 97 | 95 | 97 | 100 | 100 | 100 | 100 |
| CIRAR | 40 | 40 | 65 | 70 | 70 | 70 | 75 | 75 | 75 | 75 | 75 | 80 | 75 | 75 | 80 |
| TRZAW | 0 | 0 | 0 | 0 | 0 | 0 | 0 | 0 | 0 | 0 | 0 | 0 | 0 | 0 | 0 |
| TRZAS | 0 | 0 | 0 | 0 | 0 | 0 | 0 | 0 | 0 | 0 | 0 | 0 | 0 | 0 | 0 |
| HORVS | 0 | 0 | 0 | 0 | 0 | 0 | 0 | 0 | 0 | 0 | 0 | 0 | 0 | 0 | 0 |
| HORVW | 0 | 0 | 0 | 0 | 0 | 0 | 0 | 0 | 0 | 0 | 0 | 0 | 0 | 0 | 0 |

g/ha = grams per hectare

BRSNW = *Brassica napus* (winter rape)

POLCO = *Polygonum convolvulus* (wild buckwheat)

SINAR = *Sinapis arvensis* (wild mustard)

SASKR = *Salsola kali* (Russian thistle)

KCHSC = *Kochia scoparia* (kochia)

CENCY = *Cyanus segetum* (cornflower)

VIOAR = *Viola arvensis* (field violet)

GALAP = *Galium aparine* (cleavers)

LAMPU = *Lamium purpureum* (purple deadnettle)

VERHE = *Veronica hederifolia* (ivyleaf speedwell)

PAPRH = *Papaver rhoeas* (corn poppy)

VERPE = *Veronica persica* (bird's-eye speedwell)

PAPRH-R = *Papaver rhoeas* (corn poppy), herbicide-resistant

VIOTR = *Viola tricolor* (wild pansy)

CAPBP = *Capsella bursa-pastoris* (shepherd's purse)

STEME = *Stellaria media* (chickweed)

ANTAR = *Anthemis arvensis* (field chamomile)

MATCH = *Matricaria chamomilla* (wild chamomile)

MATMT = *Matricaria discoidea* (pineapple weed)

MATIN = *Matricaria inodora* (false chamomile)

CIRAR = *Cirsium arvense* (Canadian thistle)

TRZAW = *Triticum aestivum* (winter wheat)

TRZAS = *Triticum aestivum* (spring wheat)

HORVS = *Hordeum vulgare* (spring barley)

HORVW = *Hordeum vulgare* (winter barley)

Example 7

Compositions comprising Compound A and fluroxypyr-meptyl (fluroxypyr-MHE) were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella bursa-pastoris*), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian thistle (CIRAR, *Cirsium arvense*), to determine the efficacy of the compositions on these undesirable vegetation species. The compositions were also tested on winter wheat (TRZAW), spring wheat (TRZAS), spring barley (HORVS), and winter barley (HORVW), and the phytotoxicity of the compositions on each crop was measured.

The results are summarized in Table 7 below.

TABLE 7

Herbicidal Effects (% visual injury) of Compound A and Fluroxypyr-MHE on weed and grain crops.

| | Application rate (g/ha) Compound A | | | | | | | | | | |
|---|---|---|---|---|---|---|---|---|---|---|---|
| | 7.5 | 10 | 15 | 0 | 0 | 7.5 | 10 | 15 | 7.5 | 10 | 15 |
| | Fluroxypyr-MHE | | | | | | | | | | |
| | 0 | 0 | 0 | 100 | 140 | 100 | 100 | 100 | 140 | 140 | 140 |
| BRSNW | 70 | 75 | 75 | 30 | 60 | 90 | 85 | 90 | 90 | 85 | 90 |
| POLCO | 90 | 95 | 97 | 97 | 99 | 99 | 97 | 97 | 99 | 99 | 99 |
| SINAR | 97 | 95 | 97 | 93 | 90 | 95 | 100 | 95 | 95 | 95 | 97 |
| SASKR | 70 | 70 | 75 | 20 | 50 | 75 | 80 | 80 | 60 | 70 | 75 |
| KCHSC | 70 | 75 | 75 | 60 | 65 | 65 | 85 | 90 | 75 | 80 | 87 |
| CENCY | 95 | 93 | 95 | 60 | 95 | 100 | 100 | 100 | 100 | 100 | 100 |
| VIOAR | 5 | 5 | 5 | 20 | 20 | 10 | 20 | 15 | 15 | 15 | 15 |
| GALAP | 25 | 25 | 35 | 85 | 95 | 100 | 100 | 100 | 97 | 100 | 100 |
| LAMPU | 70 | 75 | 75 | 60 | 65 | 90 | 93 | 95 | 85 | 87 | 93 |
| VERHE | 75 | 80 | 80 | 30 | 60 | 75 | 83 | 87 | 80 | 90 | 87 |
| PAPRH | 85 | 100 | 100 | 10 | 10 | 87 | 95 | 95 | 95 | 100 | 100 |
| VERVE | 90 | 93 | 95 | 70 | 85 | 95 | 97 | 100 | 97 | 97 | 97 |
| PAPRH-R | 95 | 93 | 93 | 10 | 10 | 95 | 95 | 100 | 100 | 97 | 97 |
| VIOTR | 5 | 10 | 10 | 50 | 50 | 40 | 60 | 60 | 40 | 65 | 60 |
| CAPBP | 75 | 70 | 80 | 0 | 0 | 75 | 85 | 85 | 70 | 75 | 80 |
| STEME | 70 | 100 | 100 | 70 | 75 | 93 | 93 | 93 | 75 | 85 | 100 |
| ANTAR | 80 | 90 | 95 | 30 | 35 | 95 | 97 | 97 | 100 | 100 | 100 |
| MATCH | 20 | 40 | 50 | 0 | 10 | 0 | 30 | 25 | 10 | 15 | 25 |
| MATMT | 10 | 15 | 30 | 0 | 0 | 10 | 15 | 50 | 10 | 10 | 50 |
| MATIN | 97 | 100 | 100 | 10 | 15 | 95 | 93 | 97 | 100 | 100 | 99 |
| CIRAR | 40 | 40 | 65 | 0 | 0 | 50 | 55 | 60 | 40 | 50 | 60 |
| TRZAW | 0 | 0 | 0 | 0 | 0 | 0 | 0 | 0 | 0 | 0 | 0 |
| TRZAS | 0 | 0 | 0 | 0 | 0 | 0 | 0 | 0 | 0 | 0 | 0 |
| HORVS | 0 | 0 | 0 | 0 | 0 | 0 | 0 | 0 | 0 | 0 | 0 |
| HORVW | 0 | 0 | 0 | 0 | 0 | 0 | 0 | 0 | 0 | 0 | 0 |

g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CENCY = *Cyanus* segetum (cornflower)
VIOAR = *Viola arvensis* (field violet)
GALAP = *Galium aparine* (cleavers)
LAMPU = *Lamium purpureum* (purple deadnettle)
VERHE = *Veronica hederifolia* (ivyleaf speedwell)
PAPRH = *Papaver rhoeas* (corn poppy)
VERPE = *Veronica persica* (bird's-eye speedwell)
PAPRH-R = *Papaver rhoeas* (corn poppy), herbicide-resistant
VIOTR = *Viola tricolor* (wild pansy)
CAPBP = *Capsella bursa-pastoris* (shepherd's purse)
STEME = *Stellaria media* (chickweed)
ANTAR = *Anthemis arvensis* (field chamomile)
MATCH = *Matricaria chamomilla* (wild chamomile)
MATMT = *Matricaria discoidea* (pineapple weed)
MATIN = *Matricaria inodora* (false chamomile)
CIRAR = *Cirsium arvense* (Canadian thistle)
TRZAW = *Triticum aestivum* (winter wheat)
TRZAS = *Triticum aestivum* (spring wheat)
HORVS = *Hordeum vulgare* (spring barley)
HORVW = *Hordeum vulgare* (winter barley)

Example 8

Compositions comprising Compound A and halauxifen-methyl were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella bursa-pastoris*), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian thistle (CIRAR, *Cirsium arvense*), to determine the efficacy of the compositions on these undesirable vegetation species. The compositions were also tested on winter wheat (TRZAW), spring wheat (TRZAS), spring barley (HORVS), and winter barley (HORVW), and the phytotoxicity of the compositions on each crop was measured.

The results are summarized in Table 8 below.

TABLE 8

Herbicidal Effects (% visual injury) of Compound A and Halauxifen-methyl on weed and grain crops.

| | Application rate (g/ha) Compound A | | | | | | |
|---|---|---|---|---|---|---|---|
| | 7.5 | 10 | 15 | 0 | 7.5 | 10 | 15 |
| | Halauxifen-methyl | | | | | | |
| | 0 | 0 | 0 | 6 | 6 | 6 | 6 |
| BRSNW | 70 | 75 | 75 | 15 | 75 | 75 | 80 |
| POLCO | 90 | 95 | 97 | 93 | 99 | 95 | 97 |
| SINAR | 97 | 95 | 97 | 75 | 95 | 95 | 97 |
| SASKR | 70 | 70 | 75 | 65 | 75 | 75 | 80 |
| KCHSC | 70 | 75 | 75 | 10 | 70 | 70 | 85 |
| CENCY | 95 | 93 | 95 | 97 | 100 | 100 | 100 |
| VIOAR | 5 | 5 | 5 | 5 | 5 | 10 | 15 |
| GALAP | 25 | 25 | 35 | 95 | 100 | 97 | 97 |
| LAMPU | 70 | 75 | 75 | 85 | 93 | 95 | 97 |
| VERHE | 75 | 80 | 80 | 10 | 93 | 90 | 93 |
| PAPRH | 85 | 100 | 100 | 70 | 100 | 97 | 100 |
| VERPE | 90 | 93 | 95 | 10 | 90 | 95 | 97 |
| PAPRH-R | 95 | 93 | 93 | 60 | 90 | 100 | 95 |
| VIOTR | 5 | 10 | 10 | 10 | 15 | 15 | 10 |
| CAPBP | 75 | 70 | 80 | 70 | 90 | 93 | 95 |
| STEME | 70 | 100 | 100 | 65 | 70 | 85 | 100 |
| ANTAR | 80 | 90 | 95 | 40 | 97 | 97 | 97 |
| MATCH | 20 | 40 | 50 | 10 | 15 | 25 | 25 |
| MATMT | 10 | 15 | 30 | 65 | 60 | 60 | 65 |
| MATIN | 97 | 100 | 100 | 10 | 85 | 95 | 93 |
| CIRAR | 40 | 40 | 65 | 10 | 50 | 50 | 75 |
| TRZAW | 0 | 0 | 0 | 0 | 0 | 0 | 0 |
| TRZAS | 0 | 0 | 0 | 0 | 0 | 0 | 0 |
| HORVS | 0 | 0 | 0 | 0 | 0 | 0 | 0 |
| HORVW | 0 | 0 | 0 | 0 | 0 | 0 | 0 |

g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CENCY = *Cyanus segetum* (cornflower)
VIOAR = *Viola arvensis* (field violet)
GALAP = *Galium aparine* (cleavers)

TABLE 8-continued

Herbicidal Effects (% visual injury) of Compound A and Halauxifen-methyl on weed and grain crops.

| | Application rate (g/ha) Compound A | | | | | | |
|---|---|---|---|---|---|---|---|
| | 7.5 | 10 | 15 | 0 | 7.5 | 10 | 15 |
| | Halauxifen-methyl | | | | | | |
| | 0 | 0 | 0 | 6 | 6 | 6 | 6 |

LAMPU = *Lamium purpureum* (purple deadnettle)
VERHE = *Veronica hederifolia* (ivyleaf speedwell)
PAPRH = *Papaver rhoeas* (corn poppy)
VERPE = *Veronica persica* (bird's-eye speedwell)
PAPRH-R = *Papaver rhoeas* (corn poppy), herbicide-resistant
VIOTR = *Viola tricolor* (wild pansy)
CAPBP = *Capsella bursa-pastoris* (shepherd's purse)
STEME = *Stellaria media* (chickweed)
ANTAR = *Anthemis arvensis* (field chamomile)
MATCH = *Matricaria chamomilla* (wild chamomile)
MATMT = *Matricaria discoidea* (pineapple weed)
MATIN = *Matricaria inodora* (false chamomile)
CIRAR = *Cirsium arvense* (Canadian thistle)
TRZAW = *Triticum aestivum* (winter wheat)
TRZAS = *Trificum aestivum* (spring wheat)
HORVS = *Hordeum vulgare* (spring barley)
HORVW = *Hordeum vulgare* (winter barley)

Example 9

Compositions comprising Compound A and 2,4-D choline were tested on undesirable vegetation species, including spring rape (BRSNN, *Brassica napus*), purple deadnettle (LAMPU, *Lamium purpureum*), and wild pansy (VIOTR, *Viola tricolor*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 9 below.

TABLE 9

Herbicidal Effects (% visual injury) of Compound A and 2,4-D Choline on weed and grain crops.

| | | Application rate (g/ha) Compound A | | | | |
|---|---|---|---|---|---|---|
| | | 7.5 | 10 | 0 | 7.5 | 10 |
| | | 2,4-D Choline | | | | |
| | | 0 | 0 | 280 | 280 | 280 |
| BRSNN | Obs | 55 | 73 | 80 | 95 | 100 |
| | Exp | — | — | — | 91 | 95 |
| | △ | | | | 4 | 6 |
| LAMPU | Obs | 80 | 90 | 10 | 88 | 93 |
| | Exp | — | — | — | 82 | 91 |
| | △ | | | | 6 | 2 |
| VIOTR | Obs | 15 | 23 | 28 | 65 | 70 |
| | Exp | — | — | — | 39 | 44 |
| | △ | | | | 26 | 26 |
| TRZAS | Obs | 0 | 0 | 0 | 0 | 0 |
| | Exp | — | — | — | 0 | 0 |
| | △ | | | | 0 | 0 |

TABLE 9-continued

Herbicidal Effects (% visual injury) of Compound A and 2,4-D Choline on weed and grain crops.

| | | Application rate (g/ha) Compound A | | | | |
|---|---|---|---|---|---|---|
| | | 7.5 | 10 | 0 | 7.5 | 10 |
| | | 2,4-D Choline | | | | |
| | | 0 | 0 | 280 | 280 | 280 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
LAMPU = *Lamium purpureum* (purple deadnettle)
VIOTR = *Viola tricolor* (wild pansy)
TRZAS = *Trificum aestivum* (spring wheat)
HORVS = *Hordeum vulgare* (spring barley)

Example 10

Compositions comprising Compound A and 2,4-D dimethylammonium (2,4-D DMA) were tested on undesirable vegetation species, including spring rape (BRSNN, *Brassica napus*), wild buckwheat (POLCO, *Polygonum convolvulus*), wild pansy (VIOTR, *Viola tricolor*), and kochia (KCHSC, *Kochia scoparia*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 10 below.

TABLE 10

Herbicidal Effects (% visual injury) of Compound A and 2,4-D DMA on weed and grain crops.

| | | Application rate (g/ha) Compound A | | | | |
|---|---|---|---|---|---|---|
| | | 7.5 | 10 | 0 | 7.5 | 10 |
| | | 2,4-D DMA | | | | |
| | | 0 | 0 | 280 | 280 | 280 |
| BRSNN | Obs | 55 | 73 | 83 | 99 | 100 |
| | Exp | — | — | — | 92 | 95 |
| | △ | | | | 6 | 5 |
| POLCO | Obs | 78 | 86 | 55 | 94 | 98 |
| | Exp | — | — | — | 90 | 94 |
| | △ | | | | 4 | 4 |
| VIOTR | Obs | 15 | 23 | 65 | 75 | 75 |
| | Exp | — | — | — | 70 | 73 |
| | △ | | | | 5 | 2 |
| KCHSC | Obs | 60 | 68 | 10 | 75 | 78 |
| | Exp | — | — | — | 64 | 74 |
| | △ | | | | 11 | 7 |
| TRZAS | Obs | 0 | 0 | 5 | 0 | 0 |
| | Exp | — | — | — | 5 | 5 |
| | △ | | | | −5 | −5 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
POLCO = *Polygonum convolvulus* (wild buckwheat)
VIOTR = *Viola tricolor* (wild pansy)
KCHSC = *Kochia scoparia* (kochia)
TRZAS = *Trificum aestivum* (spring wheat)
HORVS = *Hordeum vulgare* (spring barley)

Example 11

Compositions comprising Compound A and florpyrauxifen-benzyl were tested on undesirable vegetation species, including broad-leaf dock (RUMOB, *Rumex obtusifolius*) and spring rape (BRSNN, *Brassica napus*), to determine the efficacy of the compositions on these undesirable vegetation species.

The results are summarized in Table 11 below.

TABLE 11

Herbicidal Effects (% visual injury) of Compound A and Florpyrauxifen-benzyl on weeds.

| | | Application rate (g/ha) Compound A | | | | |
|---|---|---|---|---|---|---|
| | | 7.5 | 10 | 0 | 7.5 | 10 |
| | | Florpyrauxifen-benzyl | | | | |
| | | 0 | 0 | 10 | 10 | 10 |
| RUMOB | Obs | 13 | 8 | 33 | 48 | 28 |
| | Exp | — | — | — | 41 | 38 |
| | △ | | | | 7 | −10 |
| BRSNN | Obs | 23 | 45 | 25 | 30 | 68 |
| | Exp | — | — | — | 42 | 59 |
| | △ | | | | −12 | 9 |

g/ha = grams per hectare
RUMOB = *Rumex obtusifolius* (broad-leaf dock)
BRSNN = *Brassica napus* (spring rape)

Example 12

Compositions comprising Compound A and aminocyclopyrachlor were tested on undesirable vegetation species, including spring rape (BRSNN, *Brassica napus*), wild pansy (VIOTR, *Viola tricolor*), and kochia (KCHSC, *Kochia scoparia*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 12 below.

TABLE 12

Herbicidal Effects (% visual injury) of Compound A and Aminocyclopyrachlor on weed and grain crops.

| | | Application rate (g/ha) Compound A | | | | |
|---|---|---|---|---|---|---|
| | | 7.5 | 10 | 0 | 7.5 | 10 |
| | | Aminocyclopyrachlor | | | | |
| | | 0 | 0 | 25 | 25 | 25 |
| BRSNN | Obs | 55 | 73 | 30 | 83 | 88 |
| | Exp | — | — | — | 69 | 81 |
| | △ | | | | 14 | |
| VIOTR | Obs | 15 | 23 | 45 | 58 | 63 |
| | Exp | — | — | — | 53 | 57 |
| | △ | | | | 4 | 5 |
| KCHSC | Obs | 60 | 68 | 78 | 96 | 95 |
| | Exp | — | — | — | 91 | 93 |
| | △ | | | | 5 | 2 |
| TRZAS | Obs | 0 | 0 | 43 | 33 | 28 |
| | Exp | — | — | — | 43 | 43 |
| | △ | | | | −10 | −15 |

TABLE 12-continued

Herbicidal Effects (% visual injury) of Compound A and Aminocyclopyrachlor on weed and grain crops.

| | | Application rate (g/ha) Compound A | | | | |
|---|---|---|---|---|---|---|
| | | 7.5 | 10 | 0 | 7.5 | 10 |
| | | Aminocyclopyrachlor | | | | |
| | | 0 | 0 | 25 | 25 | 25 |
| HORVS | Obs | 0 | 0 | 20 | 13 | 13 |
| | Exp | — | — | — | 20 | 20 |
| | △ | | | | −8 | −8 |

g/ha = grams per hectare
BRSNN = *Brassica napus* (spring rape)
VIOTR = *Viola tricolor* (wild pansy)
KCHSC = *Kochia scoparia* (kochia)
TRZAS = *Trificum aestivum* (spring wheat)
HORVS = Hordeum vulgare (spring barley)

Example 13

Compositions comprising Compound A and picloram were tested on undesirable vegetation species, including spring rape (BRSNN, *Brassica napus*), purple deadnettle (LAMPU, *Lamium purpureum*), wild buckwheat (POLCO, *Polygonum convolvulus*), wild pansy (VIOTR, *Viola tricolor*), shepherd's purse (CAPBP, *Capsella bursa-pastoris*), false chamomile (MATIN, *Matricaria inodora*), and kochia (KCHSC, *Kochia scoparia*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 13 below.

TABLE 13

Herbicidal Effects (% visual injury) of Compound A and Picloram on weed and grain crops.

| | | Application rate (g/ha) Compound A | | | | |
|---|---|---|---|---|---|---|
| | | 7.5 | 10 | 0 | 7.5 | 10 |
| | | Picloram | | | | |
| | | 0 | 0 | 10 | 10 | 10 |
| BRSNN | Obs | 55 | 73 | 8 | 75 | 78 |
| | Exp | — | — | — | 58 | 75 |
| | △ | | | | 17 | 3 |
| LAMPU | Obs | 80 | 90 | 10 | 92 | 95 |
| | Exp | — | — | — | 82 | 91 |
| | △ | | | | 10 | 4 |
| VIOTR | Obs | 15 | 23 | 10 | 35 | 45 |
| | Exp | — | — | — | 24 | 30 |
| | △ | | | | 12 | 15 |
| CAPBP | Obs | 60 | 78 | 10 | 88 | 94 |
| | Exp | — | — | — | 64 | 80 |
| | △ | | | | 24 | 14 |
| MATIN | Obs | 88 | 93 | 10 | 98 | 100 |
| | Exp | — | — | — | 89 | 93 |
| | △ | | | | 9 | 7 |
| KCHSC | Obs | 60 | 68 | 10 | 70 | 73 |
| | Exp | — | — | — | 64 | 71 |
| | △ | | | | 6 | 2 |

TABLE 13-continued

Herbicidal Effects (% visual injury) of Compound A and Picloram on weed and grain crops.

| | | Application rate (g/ha) Compound A | | | | |
|---|---|---|---|---|---|---|
| | | 7.5 | 10 | 0 | 7.5 | 10 |
| | | Picloram | | | | |
| | | 0 | 0 | 10 | 10 | 10 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
LAMPU = *Lamium purpureum* (purple deadnettle)
VIOTR = *Viola tricolor* (wild pansy)
CAPBP = *Capsella bursa-pastoris* (shepherd's purse)
MATIN = *Matricaria inodora* (false chamomile)
KCHSC = *Kochia scoparia* (kochia)
TRZAS = *Trificum aestivum* (spring wheat)
HORVS = *Hordeum vulgare* (spring barley)

Example 14

Compositions comprising Compound A and 2,4-DB were tested on undesirable vegetation species, including spring rape (BRSNN, *Brassica napus*), wild buckwheat (POLCO, *Polygonum convolvulus*), wild mustard (SINAR, *Sinapis arvensis*), kochia (KCHSC, *Kochia scoparia*), pigweed (AMARE, *Amaranthus retroflexus*), common lambsquarters (CHEAL, *Chenopodium album* L.), wild chamomile (MATCH, *Matricaria chamomilla*), and Canadian thistle (CIRAR, *Cirsium arvense*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 14 below.

TABLE 14

Herbicidal Effects (% visual injury) of Compound A and 2,4-DB on weed and grain crops.

| | | Application rate (g/ha) Compound A | | | | |
|---|---|---|---|---|---|---|
| | | 7.5 | 10 | 0 | 7.5 | 10 |
| | | 2,4-DB | | | | |
| | | 0 | 0 | 280 | 280 | 280 |
| BRSNN | Obs | 55 | 70 | 70 | 90 | 98 |
| | Exp | — | — | — | 87 | 91 |
| | △ | | | | 4 | 7 |
| POLCO | Obs | 88 | 96 | 13 | 100 | 90 |
| | Exp | — | — | — | 89 | 97 |
| | △ | | | | 11 | −7 |
| SINAR | Obs | 85 | 90 | 30 | 98 | 99 |
| | Exp | — | — | — | 90 | 93 |
| | △ | | | | 8 | 6 |
| KCHSC | Obs | 50 | 55 | 3 | 65 | 65 |
| | Exp | — | — | — | 51 | 56 |
| | △ | | | | 14 | 9 |
| AMARE | Obs | 70 | 98 | 60 | 97 | 83 |
| | Exp | — | — | — | 88 | 99 |
| | △ | | | | 9 | −17 |

TABLE 14-continued

Herbicidal Effects (% visual injury) of Compound A and 2,4-DB on weed and grain crops.

| | | Application rate (g/ha) Compound A | | | | |
|---|---|---|---|---|---|---|
| | | 7.5 | 10 | 0 | 7.5 | 10 |
| | | 2,4-DB | | | | |
| | | 0 | 0 | 280 | 280 | 280 |
| CHEAL | Obs | 60 | 90 | 43 | 83 | 88 |
| | Exp | — | — | — | 77 | 94 |
| | △ | | | | 6 | −7 |
| MATCH | Obs | 0 | 33 | 5 | 35 | 18 |
| | Exp | — | — | — | 5 | 36 |
| | △ | | | | 30 | −18 |
| CIRAR | Obs | 10 | 23 | 15 | 48 | 65 |
| | Exp | — | — | — | 24 | 34 |
| | △ | | | | 24 | 31 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
POLCO = *Polygonum convolvulus* (wild buckwheat)
SINAR = *Sinapis arvensis* (wild mustard)
KCHSC = *Kochia scoparia* (kochia)
AMARE = *Amaranthus retroflexus* (pigweed)
CHEAL = *Chenopodium album* L. (common lambsquarters)
MATCH = *Matricaria chamomilla* (wild chamomile)
CIRAR = *Cirsium arvense* (Canadian thistle)
TRZAS =Trificum aestivum (spring wheat)
HORVS = *Hordeum vulgare* (spring barley)

Example 15

Compositions comprising Compound A and triclopyr were tested on undesirable vegetation species, including spring rape (BRSNN, *Brassica napus*), wild buckwheat (POLCO, *Polygonum convolvulus*), kochia (KCHSC, *Kochia scoparia*), Russian thistle (SASKR, *Salsola kali*), pigweed (AMARE, *Amaranthus retroflexus*), common lambsquarters (CHEAL, *Chenopodium album* L.), and wild chamomile (MATCH, *Matricaria chamomilla*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 15 below.

TABLE 15

Herbicidal Effects (% visual injury) of Compound A and Triclopyr on weed and grain crops.

| | | Application rate (g/ha) Compound A | | | | |
|---|---|---|---|---|---|---|
| | | 7.5 | 10 | 0 | 7.5 | 10 |
| | | Triclopyr | | | | |
| | | 0 | 0 | 280 | 280 | 280 |
| BRSNN | Obs | 55 | 70 | 50 | 100 | 100 |
| | Exp | — | — | — | 78 | 85 |
| | △ | | | | 22 | 15 |
| POLCO | Obs | 88 | 96 | 13 | 100 | 99 |
| | Exp | — | — | — | 89 | 97 |
| | △ | | | | 11 | 2 |

TABLE 15-continued

Herbicidal Effects (% visual injury) of Compound A and Triclopyr on weed and grain crops.

| | | Application rate (g/ha) Compound A | | | | |
|---|---|---|---|---|---|---|
| | | 7.5 | 10 | 0 | 7.5 | 10 |
| | | Triclopyr | | | | |
| | | 0 | 0 | 280 | 280 | 280 |
| KCHSC | Obs | 50 | 55 | 23 | 68 | 78 |
| | Exp | — | — | — | 61 | 65 |
| | △ | | | | 6 | 13 |
| SASKR | Obs | 38 | 63 | 45 | 73 | 83 |
| | Exp | — | — | — | 66 | 79 |
| | △ | | | | 7 | 3 |
| AMARE | Obs | 70 | 98 | 45 | 99 | 100 |
| | Exp | — | — | — | 84 | 99 |
| | △ | | | | 15 | 1 |
| CHEAL | Obs | 60 | 90 | 53 | 88 | 95 |
| | Exp | — | — | — | 81 | 95 |
| | △ | | | | 7 | 0 |
| MATCH | Obs | 0 | 33 | 5 | 40 | 40 |
| | Exp | — | — | — | 5 | 36 |
| | △ | | | | 35 | 4 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
POLCO = *Polygonum convolvulus* (wild buckwheat)
KCHSC = *Kochia scoparia* (kochia)
SASKR = *Salsola kali* (Russian thistle)
AMARE = *Amaranthus retroflexus* (pigweed)
CHEAL = *Chenopodium album* L. (common lambsquarters)
MATCH = *Matricaria* chamomilla (wild chamomile)
TRZAS = *Trificum aestivum* (spring wheat)
HORVS = *Hordeum vulgare* (spring barley)

Example 16

Compositions comprising Compound A and dichlorprop-potassium (dichlorprop-K) were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 16 below.

TABLE 16

Herbicidal Effects (% visual injury) of Compound A and Dichlorprop-K on weed and grain crops.

| | | Application rate (g/ha) Compound A | | | | |
|---|---|---|---|---|---|---|
| | | 7.5 | 10 | 0 | 7.5 | 10 |
| | | Dichlorprop K | | | | |
| | | 0 | 0 | 280 | 280 | 280 |
| | Obs | 70 | 90 | 85 | 100 | 100 |
| AMARE | Exp | — | — | — | 96 | 99 |
| | △ | | | | 5 | 2 |
| | Obs | 63 | 68 | 63 | 88 | 94 |
| BRSNW | Exp | — | — | — | 86 | 88 |
| | △ | | | | 2 | 6 |
| | Obs | 70 | 78 | 70 | 89 | 84 |
| CHEAL | Exp | — | — | — | 91 | 93 |
| | △ | | | | −3 | −10 |
| | Obs | 18 | 30 | 15 | 70 | 70 |
| CIRAR | Exp | — | — | — | 30 | 41 |
| | △ | | | | 40 | 30 |
| | Obs | 65 | 70 | 60 | 80 | 88 |
| KCHSC | Exp | — | — | — | 86 | 88 |
| | △ | | | | −6 | −1 |
| | Obs | 18 | 30 | 20 | 43 | 30 |
| MATCH | Exp | — | — | — | 34 | 44 |
| | △ | | | | 9 | −14 |
| | Obs | 60 | 70 | 18 | 78 | 85 |
| POLCO | Exp | — | — | — | 67 | 75 |
| | △ | | | | 11 | 10 |
| | Obs | 85 | 88 | 78 | 95 | 98 |
| SINAR | Exp | — | — | — | 97 | 97 |
| | △ | | | | −2 | 0 |
| | Obs | 0 | 0 | 0 | 0 | 0 |
| HORVS | Exp | — | — | — | 0 | 0 |
| | △ | | | | 0 | 0 |
| | Obs | 0 | 0 | 0 | 0 | 0 |
| TRZAS | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 17

Compositions comprising Compound A and MCPA-2-ethylhexyl (MCPA EHE) were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 17 below.

TABLE 17

Herbicidal Effects (% visual injury) of Compound A and MCPA EHE on weed and grain crops.

| | | Application rate (g/ha) Compound A | | | | |
|---|---|---|---|---|---|---|
| | | 7.5 | 10 | 0 | 7.5 | 10 |
| | | MCPA EHE | | | | |
| | | 0 | 0 | 280 | 280 | 280 |
| AMARE | Obs | 70 | 90 | 50 | 100 | 90 |
| | Exp | — | — | — | 85 | 95 |
| | △ | | | | 15 | −5 |
| BRSNW | Obs | 63 | 68 | 60 | 88 | 96 |
| | Exp | — | — | — | 85 | 87 |
| | △ | | | | 3 | 9 |
| CHEAL | Obs | 70 | 78 | 70 | 93 | 90 |
| | Exp | — | — | — | 91 | 93 |
| | △ | | | | 2 | −3 |
| CIRAR | Obs | 18 | 30 | 20 | 70 | 75 |
| | Exp | — | 34 | 44 | | |
| | △ | | | | 36 | 31 |
| KCHSC | Obs | 65 | 70 | 10 | 78 | 78 |
| | Exp | — | — | — | 69 | 73 |
| | △ | | | | 9 | 5 |
| MATCH | Obs | 18 | 30 | 20 | 40 | 40 |
| | Exp | — | — | — | 34 | 44 |
| | △ | | | | 6 | −4 |
| POLCO | Obs | 60 | 70 | 10 | 85 | 93 |
| | Exp | — | — | — | 64 | 73 |
| | △ | | | | 21 | 20 |
| SINAR | Obs | 85 | 88 | 80 | 98 | 99 |
| | Exp | — | — | — | 97 | 98 |
| | △ | | | | 1 | 1 |
| HORVS | Obs | 0 | 0 | 0 | 0 | 0 |
| | Exp | — | — | — | 0 | 0 |
| | △ | | | | 0 | 0 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 18

Compositions comprising Compound A and mecoprop were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 18 below.

TABLE 18

Herbicidal Effects (% visual injury) of Compound A and Mecoprop on weed and grain crops.

| | | Application rate (g/ha) Compound A | | | | |
|---|---|---|---|---|---|---|
| | | 7.5 | 10 | 0 | 7.5 | 10 |
| | | Mecoprop | | | | |
| | | 0 | 0 | 280 | 280 | 280 |
| AMARE | Obs | 70 | 90 | 58 | 100 | 98 |
| | Exp | — | — | — | 87 | 96 |
| | △ | | | | 13 | 2 |
| BRSNW | Obs | 63 | 68 | 63 | 91 | 95 |
| | Exp | — | — | — | 86 | 88 |
| | △ | | | | 5 | 7 |
| CHEAL | Obs | 70 | 78 | 73 | 85 | 88 |
| | Exp | — | — | — | 92 | 94 |
| | △ | | | | −7 | −6 |
| CIRAR | Obs | 18 | 30 | 68 | 70 | 75 |
| | Exp | — | — | — | 73 | 77 |
| | △ | | | | −3 | −2 |
| KCHSC | Obs | 65 | 70 | 68 | 85 | 89 |
| | Exp | — | — | — | 89 | 90 |
| | △ | | | | −4 | −1 |
| MATCH | Obs | 18 | 30 | 18 | 30 | 43 |
| | Exp | — | — | — | 32 | 42 |
| | △ | | | | −2 | 0 |
| POLCO | Obs | 60 | 70 | 10 | 83 | 85 |
| | Exp | — | — | — | 64 | 73 |
| | △ | | | | 19 | 12 |
| SINAR | Obs | 85 | 88 | 80 | 97 | 96 |
| | Exp | — | — | — | 97 | 98 |
| | △ | | | | 0 | −2 |
| HORVS | Obs | 0 | 0 | 0 | 0 | 0 |
| | Exp | — | — | — | 0 | 0 |
| | △ | | | | 0 | 0 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS =Trificum aestivum (spring wheat)

Example 19

Compositions comprising Compound A and MCPA were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 19 below.

TABLE 19

Herbicidal Effects (% visual injury) of Compound A and MCPA on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | MCPA | | | | | | |
| | | 0 | 0 | 0 | 560 | 560 | 560 | 560 |
| BRSNW | Obs | 60 | 65 | 80 | 90 | 100 | 100 | 100 |
| | Exp | — | — | — | — | 96 | 97 | 98 |
| | △ | | | | | 4 | 4 | 2 |
| SASKR | Obs | 30 | 50 | 50 | 30 | 70 | 75 | 75 |
| | Exp | — | — | — | — | 51 | 65 | 65 |
| | △ | | | | | 19 | 10 | 10 |
| LAMPU | Obs | 65 | 70 | 75 | 10 | 70 | 80 | 85 |
| | Exp | — | — | — | — | 69 | 73 | 78 |
| | △ | | | | | 2 | 7 | 8 |
| VIOTR | Obs | 10 | 30 | 50 | 60 | 70 | 80 | 90 |
| | Exp | — | — | — | — | 64 | 72 | 80 |
| | △ | | | | | 6 | 8 | 10 |
| VIOAR | Obs | 10 | 10 | 15 | 20 | 40 | 40 | 50 |
| | Exp | — | — | — | — | 28 | 28 | 32 |
| | △ | | | | | 12 | 12 | 18 |
| VERPE | Obs | 80 | 85 | 95 | 60 | 85 | 100 | 100 |
| | Exp | — | — | — | — | 92 | 94 | 98 |
| | △ | | | | | −7 | 6 | 2 |
| PAPRH-R | Obs | 85 | 90 | 100 | 60 | 100 | 100 | 100 |
| | Exp | — | — | — | — | 94 | 96 | 100 |
| | △ | | | | | 6 | 4 | 0 |
| CENCY | Obs | 100 | 100 | 100 | 95 | 100 | 100 | 100 |
| | Exp | — | — | — | — | 100 | 100 | 100 |
| | △ | | | | | 0 | 0 | 0 |
| SINAR | Obs | 90 | 90 | 100 | 100 | 100 | 100 | 100 |
| | Exp | — | — | — | — | 100 | 100 | 100 |
| | △ | | | | | 0 | 0 | 0 |
| POLCO | Obs | 85 | 90 | 95 | 30 | 100 | 100 | 100 |
| | Exp | — | — | — | — | 90 | 93 | 97 |
| | △ | | | | | 11 | 7 | 4 |
| CAPBP | Obs | 50 | 50 | 85 | 60 | 75 | 80 | 95 |
| | Exp | — | — | — | — | 80 | 80 | 94 |
| | △ | | | | | −5 | 0 | 1 |
| STEME | Obs | 65 | 70 | 100 | 50 | 50 | 60 | 65 |
| | Exp | — | — | — | — | 83 | 85 | 100 |
| | △ | | | | | −33 | −25 | −35 |
| MATIN | Obs | 30 | 60 | 60 | 50 | 60 | 60 | 60 |
| | Exp | — | — | — | — | 65 | 80 | 80 |
| | △ | | | | | −5 | −20 | −20 |
| ANTAR | Obs | 95 | 100 | 100 | 60 | 85 | 90 | 100 |
| | Exp | — | — | — | — | 98 | 100 | 100 |
| | △ | | | | | −13 | −10 | 0 |
| MATMT | Obs | 5 | 5 | 15 | 5 | 5 | 15 | 20 |
| | Exp | — | — | — | — | 10 | 10 | 19 |
| | △ | | | | | −5 | 5 | 1 |
| MATCH | Obs | 15 | 20 | 20 | 30 | 20 | 30 | 20 |
| | Exp | — | — | — | — | 41 | 44 | 44 |
| | △ | | | | | −21 | −14 | −24 |
| VERHE | Obs | 65 | 75 | 80 | 65 | 70 | 80 | 80 |
| | Exp | — | — | — | — | 88 | 91 | 93 |
| | △ | | | | | −18 | −11 | −13 |
| PAPRH | Obs | 100 | 100 | 100 | 95 | 100 | 100 | 100 |
| | Exp | — | — | — | — | 100 | 100 | 100 |
| | △ | | | | | 0 | 0 | 0 |
| KCHSC | Obs | 70 | 75 | 80 | 30 | 75 | 85 | 90 |
| | Exp | — | — | — | — | 79 | 83 | 86 |
| | △ | | | | | −4 | 3 | 4 |

TABLE 19-continued

| Herbicidal Effects (% visual injury) of Compound A and MCPA on weed and grain crops. | | | | | | | | |
|---|---|---|---|---|---|---|---|---|
| | | Application rate (g/ha) Compound A | | | | | | |
| | | 7.5 | 10 | 15 | 0 | 7.5 | 10 | 15 |
| | | MCPA | | | | | | |
| | | 0 | 0 | 0 | 560 | 560 | 560 | 560 |
| CIRAR | Obs | 30 | 50 | 60 | 65 | 70 | 70 | 80 |
| | Exp | — | — | — | — | 76 | 83 | 86 |
| | △ | | | | | −6 | −13 | −6 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 20

Compositions comprising Compound A and 2,4-D-2-ethylhexyl (2,4-D EHE) were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 20 below.

TABLE 20

| Herbicidal Effects (% visual injury) of Compound A and 2,4-D EHE on weed and grain crops. | | | | | | | | |
|---|---|---|---|---|---|---|---|---|
| | | Application rate (g/ha) Compound A | | | | | | |
| | | 7.5 | 10 | 15 | 0 | 7.5 | 10 | 15 |
| | | 2,4-D EHE | | | | | | |
| | | 0 | 0 | 0 | 560 | 560 | 560 | 560 |
| BRSNW | Obs | 60 | 65 | 80 | 100 | 100 | 100 | 100 |
| | Exp | — | — | — | — | 100 | 100 | 100 |
| | △ | | | | | 0 | 0 | 0 |
| SASKR | Obs | 30 | 50 | 50 | 65 | 70 | 75 | 80 |
| | Exp | — | — | — | — | 76 | 83 | 83 |
| | △ | | | | | −6 | −8 | −3 |
| LAMPU | Obs | 65 | 70 | 75 | 20 | 70 | 85 | 85 |
| | Exp | — | — | — | — | 72 | 76 | 80 |
| | △ | | | | | −2 | 9 | 5 |
| VIOTR | Obs | 10 | 30 | 50 | 65 | 60 | 70 | 70 |
| | Exp | — | — | — | — | 69 | 76 | 83 |
| | △ | | | | | −9 | −6 | −13 |
| VIOAR | Obs | 10 | 10 | 15 | 60 | 50 | 60 | 60 |
| | Exp | — | — | — | — | 64 | 64 | 66 |
| | △ | | | | | −14 | −4 | −6 |
| VERPE | Obs | 80 | 85 | 95 | 65 | 95 | 95 | 95 |
| | Exp | — | — | — | — | 93 | 95 | 98 |
| | △ | | | | | 2 | 0 | −3 |
| PAPRH-R | Obs | 85 | 90 | 100 | 50 | 100 | 100 | 100 |
| | Exp | — | — | — | — | 93 | 95 | 100 |
| | △ | | | | | 8 | 5 | 0 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 85 | 100 | 100 | 100 |
| | Exp | — | — | — | — | 100 | 100 | 100 |
| | △ | | | | | 1 | 1 | 0 |
| POLCO | Obs | 85 | 90 | 95 | 30 | 80 | 95 | 100 |
| | Exp | — | — | — | — | 90 | 93 | 97 |
| | △ | | | | | −10 | 2 | 4 |
| CAPBP | Obs | 50 | 50 | 85 | 70 | 75 | 80 | 85 |
| | Exp | — | — | — | — | 85 | 85 | 96 |
| | △ | | | | | −10 | −5 | −11 |
| STEME | Obs | 65 | 70 | 100 | 10 | 50 | 70 | 75 |
| | Exp | — | — | — | — | 69 | 73 | 100 |
| | △ | | | | | −19 | −3 | −25 |
| MATIN | Obs | 30 | 60 | 60 | 10 | 30 | 70 | 85 |
| | Exp | — | — | — | — | 37 | 64 | 64 |
| | △ | | | | | −7 | 6 | 21 |
| ANTAR | Obs | 95 | 100 | 100 | 60 | 100 | 100 | 100 |
| | Exp | — | — | — | — | 98 | 100 | 100 |
| | △ | | | | | 2 | 0 | 0 |
| MATMT | Obs | 5 | 5 | 15 | 5 | 5 | 5 | 25 |
| | Exp | — | — | — | — | 10 | 10 | 19 |
| | △ | | | | | −5 | −5 | 6 |
| MATCH | Obs | 15 | 20 | 20 | 10 | 30 | 30 | 35 |
| | Exp | — | — | — | — | 24 | 28 | 28 |
| | △ | | | | | 7 | 2 | 7 |
| VERHE | Obs | 65 | 75 | 80 | 70 | 80 | 85 | 90 |
| | Exp | — | — | — | — | 90 | 93 | 94 |
| | △ | | | | | −10 | −8 | −4 |
| PAPRH | Obs | 100 | 100 | 100 | 60 | 100 | 100 | 100 |
| | Exp | — | — | — | — | 100 | 100 | 100 |
| | △ | | | | | 0 | 0 | 0 |
| KCHSC | Obs | 70 | 75 | 80 | 65 | 70 | 80 | 80 |
| | Exp | — | — | — | — | 90 | 91 | 93 |
| | △ | | | | | −20 | −11 | −13 |

TABLE 20-continued

Herbicidal Effects (% visual injury) of Compound A and 2,4-D EHE on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | 2,4-D EHE | | | | | | |
| | | 0 | 0 | 0 | 560 | 560 | 560 | 560 |
| CIRAR | Obs | 30 | 50 | 60 | 65 | 75 | 80 | 85 |
| | Exp | — | — | — | — | 76 | 83 | 86 |
| | △ | | | | | −1 | −3 | −1 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 21

Compositions comprising Compound A and dicamba were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 21 below.

TABLE 21

Herbicidal Effects (% visual injury) of Compound A and Dicamba on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Dicamba | | | | | | |
| | | 0 | 0 | 0 | 560 | 560 | 560 | 560 |
| BRSNW | Obs | 60 | 65 | 80 | 70 | 70 | 75 | 75 |
| | Exp | — | — | — | — | 88 | 90 | 94 |
| | △ | | | | | −18 | −15 | −19 |
| SASKR | Obs | 30 | 50 | 50 | 65 | 65 | 70 | 70 |
| | Exp | — | — | — | — | 76 | 83 | 83 |
| | △ | | | | | −11 | −13 | −13 |
| LAMPU | Obs | 65 | 70 | 75 | 20 | 65 | 70 | 75 |
| | Exp | — | — | — | — | 72 | 76 | 80 |
| | △ | | | | | −7 | −6 | −5 |
| VIOTR | Obs | 10 | 30 | 50 | 20 | 30 | 50 | 50 |
| | Exp | — | — | — | — | 28 | 44 | 60 |
| | △ | | | | | 2 | 6 | −10 |
| VIOAR | Obs | 10 | 10 | 15 | 30 | 30 | 30 | 25 |
| | Exp | — | — | — | — | 37 | 37 | 41 |
| | △ | | | | | −7 | −7 | −16 |
| VERPE | Obs | 80 | 85 | 95 | 60 | 90 | 95 | 95 |
| | Exp | — | — | — | — | 92 | 94 | 98 |
| | △ | | | | | −2 | 1 | −3 |
| PAPRH-R | Obs | 85 | 90 | 100 | 30 | 100 | 100 | 100 |
| | Exp | — | — | — | — | 90 | 93 | 100 |
| | △ | | | | | 11 | 7 | 0 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 85 | 95 | 100 | 100 |
| | Exp | — | — | — | — | 99 | 99 | 100 |
| | △ | | | | | −4 | 2 | 0 |
| POLCO | Obs | 85 | 90 | 95 | 100 | 100 | 100 | 100 |
| | Exp | — | — | — | — | 100 | 100 | 100 |
| | △ | | | | | 0 | 0 | 0 |
| CAPBP | Obs | 50 | 50 | 85 | 60 | 70 | 70 | 75 |
| | Exp | — | — | — | — | 80 | 80 | 94 |
| | △ | | | | | −10 | −10 | −19 |
| STEME | Obs | 65 | 70 | 100 | 75 | 90 | 100 | 100 |
| | Exp | — | — | — | — | 91 | 93 | 100 |
| | △ | | | | | −1 | 8 | 0 |
| MATIN | Obs | 30 | 60 | 60 | 70 | 60 | 60 | 65 |
| | Exp | — | — | — | — | 79 | 88 | 88 |
| | △ | | | | | −19 | −28 | −23 |
| ANTAR | Obs | 95 | 100 | 100 | 100 | 100 | 100 | 100 |
| | Exp | — | — | — | — | 100 | 100 | 100 |
| | △ | | | | | 0 | 0 | 0 |
| MATMT | Obs | 5 | 5 | 15 | 25 | 40 | 50 | 50 |
| | Exp | — | — | — | — | 29 | 29 | 36 |
| | △ | | | | | 11 | 21 | 14 |
| MATCH | Obs | 15 | 20 | 20 | 35 | 50 | 65 | 80 |
| | Exp | — | — | — | — | 45 | 48 | 48 |
| | △ | | | | | 5 | 17 | 32 |
| VERHE | Obs | 65 | 75 | 80 | 75 | 70 | 70 | 80 |
| | Exp | — | — | — | — | 91 | 94 | 95 |
| | △ | | | | | −21 | −24 | −15 |
| PAPRH | Obs | 100 | 100 | 100 | 30 | 100 | 100 | 100 |
| | Exp | — | — | — | — | 100 | 100 | 100 |
| | △ | | | | | 0 | 0 | 0 |
| KCHSC | Obs | 70 | 75 | 80 | 80 | 90 | 100 | 100 |
| | Exp | — | — | — | — | 94 | 95 | 96 |
| | △ | | | | | −4 | 5 | 4 |
| CIRAR | Obs | 30 | 50 | 60 | 70 | 75 | 80 | 80 |
| | Exp | — | — | — | — | 79 | 85 | 88 |
| | △ | | | | | −4 | −5 | −8 |
| TRZAW | Obs | 0 | 0 | 0 | 15 | 10 | 0 | 0 |
| | Exp | — | — | — | — | 15 | 15 | 15 |
| | △ | | | | | −5 | −15 | −15 |

TABLE 21-continued

Herbicidal Effects (% visual injury) of Compound A and Dicamba on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Dicamba | | | | | | |
| | | 0 | 0 | 0 | 560 | 560 | 560 | 560 |
| TRZAS | Obs | 0 | 0 | 0 | 20 | 15 | 0 | 0 |
| | Exp | — | — | — | — | 20 | 20 | 20 |
| | △ | | | | | −5 | −20 | −20 |
| HORVW | Obs | 0 | 0 | 0 | 15 | 15 | 0 | 0 |
| | Exp | — | — | — | — | 15 | 15 | 15 |
| | △ | | | | | 0 | −15 | −15 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 22

Compositions comprising Compound A and quinclorac were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 22 below.

TABLE 22

Herbicidal Effects (% visual injury) of Compound A and Quinclorac on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Quinclorac | | | | | | |
| | | 0 | 0 | 0 | 560 | 560 | 560 | 560 |
| BRSNW | Obs | 60 | 65 | 80 | 10 | 40 | 40 | 40 |
| | Exp | — | — | — | — | 64 | 69 | 82 |
| | △ | | | | | −24 | −29 | −42 |
| SASKR | Obs | 30 | 50 | 50 | 10 | 65 | 65 | 65 |
| | Exp | — | — | — | — | 37 | 55 | 55 |
| | △ | | | | | 28 | 10 | 10 |
| LAMPU | Obs | 65 | 70 | 75 | 10 | 75 | 80 | 85 |
| | Exp | — | — | — | — | 69 | 73 | 78 |
| | △ | | | | | 7 | 7 | 8 |
| VIOTR | Obs | 10 | 30 | 50 | 10 | 20 | 30 | 50 |
| | Exp | — | — | — | — | 19 | 37 | 55 |
| | △ | | | | | 1 | −7 | −5 |
| VIOAR | Obs | 10 | 10 | 15 | 30 | 50 | 30 | 30 |
| | Exp | — | — | — | — | 37 | 37 | 41 |
| | △ | | | | | 13 | −7 | −11 |
| VERVE | Obs | 80 | 85 | 95 | 50 | 80 | 95 | 95 |
| | Exp | — | — | — | — | 90 | 93 | 98 |
| | △ | | | | | −10 | 3 | −3 |
| PAPRH-R | Obs | 85 | 90 | 100 | 50 | 95 | 100 | 95 |
| | Exp | — | — | — | — | 93 | 95 | 100 |
| | △ | | | | | 3 | 5 | −5 |
| CENCY | Obs | 100 | 100 | 100 | 60 | 100 | 100 | 100 |
| | Exp | — | — | — | — | 100 | 100 | 100 |
| | △ | | | | | 0 | 0 | 0 |
| SINAR | Obs | 90 | 90 | 100 | 10 | 80 | 85 | 85 |
| | Exp | — | — | — | — | 91 | 91 | 100 |
| | △ | | | | | −11 | −6 | −15 |
| POLCO | Obs | 85 | 90 | 95 | 10 | 80 | 85 | 90 |
| | Exp | — | — | — | — | 87 | 91 | 96 |
| | △ | | | | | −7 | −6 | −6 |
| CAPBP | Obs | 50 | 50 | 85 | 0 | 50 | 50 | 65 |
| | Exp | — | — | — | — | 50 | 50 | 85 |
| | △ | | | | | 0 | 0 | −20 |
| STEME | Obs | 65 | 70 | 100 | 5 | 70 | 100 | 100 |
| | Exp | — | — | — | — | 67 | 72 | 100 |
| | △ | | | | | 3 | 29 | 0 |
| MATIN | Obs | 30 | 60 | 60 | 0 | 90 | 90 | 95 |
| | Exp | — | — | — | — | 30 | 60 | 60 |
| | △ | | | | | 60 | 30 | 35 |
| ANTAR | Obs | 95 | 100 | 100 | 0 | 100 | 100 | 100 |
| | Exp | — | — | — | — | 95 | 100 | 100 |
| | △ | | | | | 5 | 0 | 0 |
| MATMT | Obs | 5 | 5 | 15 | 0 | 50 | 50 | 55 |
| | Exp | — | — | — | — | 5 | 5 | 15 |
| | △ | | | | | 45 | 45 | 40 |
| MATCH | Obs | 15 | 20 | 20 | 10 | 10 | 60 | 60 |
| | Exp | — | — | — | — | 24 | 28 | 28 |
| | △ | | | | | −14 | 32 | 32 |
| VERHE | Obs | 65 | 75 | 80 | 30 | 70 | 85 | 85 |
| | Exp | — | — | — | — | 76 | 83 | 86 |
| | △ | | | | | −6 | 3 | −1 |
| PAPRH | Obs | 100 | 100 | 100 | 10 | 100 | 100 | 100 |
| | Exp | — | — | — | — | 100 | 100 | 100 |
| | △ | | | | | 0 | 0 | 0 |
| KCHSC | Obs | 70 | 75 | 80 | 10 | 75 | 85 | 85 |
| | Exp | — | — | — | — | 73 | 78 | 82 |
| | △ | | | | | 2 | 8 | 3 |
| CIRAR | Obs | 30 | 50 | 60 | 30 | 60 | 60 | 70 |
| | Exp | — | — | — | — | 51 | 65 | 72 |
| | △ | | | | | 9 | −5 | −2 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |

TABLE 22-continued

| Herbicidal Effects (% visual injury) of Compound A and Quinclorac on weed and grain crops. | | | | | | | | |
|---|---|---|---|---|---|---|---|---|
| | | Application rate (g/ha) Compound A | | | | | | |
| | | 7.5 | 10 | 15 | 0 | 7.5 | 10 | 15 |
| | | Quinclorac | | | | | | |
| | | 0 | 0 | 0 | 560 | 560 | 560 | 560 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)

HORVS=*Hordeum vulgare* (spring barley)

Example 23

Compositions comprising Compound A and aminopyralid were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 23 below.

TABLE 23

| Herbicidal Effects (% visual injury) of Compound A and Aminopyralid on weed and grain crops. | | | | | | | | |
|---|---|---|---|---|---|---|---|---|
| | | Application rate (g/h) Compound A | | | | | | |
| | | 7.5 | 10 | 15 | 0 | 7.5 | 10 | 15 |
| | | Aminopyralid | | | | | | |
| | | 0 | 0 | 0 | 10 | 10 | 10 | 10 |
| BRSNW | Obs | 60 | 65 | 80 | 10 | 60 | 60 | 60 |
| | Exp | — | — | — | — | 64 | 69 | 82 |
| | △ | | | | | −4 | −9 | −22 |
| SASKR | Obs | 30 | 50 | 50 | 20 | 70 | 75 | 80 |
| | Exp | — | — | — | — | 44 | 60 | 60 |
| | △ | | | | | 26 | 15 | 20 |
| LAMPU | Obs | 65 | 70 | 75 | 10 | 70 | 80 | 85 |
| | Exp | — | — | — | — | 69 | 73 | 78 |
| | △ | | | | | 2 | 7 | 8 |
| VIOTR | Obs | 10 | 30 | 50 | 10 | 30 | 40 | 70 |
| | Exp | — | — | — | — | 19 | 37 | 55 |
| | △ | | | | | 11 | 3 | 15 |
| VIOAR | Obs | 10 | 10 | 15 | 10 | 10 | 30 | 40 |
| | Exp | — | — | — | — | 19 | 19 | 24 |
| | △ | | | | | −9 | 11 | 17 |
| VERVE | Obs | 80 | 85 | 95 | 10 | 85 | 95 | 95 |
| | Exp | — | — | — | — | 82 | 87 | 96 |
| | △ | | | | | 3 | 9 | −1 |
| PAPRH-R | Obs | 85 | 90 | 100 | 65 | 95 | 95 | 95 |
| | Exp | — | — | — | — | 95 | 97 | 100 |
| | △ | | | | | 0 | −2 | −5 |
| CENCY | Obs | 100 | 100 | 100 | 65 | 100 | 100 | 100 |
| | Exp | — | — | — | — | 100 | 100 | 100 |
| | △ | | | | | 0 | 0 | 0 |
| SINAR | Obs | 90 | 90 | 100 | 20 | 90 | 95 | 95 |
| | Exp | — | — | — | — | 92 | 92 | 100 |
| | △ | | | | | −2 | 3 | −5 |
| POLCO | Obs | 85 | 90 | 95 | 75 | 85 | 95 | 100 |
| | Exp | — | — | — | — | 96 | 98 | 99 |
| | △ | | | | | −11 | −3 | 1 |
| CAPBP | Obs | 50 | 50 | 85 | 0 | 60 | 60 | 100 |
| | Exp | — | — | — | — | 50 | 50 | 85 |
| | △ | | | | | 10 | 10 | 15 |
| STEME | Obs | 65 | 70 | 100 | 5 | 70 | 100 | 100 |
| | Exp | — | — | — | — | 67 | 72 | 100 |
| | △ | | | | | 3 | 29 | 0 |
| MATIN | Obs | 30 | 60 | 60 | 60 | 95 | 95 | 95 |
| | Exp | — | — | — | — | 72 | 84 | 84 |
| | △ | | | | | 23 | 11 | 11 |
| ANTAR | Obs | 95 | 100 | 100 | 60 | 100 | 100 | 100 |
| | Exp | — | — | — | — | 98 | 100 | 100 |
| | △ | | | | | 2 | 0 | 0 |
| MATMT | Obs | 5 | 5 | 15 | 0 | 50 | 50 | 60 |
| | Exp | — | — | — | — | 5 | 5 | 15 |
| | △ | | | | | 45 | 45 | 45 |
| MATCH | Obs | 15 | 20 | 20 | 10 | 50 | 60 | 65 |
| | Exp | — | — | — | — | 24 | 28 | 28 |
| | △ | | | | | 27 | 32 | 37 |
| VERHE | Obs | 65 | 75 | 80 | 25 | 60 | 70 | 75 |
| | Exp | — | — | — | — | 74 | 81 | 85 |
| | △ | | | | | −14 | −11 | −10 |
| PAPRH | Obs | 100 | 100 | 100 | 65 | 80 | 100 | 100 |
| | Exp | — | — | — | — | 100 | 100 | 100 |
| | △ | | | | | −20 | 0 | 0 |
| KCHSC | Obs | 70 | 75 | 80 | 10 | 70 | 85 | 90 |
| | Exp | — | — | — | — | 73 | 78 | 82 |
| | △ | | | | | −3 | 8 | 8 |
| CIRAR | Obs | 30 | 50 | 60 | 60 | 75 | 80 | 85 |
| | Exp | — | — | — | — | 72 | 80 | 84 |
| | △ | | | | | 3 | 0 | 1 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |

TABLE 23-continued

Herbicidal Effects (% visual injury) of Compound A and Aminopyralid on weed and grain crops.

| | | Application rate (g/h) Compound A | | | | | | |
|---|---|---|---|---|---|---|---|---|
| | | 7.5 | 10 | 15 | 0 | 7.5 | 10 | 15 |
| | | Aminopyralid | | | | | | |
| | | 0 | 0 | 0 | 10 | 10 | 10 | 10 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 24

Compositions comprising Compound A and fluroxypyr were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet (VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 24 below.

TABLE 24

Herbicidal Effects (% visual injury) of Compound A and Fluroxypyr on weed and grain crops.

| | | Application rate (g/h) Compound A | | | | | | |
|---|---|---|---|---|---|---|---|---|
| | | 7.5 | 10 | 15 | 0 | 7.5 | 10 | 15 |
| | | Fluroxypyr | | | | | | |
| | | 0 | 0 | 0 | 200 | 200 | 200 | 200 |
| BRSNW | Obs | 60 | 65 | 80 | 30 | 40 | 40 | 40 |
| | Exp | — | — | — | — | 72 | 76 | 86 |
| | △ | | | | | −32 | −30 | −46 |
| SASKR | Obs | 30 | 50 | 50 | 60 | 65 | 70 | 70 |
| | Exp | — | — | — | — | 72 | 80 | 80 |
| | △ | | | | | −7 | −10 | −10 |
| LAMPU | Obs | 65 | 70 | 75 | 65 | 85 | 85 | 95 |
| | Exp | — | — | — | — | 88 | 90 | 91 |
| | △ | | | | | −3 | −5 | 4 |
| VIOTR | Obs | 10 | 30 | 50 | 65 | 70 | 70 | 70 |
| | Exp | — | — | — | — | 69 | 76 | 83 |
| | △ | | | | | 2 | −6 | −13 |
| VIOAR | Obs | 10 | 10 | 15 | 10 | 10 | 10 | 10 |
| | Exp | — | — | — | — | 19 | 19 | 24 |
| | △ | | | | | −9 | −9 | −14 |
| VERVE | Obs | 80 | 85 | 95 | 60 | 80 | 85 | 90 |
| | Exp | — | — | — | — | 92 | 94 | 98 |
| | △ | | | | | −12 | −9 | −8 |
| PAPRH-R | Obs | 85 | 90 | 100 | 10 | 80 | 97 | 97 |
| | Exp | — | — | — | — | 87 | 91 | 100 |
| | △ | | | | | −7 | 5 | −3 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 90 | 95 | 97 | 100 |
| | Exp | — | — | — | — | 99 | 99 | 100 |
| | △ | | | | | −4 | −2 | 0 |
| POLCO | Obs | 85 | 90 | 95 | 50 | 60 | 65 | 95 |
| | Exp | — | — | — | — | 93 | 95 | 98 |
| | △ | | | | | −33 | −30 | −3 |
| CAPBP | Obs | 50 | 50 | 85 | 10 | 70 | 70 | 80 |
| | Exp | — | — | — | — | 55 | 55 | 87 |
| | △ | | | | | 15 | 15 | −7 |
| STEME | Obs | 65 | 70 | 100 | 95 | 95 | 95 | 100 |
| | Exp | — | — | — | — | 98 | 99 | 100 |
| | △ | | | | | −3 | −4 | 0 |
| MATIN | Obs | 30 | 60 | 60 | 65 | 70 | 80 | 95 |
| | Exp | — | — | — | — | 76 | 86 | 86 |
| | △ | | | | | −6 | −6 | 9 |
| ANTAR | Obs | 95 | 100 | 100 | 60 | 100 | 100 | 100 |
| | Exp | — | — | — | — | 98 | 100 | 100 |
| | △ | | | | | 2 | 0 | 0 |
| MATMT | Obs | 5 | 5 | 15 | 0 | 30 | 30 | 30 |
| | Exp | — | — | — | — | 5 | 5 | 15 |
| | △ | | | | | 25 | 25 | 15 |
| MATCH | Obs | 15 | 20 | 20 | 10 | 25 | 50 | 60 |
| | Exp | — | — | — | — | 24 | 28 | 28 |
| | △ | | | | | 2 | 22 | 32 |
| VERHE | Obs | 65 | 75 | 80 | 10 | 60 | 65 | 75 |
| | Exp | — | — | — | — | 69 | 78 | 82 |
| | △ | | | | | −9 | −13 | −7 |
| PAPRH | Obs | 100 | 100 | 100 | 0 | 100 | 100 | 100 |
| | Exp | — | — | — | — | 100 | 100 | 100 |
| | △ | | | | | 0 | 0 | 0 |
| KCHSC | Obs | 70 | 75 | 80 | 70 | 90 | 95 | 95 |
| | Exp | — | — | — | — | 91 | 93 | 94 |
| | △ | | | | | −1 | 3 | 1 |
| CIRAR | Obs | 30 | 50 | 60 | 10 | 70 | 70 | 75 |
| | Exp | — | — | — | — | 37 | 55 | 64 |
| | △ | | | | | 33 | 15 | 11 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |

TABLE 24-continued

Herbicidal Effects (% visual injury) of Compound A and Fluroxypyr on weed and grain crops.

| | | Application rate (g/h) Compound A | | | | | | |
|---|---|---|---|---|---|---|---|---|
| | | 7.5 | 10 | 15 | 0 | 7.5 | 10 | 15 |
| | | Fluroxypyr | | | | | | |
| | | 0 | 0 | 0 | 200 | 200 | 200 | 200 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 25

Compositions comprising Compound A and halauxifen-methyl were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 25 below.

TABLE 25

Herbicidal Effects (% visual injury) of Compound A and Halauxifen-methyl on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Halauxifen-methyl | | | | | | |
| | | 0 | 0 | 0 | 3 | 3 | 3 | 3 |
| BRSNW | Obs | 60 | 65 | 80 | 30 | 65 | 65 | 70 |
| | Exp | — | — | — | — | 72 | 76 | 86 |
| | △ | | | | | −7 | −11 | −16 |
| SASKR | Obs | 30 | 50 | 50 | 50 | 60 | 70 | 70 |
| | Exp | — | — | — | — | 65 | 75 | 75 |
| | △ | | | | | −5 | −5 | −5 |
| LAMPU | Obs | 65 | 70 | 75 | 97 | 90 | 95 | 97 |
| | Exp | — | — | — | — | 99 | 99 | 99 |
| | △ | | | | | −9 | −4 | −2 |
| VIOTR | Obs | 10 | 30 | 50 | 60 | 65 | 65 | 70 |
| | Exp | — | — | — | — | 64 | 72 | 80 |
| | △ | | | | | 1 | −7 | −10 |
| VIOAR | Obs | 10 | 10 | 15 | 10 | 15 | 15 | 10 |
| | Exp | — | — | — | — | 19 | 19 | 24 |
| | △ | | | | | −4 | −4 | −14 |
| VERVE | Obs | 80 | 85 | 95 | 20 | 85 | 85 | 90 |
| | Exp | — | — | — | — | 84 | 88 | 96 |
| | △ | | | | | 1 | −3 | −6 |
| PAPRH-R | Obs | 85 | 90 | 100 | 65 | 95 | 100 | 100 |
| | Exp | — | — | — | — | 95 | 97 | 100 |
| | △ | | | | | 0 | 4 | 0 |
| CENCY | Obs | 100 | 100 | 100 | 90 | 100 | 100 | 100 |
| | Exp | — | — | — | — | 100 | 100 | 100 |
| | △ | | | | | 0 | 0 | 0 |
| SINAR | Obs | 90 | 90 | 100 | 70 | 93 | 97 | 97 |
| | Exp | — | — | — | — | 97 | 97 | 100 |
| | △ | | | | | −4 | 0 | −3 |
| POLCO | Obs | 85 | 90 | 95 | 80 | 90 | 90 | 97 |
| | Exp | — | — | — | — | 97 | 98 | 99 |
| | △ | | | | | −7 | −8 | −2 |
| CAPBP | Obs | 50 | 50 | 85 | 75 | 75 | 80 | 90 |
| | Exp | — | — | — | — | 88 | 88 | 96 |
| | △ | | | | | −13 | −8 | −6 |
| STEME | Obs | 65 | 70 | 100 | 30 | 80 | 100 | 100 |
| | Exp | — | — | — | — | 76 | 79 | 100 |
| | △ | | | | | 5 | 21 | 0 |
| MATIN | Obs | 30 | 60 | 60 | 0 | 60 | 60 | 65 |
| | Exp | — | — | — | — | 30 | 60 | 60 |
| | △ | | | | | 30 | 0 | 5 |
| ANTAR | Obs | 95 | 100 | 100 | 50 | 100 | 100 | 100 |
| | Exp | — | — | — | — | 98 | 100 | 100 |
| | △ | | | | | 3 | 0 | 0 |
| MATMT | Obs | 5 | 5 | 15 | 0 | 50 | 60 | 70 |
| | Exp | — | — | — | — | 5 | 5 | 15 |
| | △ | | | | | 45 | 55 | 55 |
| MATCH | Obs | 15 | 20 | 20 | 10 | 10 | 30 | 30 |
| | Exp | — | — | — | — | 24 | 28 | 28 |
| | △ | | | | | −14 | 2 | 2 |
| VERHE | Obs | 65 | 75 | 80 | 10 | 70 | 70 | 75 |
| | Exp | — | — | — | — | 69 | 78 | 82 |
| | △ | | | | | 2 | −8 | −7 |
| PAPRH | Obs | 100 | 100 | 100 | 70 | 100 | 100 | 100 |
| | Exp | — | — | — | — | 100 | 100 | 100 |
| | △ | | | | | 0 | 0 | 0 |
| KCHSC | Obs | 70 | 75 | 80 | 50 | 75 | 80 | 85 |
| | Exp | — | — | — | — | 85 | 88 | 90 |
| | △ | | | | | −10 | −8 | −5 |
| CIRAR | Obs | 30 | 50 | 60 | 65 | 70 | 70 | 80 |
| | Exp | — | — | — | — | 76 | 83 | 86 |
| | △ | | | | | −6 | −13 | −6 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |

TABLE 25-continued

Herbicidal Effects (% visual injury) of Compound A and Halauxifen-methyl on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Halauxifen-methyl | | | | | | |
| | | 0 | 0 | 0 | 3 | 3 | 3 | 3 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 26

Compositions comprising Compound A and florpyrauxifen-benzyl were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 26 below.

TABLE 26

Herbicidal Effects (% visual injury) of Compound A and Florpyrauxifen-benzyl on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Florpyrauxifen-benzyl | | | | | | |
| | | 0 | 0 | 0 | 20 | 20 | 20 | 20 |
| BRSNW | Obs | 60 | 65 | 80 | 40 | 40 | 45 | 65 |
| | Exp | — | — | — | — | 76 | 79 | 88 |
| | △ | | | | | −36 | −34 | −23 |
| SASKR | Obs | 30 | 50 | 50 | 70 | 75 | 80 | 85 |
| | Exp | — | — | — | — | 79 | 85 | 85 |
| | △ | | | | | −4 | −5 | 0 |
| LAMPU | Obs | 65 | 70 | 75 | 97 | 95 | 97 | 97 |
| | Exp | — | — | — | — | 99 | 99 | 99 |
| | △ | | | | | −4 | −2 | −2 |
| VIOTR | Obs | 10 | 30 | 50 | 70 | 30 | 60 | 60 |
| | Exp | — | — | — | — | 73 | 79 | 85 |
| | △ | | | | | −43 | −19 | −25 |
| VIOAR | Obs | 10 | 10 | 15 | 10 | 10 | 10 | 10 |
| | Exp | — | — | — | — | 19 | 19 | 24 |
| | △ | | | | | −9 | −9 | −14 |
| VERVE | Obs | 80 | 85 | 95 | 10 | 95 | 95 | 95 |
| | Exp | — | — | — | — | 82 | 87 | 96 |
| | △ | | | | | 13 | 9 | −1 |
| PAPRH-R | Obs | 85 | 90 | 100 | 60 | 95 | 100 | 100 |
| | Exp | — | — | — | — | 94 | 96 | 100 |
| | △ | | | | | 1 | 4 | 0 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 90 | 95 | 100 | 100 |
| | Exp | — | — | — | — | 99 | 99 | 100 |
| | △ | | | | | −4 | 1 | 0 |
| POLCO | Obs | 85 | 90 | 95 | 85 | 90 | 100 | 100 |
| | Exp | — | — | — | — | 98 | 99 | 99 |
| | △ | | | | | −8 | 2 | 1 |
| CAPBP | Obs | 50 | 50 | 85 | 80 | 90 | 97 | 100 |
| | Exp | — | — | — | — | 90 | 90 | 97 |
| | △ | | | | | 0 | 7 | 3 |
| STEME | Obs | 65 | 70 | 100 | 100 | 90 | 100 | 100 |
| | Exp | — | — | — | — | 100 | 100 | 100 |
| | △ | | | | | −10 | 0 | 0 |
| MATIN | Obs | 30 | 60 | 60 | 50 | 95 | 100 | 100 |
| | Exp | — | — | — | — | 65 | 80 | 80 |
| | △ | | | | | 30 | 20 | 20 |
| ANTAR | Obs | 95 | 100 | 100 | 100 | 100 | 100 | 100 |
| | Exp | — | — | — | — | 100 | 100 | 100 |
| | △ | | | | | 0 | 0 | 0 |
| MATMT | Obs | 5 | 5 | 15 | 50 | 55 | 60 | 70 |
| | Exp | — | — | — | — | 53 | 53 | 58 |
| | △ | | | | | 3 | 8 | 13 |
| MATCH | Obs | 15 | 20 | 20 | 35 | 50 | 50 | 65 |
| | Exp | — | — | — | — | 45 | 48 | 48 |
| | △ | | | | | 5 | 2 | 17 |
| VERHE | Obs | 65 | 75 | 80 | 20 | 85 | 85 | 90 |
| | Exp | — | — | — | — | 72 | 80 | 84 |
| | △ | | | | | 13 | 5 | 6 |
| PAPRH | Obs | 100 | 100 | 100 | 70 | 100 | 100 | 100 |
| | Exp | — | — | — | — | 100 | 100 | 100 |
| | △ | | | | | 0 | 0 | 0 |
| KCHSC | Obs | 70 | 75 | 80 | 65 | 80 | 90 | 95 |
| | Exp | — | — | — | — | 90 | 91 | 93 |
| | △ | | | | | −10 | −1 | 2 |
| CIRAR | Obs | 30 | 50 | 60 | 70 | 75 | 75 | 80 |
| | Exp | — | — | — | — | 79 | 85 | 88 |
| | △ | | | | | −4 | −10 | −8 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |

TABLE 26-continued

Herbicidal Effects (% visual injury) of Compound A and Florpyrauxifen-benzyl on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Florpyrauxifen-benzyl | | | | | | |
| | | 0 | 0 | 0 | 20 | 20 | 20 | 20 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 27

Compositions comprising Compound A and picloram were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 27 below.

TABLE 27

Herbicidal Effects (% visual injury) of Compound A and Picloram on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Picloram | | | | | | |
| | | 0 | 0 | 0 | 20 | 20 | 20 | 20 |
| BRSNW | Obs | 60 | 65 | 80 | 10 | 30 | 40 | 50 |
| | Exp | — | — | — | — | 64 | 69 | 82 |
| | △ | | | | | −34 | −29 | −32 |
| SASKR | Obs | 30 | 50 | 50 | 30 | 65 | 70 | 70 |
| | Exp | — | — | — | — | 51 | 65 | 65 |
| | △ | | | | | 14 | 5 | 5 |
| LAMPU | Obs | 65 | 70 | 75 | 5 | 70 | 80 | 85 |
| | Exp | — | — | — | — | 67 | 72 | 76 |
| | △ | | | | | 3 | 9 | 9 |
| VIOTR | Obs | 10 | 30 | 50 | 10 | 30 | 30 | 50 |
| | Exp | — | — | — | — | 19 | 37 | 55 |
| | △ | | | | | 11 | −7 | −5 |
| VIOAR | Obs | 10 | 10 | 15 | 10 | 10 | 15 | 20 |
| | Exp | — | — | — | — | 19 | 19 | 24 |
| | △ | | | | | −9 | −4 | −4 |
| VERPE | Obs | 80 | 85 | 95 | 10 | 85 | 85 | 90 |
| | Exp | — | — | — | — | 82 | 87 | 96 |
| | △ | | | | | 3 | −2 | −6 |
| PAPRH-R | Obs | 85 | 90 | 100 | 30 | 95 | 95 | 100 |
| | Exp | — | — | — | — | 90 | 93 | 100 |
| | △ | | | | | 6 | 2 | 0 |
| CENCY | Obs | 100 | 100 | 100 | 60 | 100 | 100 | 100 |
| | Exp | — | — | — | — | 100 | 100 | 100 |
| | △ | | | | | 0 | 0 | 0 |
| SINAR | Obs | 90 | 90 | 100 | 30 | 85 | 100 | 100 |
| | Exp | — | — | — | — | 93 | 93 | 100 |
| | △ | | | | | −8 | 7 | 0 |
| POLCO | Obs | 85 | 90 | 95 | 40 | 95 | 95 | 97 |
| | Exp | — | — | — | — | 91 | 94 | 97 |
| | △ | | | | | 4 | 1 | 0 |
| CAPBP | Obs | 50 | 50 | 85 | 0 | 50 | 65 | 85 |
| | Exp | — | — | — | — | 50 | 50 | 85 |
| | △ | | | | | 0 | 15 | 0 |
| STEME | Obs | 65 | 70 | 100 | 10 | 80 | 80 | 97 |
| | Exp | — | — | — | — | 69 | 73 | 100 |
| | △ | | | | | 12 | 7 | −3 |
| MATIN | Obs | 30 | 60 | 60 | 30 | 95 | 97 | 97 |
| | Exp | — | — | — | — | 51 | 72 | 72 |
| | △ | | | | | 44 | 25 | 25 |
| ANTAR | Obs | 95 | 100 | 100 | 30 | 100 | 100 | 100 |
| | Exp | — | — | — | — | 97 | 100 | 100 |
| | △ | | | | | 4 | 0 | 0 |
| MATMT | Obs | 5 | 5 | 15 | 10 | 25 | 30 | 50 |
| | Exp | — | — | — | — | 15 | 15 | 24 |
| | △ | | | | | 11 | 16 | 27 |
| MATCH | Obs | 15 | 20 | 20 | 40 | 70 | 75 | 80 |
| | Exp | — | — | — | — | 49 | 52 | 52 |
| | △ | | | | | 21 | 23 | 28 |
| VERHE | Obs | 65 | 75 | 80 | 10 | 80 | 80 | 90 |
| | Exp | — | — | — | — | 69 | 78 | 82 |
| | △ | | | | | 12 | 3 | 8 |
| PAPRH | Obs | 100 | 100 | 100 | 20 | 100 | 100 | 100 |
| | Exp | — | — | — | — | 100 | 100 | 100 |
| | △ | | | | | 0 | 0 | 0 |
| KCHSC | Obs | 70 | 75 | 80 | 10 | 80 | 85 | 90 |
| | Exp | — | — | — | — | 73 | 78 | 82 |
| | △ | | | | | 7 | 8 | 8 |
| CIRAR | Obs | 30 | 50 | 60 | 60 | 70 | 75 | 75 |
| | Exp | — | — | — | — | 72 | 80 | 84 |
| | △ | | | | | −2 | −5 | −9 |

TABLE 27-continued

Herbicidal Effects (% visual injury) of Compound A and Picloram on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Picloram | | | | | | |
| | | 0 | 0 | 0 | 20 | 20 | 20 | 20 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 28

Compositions comprising Compound A and triclopyr were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 28 below.

TABLE 28

Herbicidal Effects (% visual injury) of Compound A and Triclopyr on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Triclopyr | | | | | | |
| | | 0 | 0 | 0 | 560 | 560 | 560 | 560 |
| BRSNW | Obs | 60 | 65 | 80 | 60 | 70 | 70 | 85 |
| | Exp | — | — | — | — | 84 | 86 | 92 |
| | △ | | | | | −14 | −16 | −7 |
| SASKR | Obs | 30 | 50 | 50 | 50 | 65 | 65 | 70 |
| | Exp | — | — | — | — | 65 | 75 | 75 |
| | △ | | | | | 0 | −10 | −5 |
| LAMPU | Obs | 65 | 70 | 75 | 65 | 70 | 75 | 80 |
| | Exp | — | — | — | — | 88 | 90 | 91 |
| | △ | | | | | −18 | −15 | −11 |
| VIOTR | Obs | 10 | 30 | 50 | 70 | 95 | 95 | 95 |
| | Exp | — | — | — | — | 73 | 79 | 85 |
| | △ | | | | | 22 | 16 | 10 |
| VIOAR | Obs | 10 | 10 | 15 | 25 | 30 | 30 | 50 |
| | Exp | — | — | — | — | 33 | 33 | 36 |
| | △ | | | | | −3 | −3 | 14 |
| VERPE | Obs | 80 | 85 | 95 | 60 | 80 | 85 | 85 |
| | Exp | — | — | — | — | 92 | 94 | 98 |
| | △ | | | | | −12 | −9 | −13 |
| PAPRH-R | Obs | 85 | 90 | 100 | 50 | 95 | 97 | 97 |
| | Exp | — | — | — | — | 93 | 95 | 100 |
| | △ | | | | | 3 | 2 | −3 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 100 | 100 | 100 | 100 |
| | Exp | — | — | — | — | 100 | 100 | 100 |
| | △ | | | | | 0 | 0 | 0 |
| POLCO | Obs | 85 | 90 | 95 | 30 | 90 | 100 | 100 |
| | Exp | — | — | — | — | 90 | 93 | 97 |
| | △ | | | | | 1 | 7 | 4 |
| CAPBP | Obs | 50 | 50 | 85 | 75 | 85 | 85 | 90 |
| | Exp | — | — | — | — | 88 | 88 | 96 |
| | △ | | | | | −3 | −3 | −6 |
| STEME | Obs | 65 | 70 | 100 | 30 | 70 | 70 | 95 |
| | Exp | — | — | — | — | 76 | 79 | 100 |
| | △ | | | | | −6 | −9 | −5 |
| MATIN | Obs | 30 | 60 | 60 | 0 | 60 | 70 | 90 |
| | Exp | — | — | — | — | 30 | 60 | 60 |
| | △ | | | | | 30 | 10 | 30 |
| ANTAR | Obs | 95 | 100 | 100 | 40 | 90 | 100 | 100 |
| | Exp | — | — | — | — | 97 | 100 | 100 |
| | △ | | | | | −7 | 0 | 0 |
| MATMT | Obs | 5 | 5 | 15 | 10 | 10 | 15 | 15 |
| | Exp | — | — | — | — | 15 | 15 | 24 |
| | △ | | | | | −5 | 1 | −9 |
| MATCH | Obs | 15 | 20 | 20 | 40 | 50 | 60 | 70 |
| | Exp | — | — | — | — | 49 | 52 | 52 |
| | △ | | | | | 1 | 8 | 18 |
| VERHE | Obs | 65 | 75 | 80 | 65 | 65 | 70 | 75 |
| | Exp | — | — | — | — | 88 | 91 | 93 |
| | △ | | | | | −23 | −21 | −18 |
| PAPRH | Obs | 100 | 100 | 100 | 20 | 100 | 100 | 100 |
| | Exp | — | — | — | — | 100 | 100 | 100 |
| | △ | | | | | 0 | 0 | 0 |
| KCHSC | Obs | 70 | 75 | 80 | 75 | 85 | 85 | 93 |
| | Exp | — | — | — | — | 93 | 94 | 95 |
| | △ | | | | | −8 | −9 | −2 |
| CIRAR | Obs | 30 | 50 | 60 | 75 | 70 | 75 | 75 |
| | Exp | — | — | — | — | 83 | 88 | 90 |
| | △ | | | | | −13 | −13 | −15 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |

TABLE 28-continued

Herbicidal Effects (% visual injury) of Compound A and Triclopyr on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Triclopyr | | | | | | |
| | | 0 | 0 | 0 | 560 | 560 | 560 | 560 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVVV | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Trificum aestivum* (spring wheat)
HORVW = *Hordeum vulgare* (winter barley)
HORVS = *Hordeum vulgare* (spring barley)

Example 29

Compositions comprising Compound A and 2,4-DB were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 29 below.

TABLE 29

Herbicidal Effects (% visual injury) of Compound A and 2,4-DB on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | 2,4-DB | | | | | | |
| | | 0 | 0 | 0 | 560 | 560 | 560 | 560 |
| BRSNW | Obs | 60 | 65 | 80 | 85 | 85 | 90 | 95 |
| | Exp | — | — | — | — | 94 | 95 | 97 |
| | △ | | | | | −9 | −5 | −2 |
| SASKR | Obs | 30 | 50 | 50 | 50 | 65 | 70 | 70 |
| | Exp | — | — | — | — | 65 | 75 | 75 |
| | △ | | | | | 0 | −5 | −5 |
| LAMPU | Obs | 65 | 70 | 75 | 10 | 80 | 85 | 85 |
| | Exp | — | — | — | — | 69 | 73 | 78 |
| | △ | | | | | 12 | 12 | 8 |
| VIOTR | Obs | 10 | 30 | 50 | 60 | 60 | 60 | 60 |
| | Exp | — | — | — | — | 64 | 72 | 80 |
| | △ | | | | | −4 | −12 | −20 |
| VIOAR | Obs | 10 | 10 | 15 | 30 | 20 | 20 | 25 |
| | Exp | — | — | — | — | 37 | 37 | 41 |
| | △ | | | | | −17 | −17 | −16 |
| VERVE | Obs | 80 | 85 | 95 | 60 | 85 | 90 | 95 |
| | Exp | — | — | — | — | 92 | 94 | 98 |
| | △ | | | | | −7 | −4 | −3 |
| PAPRH-R | Obs | 85 | 90 | 100 | 30 | 85 | 85 | 95 |
| | Exp | — | — | — | — | 90 | 93 | 100 |
| | △ | | | | | −5 | −8 | −5 |
| CENCY | Obs | 100 | 100 | 100 | 30 | 100 | 100 | 100 |
| | Exp | — | — | — | — | 100 | 100 | 100 |
| | △ | | | | | 0 | 0 | 0 |
| SINAR | Obs | 90 | 90 | 100 | 50 | 95 | 97 | 100 |
| | Exp | — | — | — | — | 95 | 95 | 100 |
| | △ | | | | | 0 | 2 | 0 |
| POLCO | Obs | 85 | 90 | 95 | 30 | 95 | 95 | 95 |
| | Exp | — | — | — | — | 90 | 93 | 97 |
| | △ | | | | | 6 | 2 | −2 |
| CAPBP | Obs | 50 | 50 | 85 | 30 | 85 | 90 | 95 |
| | Exp | — | — | — | — | 65 | 65 | 90 |
| | △ | | | | | 20 | 25 | 6 |
| STEME | Obs | 65 | 70 | 100 | 10 | 60 | 60 | 70 |
| | Exp | — | — | — | — | 69 | 73 | 100 |
| | △ | | | | | −9 | −13 | −30 |
| MATIN | Obs | 30 | 60 | 60 | 10 | 30 | 60 | 65 |
| | Exp | — | — | — | — | 37 | 64 | 64 |
| | △ | | | | | −7 | −4 | 1 |
| ANTAR | Obs | 95 | 100 | 100 | 10 | 85 | 100 | 100 |
| | Exp | — | — | — | — | 96 | 100 | 100 |
| | △ | | | | | −11 | 0 | 0 |
| MATMT | Obs | 5 | 5 | 15 | 5 | 15 | 20 | 50 |
| | Exp | — | — | — | — | 10 | 10 | 19 |
| | △ | | | | | 5 | 10 | 31 |
| MATCH | Obs | 15 | 20 | 20 | 10 | 50 | 60 | 65 |
| | Exp | — | — | — | — | 24 | 28 | 28 |
| | △ | | | | | 27 | 32 | 37 |
| VERHE | Obs | 65 | 75 | 80 | 60 | 65 | 70 | 75 |
| | Exp | — | — | — | — | 86 | 90 | 92 |
| | △ | | | | | −21 | −20 | −17 |
| PAPRH | Obs | 100 | 100 | 100 | 100 | 100 | 100 | 100 |
| | Exp | — | — | — | — | 100 | 100 | 100 |
| | △ | | | | | 0 | 0 | 0 |
| KCHSC | Obs | 70 | 75 | 80 | 30 | 80 | 85 | 90 |
| | Exp | — | — | — | — | 79 | 83 | 86 |
| | △ | | | | | 1 | 3 | 4 |
| CIRAR | Obs | 30 | 50 | 60 | 30 | 75 | 75 | 85 |
| | Exp | — | — | — | — | 51 | 65 | 72 |
| | △ | | | | | 24 | 10 | 13 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |

TABLE 29-continued

Herbicidal Effects (% visual injury) of Compound A and 2,4-DB on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | 2,4-DB | | | | | | |
| | | 0 | 0 | 0 | 560 | 560 | 560 | 560 |
| TRZAS | Obs | 0 | 0 | 0 | 0 | 0 | 0 | 0 |
| | Exp | — | — | — | — | 0 | 0 | 0 |
| | Δ | | | | | 0 | 0 | 0 |
| HORVW | Obs | 0 | 0 | 0 | 0 | 0 | 0 | 0 |
| | Exp | — | — | — | — | 0 | 0 | 0 |
| | Δ | | | | | 0 | 0 | 0 |
| HORVS | Obs | 0 | 0 | 0 | 0 | 0 | 0 | 0 |
| | Exp | — | — | — | — | 0 | 0 | 0 |
| | Δ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Triticum aestivum* (spring wheat)
HORVW = *Hordeum vulgare* (winter barley)
HORVS = *Hordeum vulgare* (spring barley)

Example 30

Compositions comprising Compound A and aminocyclopyrachlor were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 30 below.

TABLE 30

Herbicidal Effects (% visual injury) of Compound A and Aminocyclopyrachlor on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Aminocyclopyrachlor | | | | | | |
| | | 0 | 0 | 0 | 50 | 50 | 50 | 50 |
| BRSNW | Obs | 60 | 65 | 80 | 50 | 60 | 70 | 80 |
| | Exp | — | — | — | — | 80 | 83 | 90 |
| | Δ | | | | | −20 | −13 | −10 |
| SASKR | Obs | 30 | 50 | 50 | 75 | 80 | 85 | 85 |
| | Exp | — | — | — | — | 83 | 88 | 88 |
| | Δ | | | | | −3 | −3 | −3 |
| LAMPU | Obs | 65 | 70 | 75 | 65 | 90 | 95 | 95 |
| | Exp | — | — | — | — | 88 | 90 | 91 |
| | Δ | | | | | 2 | 6 | 4 |
| VIOTR | Obs | 10 | 30 | 50 | 30 | 20 | 60 | 60 |
| | Exp | — | — | — | — | 37 | 51 | 65 |
| | Δ | | | | | −17 | 9 | −5 |
| VIOAR | Obs | 10 | 10 | 15 | 25 | 15 | 20 | 40 |
| | Exp | — | — | — | — | 33 | 33 | 36 |
| | Δ | | | | | −18 | −13 | 4 |
| VERPE | Obs | 80 | 85 | 95 | 65 | 85 | 90 | 95 |
| | Exp | — | — | — | — | 93 | 95 | 98 |
| | Δ | | | | | −8 | −5 | −3 |
| PAPRH-R | Obs | 85 | 90 | 100 | 60 | 95 | 100 | 100 |
| | Exp | — | — | — | — | 94 | 96 | 100 |
| | Δ | | | | | 1 | 4 | 0 |
| CENCY | Obs | 100 | 100 | 100 | 100 | 100 | 100 | 100 |
| | Exp | — | — | — | — | 100 | 100 | 100 |
| | Δ | | | | | 0 | 0 | 0 |
| SINAR | Obs | 90 | 90 | 100 | 50 | 95 | 95 | 100 |
| | Exp | — | — | — | — | 95 | 95 | 100 |
| | Δ | | | | | 0 | 0 | 0 |
| POLCO | Obs | 85 | 90 | 95 | 70 | 75 | 80 | 100 |
| | Exp | — | — | — | — | 96 | 97 | 99 |
| | Δ | | | | | −21 | −17 | 2 |
| CAPBP | Obs | 50 | 50 | 85 | 70 | 85 | 95 | 95 |
| | Exp | — | — | — | — | 85 | 85 | 96 |
| | Δ | | | | | 0 | 10 | −1 |
| STEME | Obs | 65 | 70 | 100 | 30 | 100 | 100 | 100 |
| | Exp | — | — | — | — | 76 | 79 | 100 |
| | Δ | | | | | 25 | 21 | 0 |
| MATIN | Obs | 30 | 60 | 60 | 85 | 90 | 90 | 95 |
| | Exp | — | — | — | — | 90 | 94 | 94 |
| | Δ | | | | | 1 | −4 | 1 |
| ANTAR | Obs | 95 | 100 | 100 | 100 | 100 | 100 | 100 |
| | Exp | — | — | — | — | 100 | 100 | 100 |
| | Δ | | | | | 0 | 0 | 0 |
| MATMT | Obs | 5 | 5 | 15 | 50 | 65 | 70 | 90 |
| | Exp | — | — | — | — | 53 | 53 | 58 |
| | Δ | | | | | 13 | 18 | 33 |
| MATCH | Obs | 15 | 20 | 20 | 60 | 70 | 75 | 95 |
| | Exp | — | — | — | — | 66 | 68 | 68 |
| | Δ | | | | | 4 | 7 | 27 |
| VERHE | Obs | 65 | 75 | 80 | 60 | 85 | 85 | 95 |
| | Exp | — | — | — | — | 86 | 90 | 92 |
| | Δ | | | | | −1 | −5 | 3 |
| PAPRH | Obs | 100 | 100 | 100 | 75 | 95 | 100 | 100 |
| | Exp | — | — | — | — | 100 | 100 | 100 |
| | Δ | | | | | −5 | 0 | 0 |
| KCHSC | Obs | 70 | 75 | 80 | 100 | 100 | 100 | 100 |
| | Exp | — | — | — | — | 100 | 100 | 100 |
| | Δ | | | | | 0 | 0 | 0 |
| CIRAR | Obs | 30 | 50 | 60 | 85 | 95 | 95 | 95 |
| | Exp | — | — | — | — | 90 | 93 | 94 |
| | Δ | | | | | 6 | 3 | 1 |

TABLE 30-continued

Herbicidal Effects (% visual injury) of Compound A and Aminocyclopyrachlor on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Aminocyclopyrachlor | | | | | | |
| | | 0 | 0 | 0 | 50 | 50 | 50 | 50 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Trificum aestivum* (spring wheat)
HORVW = *Hordeum vulgare* (winter barley)
HORVS = *Hordeum vulgare* (spring barley)

Example 31

Compositions comprising Compound A and mecoprop were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 31 below.

TABLE 31

Herbicidal Effects (% visual injury) of Compound A and Mecoprop on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Mecoprop | | | | | | |
| | | 0 | 0 | 0 | 560 | 560 | 560 | 560 |
| BRSNW | Obs | 60 | 65 | 80 | 75 | 80 | 80 | 85 |
| | Exp | — | — | — | — | 90 | 91 | 95 |
| | △ | | | | | −10 | −11 | −10 |
| SASKR | Obs | 30 | 50 | 50 | 50 | 70 | 75 | 80 |
| | Exp | — | — | — | — | 65 | 75 | 75 |
| | △ | | | | | 5 | 0 | 5 |
| LAMPU | Obs | 65 | 70 | 75 | 10 | 85 | 85 | 90 |
| | Exp | — | — | — | — | 69 | 73 | 78 |
| | △ | | | | | 17 | 12 | 13 |
| VIOTR | Obs | 10 | 30 | 50 | 65 | 65 | 65 | 65 |
| | Exp | — | — | — | — | 69 | 76 | 83 |
| | △ | | | | | −4 | −11 | −18 |
| VIOAR | Obs | 10 | 10 | 15 | 10 | 10 | 10 | 10 |
| | Exp | — | — | — | — | 19 | 19 | 24 |
| | △ | | | | | −9 | −9 | −14 |
| VERPE | Obs | 80 | 85 | 95 | 30 | 85 | 90 | 95 |
| | Exp | — | — | — | — | 86 | 990 | 97 |
| | △ | | | | | −1 | 1 | −2 |
| PAPRH-R | Obs | 85 | 90 | 100 | 30 | 95 | 100 | 100 |
| | Exp | — | — | — | — | 90 | 93 | 100 |
| | △ | | | | | 6 | 7 | 0 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 95 | 97 | 97 | 97 |
| | Exp | — | — | — | — | 100 | 100 | 100 |
| | △ | | | | | −3 | −3 | −3 |
| POLCO | Obs | 85 | 90 | 95 | 20 | 95 | 95 | 95 |
| | Exp | — | — | — | — | 88 | 92 | 96 |
| | △ | | | | | 7 | 3 | −1 |
| CAPBP | Obs | 50 | 50 | 85 | 60 | 95 | 95 | 95 |
| | Exp | — | — | — | — | 80 | 80 | 94 |
| | △ | | | | | 15 | 15 | 1 |
| STEME | Obs | 65 | 70 | 100 | 30 | 70 | 95 | 100 |
| | Exp | — | — | — | — | 76 | 79 | 100 |
| | △ | | | | | −6 | 16 | 0 |
| MATIN | Obs | 30 | 60 | 60 | 65 | 65 | 65 | 85 |
| | Exp | — | — | — | — | 76 | 86 | 86 |
| | △ | | | | | −11 | −21 | −1 |
| ANTAR | Obs | 95 | 100 | 100 | 10 | 100 | 100 | 100 |
| | Exp | — | — | — | — | 96 | 100 | 100 |
| | △ | | | | | 5 | 0 | 0 |
| MATMT | Obs | 5 | 5 | 15 | 10 | 50 | 60 | 60 |
| | Exp | — | — | — | — | 15 | 15 | 24 |
| | △ | | | | | 36 | 46 | 37 |
| MATCH | Obs | 15 | 20 | 20 | 10 | 20 | 30 | 50 |
| | Exp | — | — | — | — | 24 | 28 | 28 |
| | △ | | | | | −4 | 2 | 22 |
| VERHE | Obs | 65 | 75 | 80 | 50 | 70 | 75 | 80 |
| | Exp | — | — | — | — | 83 | 88 | 90 |
| | △ | | | | | −13 | −13 | −10 |
| PAPRH | Obs | 100 | 100 | 100 | 65 | 90 | 100 | 100 |
| | Exp | — | — | — | — | 100 | 100 | 100 |
| | △ | | | | | −10 | 0 | 0 |
| KCHSC | Obs | 70 | 75 | 80 | 80 | 95 | 97 | 97 |
| | Exp | — | — | — | — | 94 | 95 | 96 |
| | △ | | | | | 1 | 2 | 1 |

TABLE 31-continued

Herbicidal Effects (% visual injury) of Compound A and Mecoprop on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Mecoprop | | | | | | |
| | | 0 | 0 | 0 | 560 | 560 | 560 | 560 |
| CIRAR | Obs | 30 | 50 | 60 | 70 | 70 | 70 | 75 |
| | Exp | — | — | — | — | 79 | 85 | 88 |
| | △ | | | | | −9 | −15 | −13 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVW | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Trificum aestivum* (spring wheat)
HORVW = *Hordeum vulgare* (winter barley)
HORVS = *Hordeum vulgare* (spring barley)

Example 32

Compositions comprising Compound A and dichlorprop were tested on undesirable vegetation species, including winter rape (BRSNW, *Brassica napus*), Russian thistle (SASKR, *Salsola kali*), purple deadnettle (LAMPU, *Lamium purpureum*), wild pansy (VIOTR, *Viola tricolor*), field violet VIOAR, *Viola arvensis*), bird's-eye speedwell (VERPE, *Veronica persica*), resistant corn poppy (PAPRH-R, *Papaver rhoeas*), cornflower (CENCY, *Cyanus segetum*), wild mustard (SINAR, *Sinapis arvensis*), wild buckwheat (POLCO, *Polygonum convolvulus*), shepherd's purse (CAPBP, *Capsella bursa-pastoris*), chickweed (STEME, *Stellaria media*), false chamomile (MATIN, *Matricaria inodora*), field chamomile (ANTAR, *Anthemis arvensis*), pineapple weed (MATMT, *Matricaria discoidea*), wild chamomile (MATCH, *Matricaria chamomilla*), ivyleaf speedwell (VERHE, *Veronica hederifolia*), corn poppy (PAPRH, *Papaver rhoeas*), kochia (KCHSC, *Kochia scoparia*), and Canadian thistle (CIRAR, *Cirsium arvense*), to determine the efficacy of the compositions on these undesirable vegetation species. The compositions were also tested on winter wheat (TRZAW), spring wheat (TRZAS), winter barley (HORVW), and spring barley (HORVS), and the phytotoxicity of the compositions on each crop was measured.

The results are summarized in Table 32 below.

TABLE 32

Herbicidal Effects (% visual injury) of Compound A and Dichlorprop on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Dichlorprop | | | | | | |
| | | 0 | 0 | 0 | 560 | 560 | 560 | 560 |
| BRSNW | Obs | 60 | 65 | 80 | 75 | 85 | 95 | 95 |
| | Exp | — | — | — | — | 90 | 91 | 95 |
| | △ | | | | | −5 | 4 | 0 |
| SASKR | Obs | 30 | 50 | 50 | 70 | 70 | 80 | 90 |
| | Exp | — | — | — | — | 79 | 85 | 85 |
| | △ | | | | | −9 | −5 | 5 |
| LAMPU | Obs | 65 | 70 | 75 | 30 | 85 | 90 | 90 |
| | Exp | — | — | — | — | 76 | 79 | 83 |
| | △ | | | | | 10 | 11 | 8 |
| VIOTR | Obs | 10 | 30 | 50 | 85 | 95 | 95 | 95 |
| | Exp | — | — | — | — | 87 | 90 | 93 |
| | △ | | | | | 9 | 6 | 3 |
| VIOAR | Obs | 10 | 10 | 15 | 25 | 15 | 30 | 30 |
| | Exp | — | — | — | — | 33 | 33 | 36 |
| | △ | | | | | −18 | −3 | −6 |
| VERVE | Obs | 80 | 85 | 95 | 30 | 85 | 90 | 95 |
| | Exp | — | — | — | — | 86 | 90 | 97 |
| | △ | | | | | −1 | 1 | −2 |
| PAPRH-R | Obs | 85 | 90 | 100 | 30 | 95 | 100 | 100 |
| | Exp | — | — | — | — | 90 | 93 | 100 |
| | △ | | | | | 6 | 7 | 0 |
| CENCY | Obs | 100 | 100 | 100 | 100 | 100 | 100 | 100 |
| | Exp | — | — | — | — | 100 | 100 | 100 |
| | △ | | | | | 0 | 0 | 0 |
| SINAR | Obs | 90 | 90 | 100 | 100 | 100 | 100 | 100 |
| | Exp | — | — | — | — | 100 | 100 | 100 |
| | △ | | | | | 0 | 0 | 0 |
| POLCO | Obs | 85 | 90 | 95 | 95 | 100 | 100 | 100 |
| | Exp | — | — | — | — | 99 | 100 | 100 |
| | △ | | | | | 1 | 1 | 0 |
| CAPBP | Obs | 50 | 50 | 85 | 70 | 90 | 97 | 97 |
| | Exp | — | — | — | — | 85 | 85 | 96 |
| | △ | | | | | 5 | 12 | 2 |
| STEME | Obs | 65 | 70 | 100 | 30 | 70 | 70 | 70 |
| | Exp | — | — | — | — | 76 | 79 | 100 |
| | △ | | | | | −6 | −9 | −30 |
| MATIN | Obs | 30 | 60 | 60 | 60 | 70 | 80 | 90 |
| | Exp | — | — | — | — | 72 | 84 | 84 |
| | △ | | | | | −2 | −4 | 6 |
| ANTAR | Obs | 95 | 100 | 100 | 95 | 100 | 100 | 100 |
| | Exp | — | — | — | — | 100 | 100 | 100 |
| | △ | | | | | 0 | 0 | 0 |
| MATMT | Obs | 5 | 5 | 15 | 10 | 30 | 30 | 30 |
| | Exp | — | — | — | — | 15 | 15 | 24 |
| | △ | | | | | 16 | 16 | 7 |
| MATCH | Obs | 15 | 20 | 20 | 50 | 60 | 60 | 70 |
| | Exp | — | — | — | — | 58 | 60 | 60 |
| | △ | | | | | 3 | 0 | 10 |
| VERHE | Obs | 65 | 75 | 80 | 60 | 80 | 85 | 90 |
| | Exp | — | — | — | — | 86 | 90 | 92 |
| | △ | | | | | −6 | −5 | −2 |
| PAPRH | Obs | 100 | 100 | 100 | 65 | 100 | 100 | 100 |
| | Exp | — | — | — | — | 100 | 100 | 100 |
| | △ | | | | | 0 | 0 | 0 |
| KCHSC | Obs | 70 | 75 | 80 | 75 | 95 | 95 | 95 |
| | Exp | — | — | — | — | 93 | 94 | 95 |
| | △ | | | | | 3 | 1 | 0 |
| CIRAR | Obs | 30 | 50 | 60 | 75 | 75 | 75 | 80 |
| | Exp | — | — | — | — | 83 | 88 | 90 |
| | △ | | | | | −8 | −13 | −10 |

TABLE 32-continued

Herbicidal Effects (% visual injury) of Compound A and Dichlorprop on weed and grain crops.

| | | Application rate (g/ha) Compound A | | | | | | |
|---|---|---|---|---|---|---|---|---|
| | | 7.5 | 10 | 15 | 0 | 7.5 | 10 | 15 |
| | | Dichlorprop | | | | | | |
| | | 0 | 0 | 0 | 560 | 560 | 560 | 560 |
| TRZAW | Obs | 0 | 0 | 0 | 0 | 0 | 0 | 0 |
| | Exp | — | — | — | — | 0 | 0 | 0 |
| | △ | | | | | 0 | 0 | 0 |
| TRZAS | Obs | 0 | 0 | 0 | 0 | 0 | 0 | 0 |
| | Exp | — | — | — | — | 0 | 0 | 0 |
| | △ | | | | | 0 | 0 | 0 |
| HORVVV | Obs | 0 | 0 | 0 | 0 | 0 | 0 | 0 |
| | Exp | — | — | — | — | 0 | 0 | 0 |
| | △ | | | | | 0 | 0 | 0 |
| HORVS | Obs | 0 | 0 | 0 | 0 | 0 | 0 | 0 |
| | Exp | — | — | — | — | 0 | 0 | 0 |
| | △ | | | | | 0 | 0 | 0 |

g/ha = grams per hectare
BRSNW = *Brassica napus* (winter rape)
SASKR = *Salsola kali* (Russian thistle)
LAMPU = *Lamium purpureum* (purple deadnettle)
VIOTR = *Viola tricolor* (wild pansy)
VIOAR = *Viola arvensis* (field violet)
VERPE = *Veronica persica* (bird's-eye speedwell)
PAPRH-R = *Papaver rhoeas* (corn poppy), herbicide-resistant
CENCY = *Cyanus segetum* (cornflower)
SINAR = *Sinapis arvensis* (wild mustard)
POLCO = *Polygonum convolvulus* (wild buckwheat)
CAPBP = *Capsella bursa-pastoris* (shepherd's purse)
STEME = *Stellaria media* (chickweed)
MATIN = *Matricaria inodora* (false chamomile)
ANTAR = *Anthemis arvensis* (field chamomile)
MATMT = *Matricaria discoidea* (pineapple weed)
MATCH = *Matricaria chamomilla* (wild chamomile)
VERHE = *Veronica hederifolia* (ivyleaf speedwell)
PAPRH = *Papaver rhoeas* (corn poppy)
KCHSC = *Kochia scoparia* (kochia)
CIRAR = *Cirsium arvense* (Canadian thistle)
TRZAW = *Triticum aestivum* (winter wheat)
TRZAS = *Trificum aestivum* (spring wheat)
HORVW = *Hordeum vulgare* (winter barley)
HORVS = *Hordeum vulgare* (spring barley)

Example 33

Compositions comprising Compound A and halauxifen-methyl were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 33 below.

TABLE 33

Herbicidal Effects (% visual injury) of Compound A and Halauxifen-methyl on weed and grain crops.

| | | Application rate (g/ha) Compound A | | | | |
|---|---|---|---|---|---|---|
| | | 7.5 | 10 | 0 | 7.5 | 10 |
| | | Halatvcifen-methyl | | | | |
| | | 0 | 0 | 3 | 3 | 3 |
| AMARE | Obs | 90 | 85 | 68 | 98 | 98 |
| | Exp | — | — | — | 97 | 95 |
| | △ | | | | 1 | 2 |
| BRSNW | Obs | 35 | 40 | 15 | 65 | 60 |
| | Exp | — | — | — | 45 | 49 |
| | △ | | | | 20 | 11 |
| CHEAL | Obs | 75 | 80 | 83 | 85 | 88 |
| | Exp | — | — | — | 96 | 97 |
| | △ | | | | −11 | −9 |
| CIRAR | Obs | 40 | 55 | 10 | 78 | 78 |
| | Exp | — | — | — | 46 | 60 |
| | △ | | | | 32 | 18 |
| KCHSC | Obs | 70 | 70 | 40 | 90 | 85 |
| | Exp | — | — | — | 82 | 82 |
| | △ | | | | 8 | 3 |
| MATCH | Obs | 10 | 20 | 5 | 68 | 65 |
| | Exp | — | — | — | 15 | 24 |
| | △ | | | | 53 | 41 |
| POLCO | Obs | 30 | 43 | 20 | 65 | 73 |
| | Exp | — | — | — | 44 | 54 |
| | △ | | | | 21 | 19 |
| SASKR | Obs | 60 | 63 | 73 | 80 | 80 |
| | Exp | — | — | — | 89 | 90 |
| | △ | | | | −9 | −10 |
| SINAR | Obs | 83 | 88 | 40 | 89 | 90 |
| | Exp | — | — | — | 90 | 93 |
| | △ | | | | −1 | −3 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album* L. (common labsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Trificum aestivum* (spring wheat)

Example 34

Compositions comprising Compound A and florpyrauxifen-benzyl were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 34 below.

TABLE 34

Herbicidal Effects (% visual injury) of Compound A and Florpyrauxifen-benzyl on weed and grain crops.

| Application rate (g/ha) | Compound A<br>Florpyrauxifen-benzyl | 7.5<br>0 | 10<br>0 | 0<br>7.5 | 7.5<br>7.5 | 10<br>7.5 |
|---|---|---|---|---|---|---|
| AMARE | Obs | 90 | 85 | 73 | 95 | 97 |
| | Exp | — | — | — | 97 | 96 |
| | △ | | | | −2 | 1 |
| BRSNW | Obs | 35 | 40 | 15 | 53 | 68 |
| | Exp | — | — | — | 45 | 49 |
| | △ | | | | 8 | 19 |
| CHEAL | Obs | 75 | 80 | 85 | 90 | 90 |
| | Exp | — | — | — | 96 | 97 |
| | △ | | | | −6 | −7 |
| CIRAR | Obs | 40 | 55 | 63 | 73 | 85 |
| | Exp | — | — | — | 78 | 83 |
| | △ | | | | −5 | 2 |
| KCHSC | Obs | 70 | 70 | 63 | 83 | 90 |
| | Exp | — | — | — | 89 | 89 |
| | △ | | | | −6 | 1 |
| MATCH | Obs | 10 | 20 | 25 | 73 | 75 |
| | Exp | — | — | — | 33 | 40 |
| | △ | | | | 40 | 35 |
| POLCO | Obs | 30 | 43 | 55 | 78 | 70 |
| | Exp | — | — | — | 69 | 75 |
| | △ | | | | 9 | −4 |
| SASKR | Obs | 60 | 63 | 73 | 85 | 83 |
| | Exp | — | — | — | 89 | 90 |
| | △ | | | | −4 | −7 |
| SINAR | Obs | 83 | 88 | 50 | 85 | 90 |
| | Exp | — | — | — | 91 | 94 |
| | △ | | | | −6 | −4 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Trificum aestivum* (spring wheat)

Example 35

Compositions comprising Compound B and dicamba were tested on undesirable vegetation species, including pigweed (AMARE, *Amaranthus retroflexus*), wild chamomile (MATCH, *Matricaria chamomilla*), and winter rape (BRSNW, *Brassica napus*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 35 below.

TABLE 35

Herbicidal Effects (% visual injury) of Compound B and Dicamba on weed and grain crops.

| Application rate (g/ha) | Compound B<br>Dicamba | 7.5<br>0 | 10<br>0 | 0<br>140 | 7.5<br>140 | 10<br>140 |
|---|---|---|---|---|---|---|
| AMARE | Obs | 75 | 84 | 60 | 93 | 100 |
| | Exp | — | — | — | 90 | 94 |
| | △ | | | | 3 | 6 |
| MATCH | Obs | 20 | 18 | 3 | 63 | 65 |
| | Exp | — | — | — | 22 | 20 |
| | △ | | | | 41 | 45 |
| BRSNW | Obs | 58 | 73 | 23 | 68 | 85 |
| | Exp | — | — | — | 67 | 79 |
| | △ | | | | 0 | 6 |
| TRZAS | Obs | 0 | 0 | 0 | 3 | 0 |
| | Exp | — | — | — | 0 | 0 |
| | △ | | | | 3 | 0 |
| HORVS | Obs | 0 | 0 | 10 | 8 | 0 |
| | Exp | — | — | — | 10 | 10 |
| | △ | | | | −3 | −10 |

g/ha = grams per hectare
AMARE = *Amaranthus retroflexus* (pigweed)
MATCH = *Matricaria chamomilla* (wild chamomile)
BRSNW = *Brassica napus* (winter rape)
TRZAS = *Trificum aestivum* (spring wheat)
HORVS = *Hordeum vulgare* (spring barley)

Example 36

Compositions comprising Compound B and 2,4-D-EHE were tested on undesirable vegetation species, including winter rape (BRSNW, *Brassica napus*), wild buckwheat (POLCO, *Polygonum convolvulus*), pigweed (AMARE, *Amaranthus retroflexus*), and Canadian thistle (CIRAR, *Cirsium arvense*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 36 below.

TABLE 36

Herbicidal Effects (% visual injury) of Compound B and 2,4-D-EHE on weed and grain crops.

| Application rate (g/ha) | Compound B<br>2,4-D-EHE | 7.5<br>0 | 10<br>0 | 0<br>280 | 7.5<br>280 | 10<br>280 |
|---|---|---|---|---|---|---|
| BRSNW | Obs | 58 | 73 | 65 | 89 | 99 |
| | Exp | — | — | — | 85 | 90 |
| | △ | | | 3 | 8 | |
| POLCO | Obs | 70 | 97 | 23 | 88 | 88 |
| | Exp | — | — | — | 77 | 98 |
| | △ | | | 11 | −10 | |
| AMARE | Obs | 75 | 84 | 45 | 93 | 93 |
| | Exp | — | — | — | 86 | 91 |
| | △ | | | | 6 | 1 |
| CIRAR | Obs | 18 | 25 | 45 | 68 | 73 |
| | Exp | — | — | — | 55 | 59 |
| | △ | | | | 13 | 14 |
| TRZAS | Obs | 0 | 0 | 0 | 0 | 0 |
| | Exp | — | — | — | 0 | 0 |
| | △ | | | | 0 | 0 |

TABLE 36-continued

Herbicidal Effects (% visual injury) of Compound B and 2,4-D-EHE on weed and grain crops.

| Application rate (g/ha) | Compound B<br>2,4-D-EHE | 7.5<br>0 | 10<br>0 | 0<br>280 | 7.5<br>280 | 10<br>280 |
|---|---|---|---|---|---|---|
| HORVS | Obs | 0 | 0 | 0 | 0 | 5 |
| | Exp | — | — | — | 0 | 0 |
| | △ | | | | 0 | 5 |

g/ha = grams per hectare
BRSNW = *Brassica napus* (winter rape)
POLCO = *Polygonum convolvulus* (wild buckwheat)
AMARE = *Amaranthus retroflexus* (pigweed)
CIRAR = *Cirsium arvense* (Canadian thistle)
TRZAS = *Trificum aestivum* (spring wheat)
HORVS = *Hordeum vulgare* (spring barley)

Example 37

Compositions comprising Compound B and MCPA-DMA were tested on undesirable vegetation species, including winter rape (BRSNW, *Brassica napus*) and Canadian thistle (CIRAR, *Cirsium arvense*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 37 below.

TABLE 37

Herbicidal Effects (% visual injury) of Compound B and MCPA-DMA on weed and grain crops.

| Application rate (g/ha) | Compound B<br>MCPA-DMA | 7.5<br>0 | 10<br>0 | 0<br>400 | 7.5<br>400 | 10<br>400 |
|---|---|---|---|---|---|---|
| BRSNW | Obs | 58 | 73 | 83 | 100 | 100 |
| | Exp | — | — | — | 93 | 95 |
| | △ | | | | 7 | 5 |
| CIRAR | Obs | 18 | 25 | 60 | 65 | 78 |
| | Exp | — | — | — | 67 | 70 |
| | △ | | | | −2 | 8 |
| TRZAS | Obs | 0 | 0 | 0 | 0 | 0 |
| | Exp | — | — | — | 0 | 0 |
| | △ | | | | 0 | 0 |
| HORVS | Obs | 0 | 0 | 0 | 0 | 0 |
| | Exp | — | — | — | 0 | 0 |
| | △ | | | | 0 | 0 |

g/ha = grams per hectare
BRSNW = *Brassica napus* (winter rape)
CIRAR = *Cirsium arvense* (Canadian thistle)
TRZAS = *Trificum aestivum* (spring wheat)
HORVS = *Hordeum vulgare* (spring barley)

Example 38

Compositions comprising Compound B and fluroxypyr were tested on undesirable vegetation species, including pineapple weed (MATMT, *Matricaria discoidea*) and herbicide-resistant corn poppy (PAPRH-R, *Papaver rhoeas*), to determine the efficacy of the compositions on these undesirable vegetation species.

The results are summarized in Table 38 below.

TABLE 38

Herbicidal Effects (% visual injury) of Compound B and Fluroxypyr on weeds.

| Application rate (g/ha) | Compound B<br>Fluroxypyr | 10<br>0 | 0<br>70 | 0<br>100 | 10<br>70 | 10<br>100 |
|---|---|---|---|---|---|---|
| MATMT | Obs | 20 | 10 | 10 | 35 | 35 |
| | Exp | — | — | — | 28 | 28 |
| | △ | | | | 7 | 7 |
| PAPRH-R | Obs | 95 | 25 | 25 | 100 | 100 |
| | Exp | — | — | — | 96 | 96 |
| | △ | | | | 4 | 4 |

g/ha = grams per hectare
MATMT = *Matricaria discoidea* (pineapple weed)
PAPRH-R = *Papaver rhoeas* (corn poppy), herbicide-resistant

Example 39

Compositions comprising Compound B and triclopyr were tested on undesirable vegetation species, including bird's-eye speedwell (VERPE, *Veronica persica*), ivyleaf speedwell (VERHE, *Veronica hederifolia*), herbicide-resistant corn poppy (PAPRH-R, *Papaver rhoeas*), winter rape (BRSNW, *Brassica napus*), wild chamomile (MATCH, *Matricaria chamomilla*), and pineapple weed (MATMT, *Matricaria discoidea*), to determine the efficacy of the compositions on these undesirable vegetation species.

The results are summarized in Table 39 below.

TABLE 39

Herbicidal Effects (% visual injury) of Compound B and Triclopyr on weeds.

| Application rate (g/ha) | Compound B<br>Triclopyr | 10<br>0 | 0<br>45 | 0<br>60 | 10<br>45 | 10<br>60 |
|---|---|---|---|---|---|---|
| VERVE | Obs | 80 | 0 | 0 | 85 | 85 |
| | Exp | — | — | — | 80 | 80 |
| | △ | | | | 5 | 5 |
| VERHE | Obs | 70 | 10 | 15 | 75 | 80 |
| | Exp | — | — | — | 73 | 75 |
| | △ | | | | 2 | 6 |
| PAPRH-R | Obs | 95 | 10 | 10 | 100 | 100 |
| | Exp | — | — | — | 96 | 96 |
| | △ | | | | 5 | 5 |
| BRSNW | Obs | 93 | 10 | 10 | 95 | 100 |
| | Exp | — | — | — | 94 | 94 |
| | △ | | | | 1 | 6 |
| MATCH | Obs | 20 | 10 | 10 | 20 | 65 |
| | Exp | — | — | — | 28 | 28 |
| | △ | | | | −8 | 37 |
| MATMT | Obs | 20 | 20 | 25 | 100 | 95 |
| | Ex | — | — | — | 36 | 40 |
| | △ | | | | 64 | 55 |

g/ha = grams per hectare
VERPE = *Veronica persica* (bird's-eye speedwell)
VERHE = *Veronica hederifolia* (ivyleaf speedwell)
PAPRH-R = *Papaver rhoeas* (corn poppy), herbicide-resistant
BRSNW = *Brassica napus* (winter rape)
MATCH = *Matricaria chamomilla* (wild chamomile)
MATMT = *Matricaria discoidea* (pineapple weed)

Example 40

Compositions comprising Compound B and dichlorprop-potassium (dichlorprop-K) were tested on undesirable vegetation species, including velvetleaf (ABUTH, *Abutilon theophrasti*), pigweed (AMARE, *Amaranthus retroflexus*), common lambsquarters (CHEAL, *Chenopodium album* L.), Canadian thistle (CIRAR, *Cirsium arvense*), volunteer soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), wild buckwheat (POLCO, *Polygonum convolvulus*), broad-leaf dock (RUMOB, *Rumex obtusifolius*), chickweed (STEME, *Stellaria media*), and wild pansy (VIOTR, *Viola tricolor*), to determine the efficacy of the compositions on these undesirable vegetation species.

The results are summarized in Table 40 below.

TABLE 40

Herbicidal Effects (% visual injury) of Compound B and Dichlorprop-K on weeds.

| Application rate (g/ha) | Compound B Dichlorprop-K | 7.5 0 | 10 0 | 0 280 | 7.5 280 | 10 280 |
|---|---|---|---|---|---|---|
| ABUTH | Obs | 45 | 68 | 40 | 73 | 93 |
| | Exp | — | — | — | 67 | 81 |
| | △ | | | | 6 | 12 |
| AMARE | Obs | 60 | 73 | 10 | 93 | 93 |
| | Exp | — | — | — | 64 | 75 |
| | △ | | | | 29 | 17 |
| CHEAL | Obs | 80 | 93 | 60 | 75 | 93 |
| | Exp | — | — | — | 92 | 97 |
| | △ | | | | −17 | −5 |
| CIRAR | Obs | 18 | 55 | 63 | 70 | 68 |
| | Exp | — | — | — | 69 | 83 |
| | △ | | | | 1 | −16 |
| GLXMA | Obs | 68 | 73 | 33 | 85 | 98 |
| | Exp | — | — | — | 78 | 91 |
| | △ | | | | 7 | 16 |
| HELAN | Obs | 98 | 100 | 90 | 100 | 100 |
| | Exp | — | — | — | 100 | 100 |
| | △ | | | | 0 | 0 |
| IPOHE | Obs | 0 | 0 | 75 | 85 | 85 |
| | Exp | — | — | — | 75 | 75 |
| | △ | | | | 10 | 10 |
| KCHSC | Obs | 65 | 73 | 63 | 90 | 90 |
| | Exp | — | — | — | 87 | 90 |
| | △ | | | | 3 | 0 |
| POLCO | Obs | 75 | 90 | 0 | 100 | 100 |
| | Exp | — | — | — | 75 | 90 |
| | △ | | | | 25 | 10 |
| RUMOB | Obs | 10 | 15 | 73 | 100 | 98 |
| | Exp | — | — | — | 75 | 77 |
| | △ | | | | 25 | 21 |
| STEME | Obs | 58 | 90 | 0 | 73 | 85 |
| | Exp | — | — | — | 58 | 90 |
| | △ | | | | 15 | −5 |
| VIOTR | Obs | 3 | 8 | 65 | 65 | 65 |
| | Exp | — | — | — | 66 | 68 |
| | △ | | | | −1 | −3 |

g/ha = grams per hectare
ABUTH = *Abutilon theophrasti* (velvetleaf)
AMARE = *Amaranthus retroflexus* (pigweed)
CHEAL = *Chenopodium album L.* (common lambsquarters)
CIRAR = *Cirsium arvense* (Canadian thistle)
GLXMA = Glycine max (soybean)
HELAN = *Helianthus annuus* (common sunflower)
IPOHE = *Ipomoea hederacea* (ivyleaf morningglory)
KCHSC = *Kochia scoparia* (kochia)
POLCO = *Polygonum convolvulus* (wild buckwheat)
RUMOB = *Rumex obtusifolius* (broad-leaf dock)
STEME = *Stellaria media* (chickweed)
VIOTR = Viola tricolor (wild pansy)

Example 41

Compositions comprising Compound B and MCPA-2-ethylhexyl (MCPA EHE) were tested on undesirable vegetation species, including velvetleaf (ABUTH, *Abutilon theophrasti*), pigweed (AMARE, *Amaranthus retroflexus*), common lambsquarters (CHEAL, *Chenopodium album* L.), Canadian thistle (CIRAR, *Cirsium arvense*), volunteer soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), wild buckwheat (POLCO, *Polygonum convolvulus*), broad-leaf dock (RUMOB, *Rumex obtusifolius*), chickweed (STEME, *Stellaria media*), and wild pansy (VIOTR, *Viola tricolor*), to determine the efficacy of the compositions on these undesirable vegetation species.

The results are summarized in Table 41 below.

TABLE 41

Herbicidal Effects (% visual injury) of Compound B and MCPA EHE on weeds.

| Application rate (g/ha) | Compound B MCPA EHE | 7.5 0 | 10 0 | 0 280 | 7.5 280 | 10 280 |
|---|---|---|---|---|---|---|
| ABUTH | Obs | 45 | 68 | 5 | 65 | 73 |
| | Exp | — | — | — | 48 | 69 |
| | △ | | | | 17 | 3 |
| AMARE | Obs | 60 | 73 | 30 | 95 | 100 |
| | Exp | — | — | — | 72 | 81 |
| | △ | | | | 23 | 19 |
| CHEAL | Obs | 80 | 93 | 73 | 85 | 98 |
| | Exp | — | — | — | 95 | 98 |
| | △ | | | | −10 | 0 |
| CIRAR | Obs | 18 | 55 | 23 | 68 | 78 |
| | Exp | — | — | — | 36 | 65 |
| | △ | | | | 31 | 13 |
| GLXMA | Obs | 68 | 73 | 30 | 85 | 90 |
| | Exp | — | — | — | 77 | 81 |
| | △ | | | | 8 | 9 |
| HELAN | Obs | 98 | 100 | 90 | 100 | 100 |
| | Exp | — | — | — | 100 | 100 |
| | △ | | | | 0 | 0 |
| IPOHE | Obs | 0 | 0 | 78 | 78 | 85 |
| | Exp | — | — | — | 78 | 78 |
| | △ | | | | 0 | 8 |
| KCHSC | Obs | 65 | 73 | 0 | 85 | 90 |
| | Exp | — | — | — | 65 | 73 |
| | △ | | | | 20 | 18 |
| POLCO | Obs | 75 | 90 | 0 | 98 | 98 |
| | Exp | — | — | — | 75 | 90 |
| | △ | | | | 23 | 8 |
| RUMOB | Obs | 10 | 15 | 25 | 70 | 73 |
| | Exp | — | — | — | 33 | 36 |
| | △ | | | | 38 | 36 |
| STEME | Obs | 58 | 90 | 0 | 80 | 85 |
| | Exp | — | — | — | 58 | 90 |
| | △ | | | | 23 | −5 |
| VIOTR | Obs | 3 | 8 | 0 | 45 | 58 |
| | Exp | — | — | — | 3 | 8 |
| | △ | | | | 43 | 50 |

g/ha = grams per hectare
ABUTH = *Abutilon theophrasti* (velvetleaf)
AMARE = *Amaranthus retroflexus* (pigweed)
CHEAL = *Chenopodium album L.* (common lambsquarters)
CIRAR = *Cirsium arvense* (Canadian thistle)
GLXMA = Glycine max (soybean)
HELAN = *Helianthus annuus* (common sunflower)
IPOHE = *Ipomoea hederacea* (ivyleaf morningglory)
KCHSC = *Kochia scoparia* (kochia)
POLCO = *Polygonum convolvulus* (wild buckwheat)
RUMOB = *Rumex obtusifolius* (broad-leaf dock)
STEME = *Stellaria media* (chickweed)
VIOTR = Viola tricolor (wild pansy)

Example 42

Compositions comprising Compound A, halauxifen-methyl, and 2,4-D-dimethylammonium (2,4-D DMA) were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium*

*arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 42 below. In the table, an application rate of "X+Y" indicates that the application rate of halauxifen-methyl is "X" and 2,4-D DMA is "Y."

TABLE 42

Herbicidal Effects (% visual injury) of Compound A and Halauxifen-methyl + 2,4-D DMA on weed and grain crops.

| Application rate (g/ha) | Compound A<br>Halauxifen-methyl + 2,4-D DMA | 7.5<br>0 | 10<br>0 | 0<br>6 + 480 | 7.5<br>6 + 480 | 10<br>6 + 480 |
|---|---|---|---|---|---|---|
| AMARE | Obs | 100 | 100 | 93 | 100 | 100 |
| | Exp | — | — | — | 100 | 100 |
| | △ | | | | 0 | 0 |
| BRSNN | Obs | 55 | 55 | 90 | 100 | 100 |
| | Exp | — | — | — | 95 | 95 |
| | △ | | | | 5 | 5 |
| CHEAL | Obs | 83 | 88 | 78 | 98 | 97 |
| | Exp | — | — | — | 96 | 97 |
| | △ | | | | 1 | −1 |
| CIRAR | Obs | 18 | 20 | 73 | 80 | 80 |
| | Exp | — | — | — | 77 | 78 |
| | △ | | | | 3 | 2 |
| KCHSC | Obs | 55 | 65 | 25 | 75 | 93 |
| | Exp | — | — | — | 66 | 74 |
| | △ | | | | 9 | 19 |
| MATCH | Obs | 20 | 13 | 20 | 28 | 18 |
| | Exp | — | — | — | 36 | 30 |
| | △ | | | | −9 | −13 |
| POLCO | Obs | 93 | 91 | 82 | 100 | 100 |
| | Exp | — | — | — | 99 | 98 |
| | △ | | | | 1 | 2 |
| SASKR | Obs | 63 | 65 | 68 | 68 | 73 |
| | Exp | — | — | — | 88 | 89 |
| | △ | | | | −20 | −16 |
| SINAR | Obs | 100 | 100 | 100 | 100 | 100 |
| | Exp | — | — | — | 100 | 100 |
| | △ | | | | 0 | 0 |
| HORVS | Obs | 0 | 0 | 0 | 8 | 0 |
| | Exp | — | — | — | 0 | 0 |
| | △ | | | | 8 | 0 |
| TRZAS | Obs | 0 | 0 | 0 | 5 | 10 |
| | Exp | — | — | — | 0 | 0 |
| | △ | | | | 5 | 10 |

g/ha = grams per hectare

AMARE = *Amaranthus retroflexus* (pigweed)

BRSNN = *Brassica napus* (spring rape)

CHEAL = *Chenopodium album L.* (common lambsquarters)

CIRAR = *Cirsium arvense* (Canadian thistle)

KCHSC = *Kochia scoparia* (kochia)

MATCH = *Matricaria chamomilla* (wild chamomile)

POLCO = *Polygonum convolvulus* (wild buckwheat)

SASKR = *Salsola kali* (Russian thistle)

SINAR = *Sinapis arvensis* (wild mustard)

HORVS = *Hordeum vulgare* (spring barley)

TRZAS = *Trificum aestivum* (spring wheat)

Example 43

Compositions comprising Compound A, halauxifen-methyl, and aminopyralid were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 43 below. In the table, an application rate of "X+Y" indicates that the application rate of halauxifen-methyl is "X" and aminopyralid is "Y."

TABLE 43

Herbicidal Effects (% visual injury) of Compound A and Halauxifen-methyl + Aminopyralid on weed and grain crops.

| Application rate (g/ha) | Compound A<br>Halauxifen-methyl + Aminopyralid | 7.5<br>0 | 10<br>0 | 0<br>6 + 5 | 7.5<br>6 + 5 | 10<br>6 + 5 |
|---|---|---|---|---|---|---|
| AMARE | Obs | 100 | 100 | 85 | 100 | 100 |
| | Exp | — | — | — | 100 | 100 |
| | △ | | | | 0 | 0 |
| BRSNN | Obs | 55 | 55 | 18 | 65 | 80 |
| | Exp | — | — | — | 63 | 63 |
| | △ | | | | 2 | 17 |
| CHEAL | Obs | 83 | 88 | 94 | 100 | 98 |
| | Exp | — | — | — | 99 | 99 |
| | △ | | | | 1 | −2 |
| CIRAR | Obs | 18 | 20 | 65 | 85 | 85 |
| | Exp | — | — | — | 71 | 72 |
| | △ | | | | 14 | 13 |
| KCHSC | Obs | 55 | 65 | 20 | 83 | 82 |
| | Exp | — | — | — | 64 | 72 |
| | △ | | | | 19 | 10 |
| MATCH | Obs | 20 | 13 | 10 | 91 | 96 |
| | Exp | — | — | — | 28 | 21 |
| | △ | | | | 63 | 75 |
| POLCO | Obs | 93 | 91 | 90 | 99 | 100 |
| | Exp | — | — | — | 99 | 99 |
| | △ | | | | −1 | 1 |
| SASKR | Obs | 63 | 65 | 63 | 65 | 78 |
| | Exp | — | — | — | 86 | 87 |
| | △ | | | | −21 | −9 |
| SINAR | Obs | 100 | 100 | 75 | 100 | 100 |
| | Exp | — | — | — | 100 | 100 |
| | △ | | | | 0 | 0 |
| HORVS | Obs | 0 | 0 | 0 | 0 | 0 |
| | Exp | — | — | — | 0 | 0 |
| | △ | | | | 0 | 0 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNN = *Brassica napus* (spring rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Trificum aestivum* (spring wheat)

Example 44

Compositions comprising Compound A, clopyralid, and MCPA were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 44 below. In the table, an application rate of "X+Y" indicates that the application rate of clopyralid is "X" and MCPA is "Y."

TABLE 44

Herbicidal Effects (% visual injury) of Compound A and Clopyralid + MCPA on weed and grain crops.

| Application rate (g/ha) | Compound A<br>Clopyralid + MCPA | 7.5<br>0 | 10<br>0 | 0<br>75 + 350 | 7.5<br>75 + 350 | 10<br>75 + 350 |
|---|---|---|---|---|---|---|
| AMARE | Obs | 100 | 100 | 68 | 100 | 100 |
| | Exp | — | — | — | 100 | 100 |
| | △ | | | | 0 | 0 |
| BRSNN | Obs | 55 | 55 | 82 | 100 | 100 |
| | Exp | — | — | — | 92 | 92 |
| | △ | | | | 8 | 8 |
| CHEAL | Obs | 83 | 88 | 75 | 100 | 100 |
| | Exp | — | — | — | 96 | 97 |
| | △ | | | | 4 | 3 |
| CIRAR | Obs | 18 | 20 | 85 | 95 | 96 |
| | Exp | — | — | — | 88 | 88 |
| | △ | | | | 7 | 8 |
| KCHSC | Obs | 55 | 65 | 5 | 95 | 96 |
| | Exp | — | — | — | 57 | 67 |
| | △ | | | | 38 | 29 |
| MATCH | Obs | 20 | 13 | 15 | 90 | 86 |
| | Exp | — | — | — | 32 | 26 |
| | △ | | | | 58 | 60 |
| POLCO | Obs | 93 | 91 | 63 | 100 | 100 |
| | Exp | — | — | — | 97 | 97 |
| | △ | | | | 3 | 3 |
| SASKR | Obs | 63 | 65 | 0 | 70 | 70 |
| | Exp | — | — | — | 63 | 65 |
| | △ | | | | 8 | 5 |
| SINAR | Obs | 100 | 100 | 95 | 100 | 100 |
| | Exp | — | — | — | 100 | 100 |
| | △ | | | | 0 | 0 |
| HORVS | Obs | 0 | 0 | 0 | 0 | 0 |
| | Exp | — | — | — | 0 | 0 |
| | △ | | | | 0 | 0 |

TABLE 44-continued

Herbicidal Effects (% visual injury) of Compound A and Clopyralid + MCPA on weed and grain crops.

| Application rate (g/ha) | Compound A<br>Clopyralid + MCPA | 7.5<br>0 | 10<br>0 | 0<br>75 + 350 | 7.5<br>75 + 350 | 10<br>75 + 350 |
|---|---|---|---|---|---|---|
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNN = *Brassica napus* (spring rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 45

Compositions comprising Compound A, halauxifen-methyl, and clopyralid were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 45 below. In the table, an application rate of "X+Y" indicates that the application rate of halauxifen-methyl is "X" and clopyralid is "Y."

TABLE 45

Herbicidal Effects (% visual injury) of Compound A and Halauxifen-methyl + Clopyralid on weed and grain crops.

| Application rate (g/ha) | Compound A<br>Halauxifen-methyl + Clopyralid | 7.5<br>0 | 10<br>0 | 0<br>6 + 30 | 0<br>6 + 30 | 7.5<br>6 + 30 | 10<br>6 + 30 | 7.5<br>6 + 30 | 10<br>6 + 30 |
|---|---|---|---|---|---|---|---|---|---|
| AMARE | Obs | 100 | 100 | 73 | 68 | 100 | 93 | 100 | 100 |
| | Exp | — | — | — | | 100 | 100 | 100 | 100 |
| | △ | | | | | 0 | −8 | 0 | 0 |
| BRSNN | Obs | 55 | 55 | 23 | 25 | 70 | 68 | 78 | 88 |
| | Exp | — | — | — | | 65 | 65 | 66 | 66 |
| | △ | | | | | 5 | 2 | 11 | 21 |
| CHEAL | Obs | 83 | 88 | 90 | 90 | 100 | 100 | 100 | 100 |
| | Exp | — | — | — | — | 98 | 99 | 98 | 99 |
| | △ | | | | | 2 | 1 | 2 | 1 |
| CIRAR | Obs | 18 | 20 | 65 | 70 | 94 | 100 | 85 | 91 |
| | Exp | — | — | — | — | 71 | 72 | 75 | 76 |
| | △ | | | | | 22 | 28 | 10 | 15 |
| KCHSC | Obs | 55 | 65 | 23 | 20 | 82 | 83 | 88 | 86 |
| | Exp | — | — | — | — | 65 | 73 | 64 | 72 |
| | △ | | | | | 16 | 10 | 24 | 14 |
| MATCH | Obs | 20 | 13 | 15 | 20 | 98 | 70 | 83 | 96 |
| | Exp | — | — | — | — | 32 | 26 | 36 | 30 |
| | △ | | | | | 66 | 44 | 47 | 66 |
| POLCO | Obs | 93 | 91 | 84 | 80 | 98 | 99 | 98 | 99 |
| | Exp | — | — | — | — | 99 | 99 | 99 | 98 |
| | △ | | | | | −1 | 0 | −1 | 0 |

TABLE 45-continued

Herbicidal Effects (% visual injury) of Compound A and Halauxifen-methyl + Clopyralid on weed and grain crops.

| Application rate (g/ha) | Compound A | 7.5 | 10 | 0 | 0 | 7.5 | 10 | 7.5 | 10 |
|---|---|---|---|---|---|---|---|---|---|
| | Halauxifen-methyl + Clopyralid | 0 | 0 | 6 + 30 | 6 + 30 | 6 + 30 | 6 + 30 | 6 + 30 | 6 + 30 |
| SASKR | Obs | 63 | 65 | 63 | 60 | 75 | 70 | 73 | 75 |
| | Exp | | — | — | — | 86 | 87 | 85 | 86 |
| | △ | | | | | −11 | −17 | −13 | −11 |
| SINAR | Obs | 100 | 100 | 75 | 78 | 98 | 99 | 100 | 100 |
| | Exp | — | — | — | — | 100 | 100 | 100 | 100 |
| | △ | | | | | −3 | −2 | −1 | 0 |
| HORVS | Obs | 0 | 0 | 0 | 0 | 5 | 0 | 0 | 0 |
| | Exp | — | — | — | — | 0 | 0 | 0 | 0 |
| | △ | | | | | 5 | 0 | 0 | 0 |
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNN = *Brassica napus* (spring rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 46

Compositions comprising Compound A, halauxifen-methyl, and fluroxypyr were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 46 below. In the table, an application rate of "X+Y" indicates that the application rate of halauxifen-methyl is "X" and fluroxypyr is "Y."

TABLE 46

Herbicidal Effects (% visual injury) of Compound A and Halauxifen-methyl + Fluroxypyr on weed and grain crops.

| Application rate (g/ha) | Compound A | 7.5 | 10 | 0 | 0 | 7.5 | 10 | 7.5 | 10 |
|---|---|---|---|---|---|---|---|---|---|
| | Halauxifen-methyl + Fluroxypyr | 0 | 0 | 5 + 77 | 6 + 140 | 5 + 77 | 5 + 77 | 6 + 140 | 6 + 140 |
| AMARE | Obs | 100 | 100 | 50 | 50 | 100 | 100 | 100 | 98 |
| | Exp | — | — | — | — | 100 | 100 | 100 | 100 |
| | △ | | | | | 0 | 0 | 0 | −3 |
| BRSNN | Obs | 55 | 55 | 13 | 28 | 95 | 85 | 98 | 100 |
| | Exp | — | — | — | — | 61 | 61 | 67 | 67 |
| | △ | | | | | 34 | 24 | 30 | 33 |
| CHEAL | Obs | 83 | 88 | 85 | 88 | 98 | 100 | 100 | 100 |
| | Exp | — | — | — | — | 97 | 98 | 98 | 98 |
| | △ | | | | | 0 | 1 | 2 | 2 |
| CIRAR | Obs | 18 | 20 | 23 | 30 | 65 | 78 | 65 | 70 |
| | Exp | — | — | — | — | 36 | 38 | 42 | 44 |
| | △ | | | | | 29 | 40 | 23 | 26 |
| KCHSC | Obs | 55 | 65 | 55 | 58 | 87 | 91 | 93 | 96 |
| | Exp | — | — | — | — | 80 | 84 | 81 | 85 |
| | △ | | | | | 7 | 7 | 12 | 11 |
| MATCH | Obs | 20 | 13 | 0 | 0 | 53 | 53 | 96 | 77 |
| | Exp | — | — | — | — | 20 | 13 | 20 | 13 |
| | △ | | | | | 33 | 40 | 76 | 64 |
| POLCO | Obs | 93 | 91 | 95 | 98 | 100 | 100 | 100 | 100 |
| | Exp | — | — | — | — | 100 | 100 | 100 | 100 |
| | △ | | | | | 0 | 0 | 0 | 0 |
| SASKR | Obs | 63 | 65 | 60 | 60 | 68 | 73 | 75 | 88 |
| | Exp | — | — | — | — | 85 | 86 | 85 | 86 |
| | △ | | | | | −18 | −14 | −10 | 2 |

TABLE 46-continued

Herbicidal Effects (% visual injury) of Compound A and Halauxifen-methyl + Fluroxypyr on weed and grain crops.

| Application rate (g/ha) | Compound A<br>Halauxifen-methyl + Fluroxypyr | 7.5<br>0 | 10<br>0 | 0<br>5 + 77 | 0<br>6 + 140 | 7.5<br>5 + 77 | 10<br>5 + 77 | 7.5<br>6 + 140 | 10<br>6 + 140 |
|---|---|---|---|---|---|---|---|---|---|
| SINAR | Obs | 100 | 100 | 93 | 100 | 100 | 100 | 100 | 100 |
| | Exp | — | — | — | — | 100 | 100 | 100 | 100 |
| | △ | | | | | 0 | 0 | 0 | 0 |
| HORVS | Obs | 0 | 0 | 0 | 5 | 0 | 5 | 8 | 5 |
| | Exp | — | — | — | — | 0 | 0 | 5 | 5 |
| | △ | | | | | 0 | 5 | 3 | 0 |
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNN = *Brassica napus* (spring rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Trificum aestivum* (spring wheat)

Example 47

Compositions comprising Compound A, clopyralid, and fluroxypyr were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 47 below. In the table, an application rate of "X+Y" indicates that the application rate of clopyralid is "X" and fluroxypyr is "Y."

TABLE 47

Herbicidal Effects (% visual injury) of Compound A and Clopyralid + Fluroxypyr on weed and grain crops.

| Application rate (g/ha) | Compound A<br>Clopyralid + Fluroxypyr | 7.5<br>0 | 10<br>0 | 0<br>60 + 140 | 0<br>75 + 77 | 7.5<br>60 + 140 | 10<br>60 + 140 | 7.5<br>75 + 77 | 10<br>75 + 77 |
|---|---|---|---|---|---|---|---|---|---|
| AMARE | Obs | 100 | 100 | 58 | 45 | 100 | 100 | 99 | 88 |
| | Exp | — | — | — | — | 100 | 100 | 100 | 100 |
| | △ | | | | | 0 | 0 | −2 | −13 |
| BRSNN | Obs | 55 | 55 | 28 | 18 | 93 | 98 | 82 | 89 |
| | Exp | — | — | — | — | 67 | 67 | 63 | 63 |
| | △ | | | | | 25 | 31 | 19 | 26 |
| CHEAL | Obs | 83 | 88 | 15 | 10 | 96 | 96 | 96 | 97 |
| | Exp | — | — | — | — | 85 | 89 | 84 | 89 |
| | △ | | | | | 11 | 7 | 12 | 8 |
| CIRAR | Obs | 18 | 20 | 78 | 78 | 80 | 83 | 75 | 75 |
| | Exp | — | — | — | — | 81 | 82 | 81 | 82 |
| | △ | | | | | −1 | 1 | −6 | −7 |
| KCHSC | Obs | 55 | 65 | 63 | 55 | 95 | 95 | 93 | 85 |
| | Exp | — | — | — | — | 83 | 87 | 80 | 84 |
| | △ | | | | | 12 | 8 | 13 | 1 |
| MATCH | Obs | 20 | 13 | 10 | 20 | 80 | 95 | 98 | 92 |
| | Exp | — | — | — | — | 28 | 21 | 36 | 30 |
| | △ | | | | 52 | 74 | 62 | 62 | |
| POLCO | Obs | 93 | 91 | 91 | 90 | 100 | 100 | 100 | 100 |
| | Exp | — | — | — | — | 99 | 99 | 99 | 99 |
| | △ | | | | | 1 | 1 | 1 | 0 |
| SASKR | Obs | 63 | 65 | 55 | 58 | 70 | 75 | 68 | 70 |
| | Exp | — | — | — | — | 83 | 84 | 84 | 85 |
| | △ | | | | | −13 | −9 | −17 | −15 |
| SINAR | Obs | 100 | 100 | 95 | 92 | 100 | 98 | 100 | 100 |
| | Exp | — | — | — | — | 100 | 100 | 100 | 100 |
| | △ | | | | | 0 | −3 | 0 | −1 |

TABLE 47-continued

Herbicidal Effects (% visual injury) of Compound A and Clopyralid + Fluroxypyr on weed and grain crops.

| Application rate (g/ha) | Compound A / Clopyralid + Fluroxypyr | 7.5 / 0 | 10 / 0 | 0 / 60 + 140 | 0 / 75 + 77 | 7.5 / 60 + 140 | 10 / 60 + 140 | 7.5 / 75 + 77 | 10 / 75 + 77 |
|---|---|---|---|---|---|---|---|---|---|
| HORVS | Obs | 0 | 0 | 0 | 0 | 0 | 0 | 0 | 0 |
| | Exp | — | — | — | — | 0 | 0 | 0 | 0 |
| | △ | | | | 0 | 0 | 0 | 0 | |
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNN = *Brassica napus* (spring rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Trificum aestivum* (spring wheat)

Example 48

Compositions comprising Compound A, halauxifen methyl, and aminopyralid were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 48 below. In the table, an application rate of "X+Y" indicates that the application rate of halauxifen-methyl is "X" and aminopyralid is "Y."

TABLE 48

Herbicidal Effects (% visual injury) of Compound A and Halauxifen-methyl + Aminopyralid on weed and grain crops.

| Application rate (g/ha) | Compound A / Halauxifen-methyl + Aminopyralid | 7.5 / 0 | 10 / 0 | 0 / 3 + 2.5 | 7.5 / 3 + 2.5 | 10 / 3 + 2.5 |
|---|---|---|---|---|---|---|
| AMARE | Obs | 70 | 90 | 88 | 98 | 99 |
| | Exp | — | — | — | 96 | 99 |
| | △ | | | | 1 | 0 |
| BRSNW | Obs | 63 | 68 | 30 | 83 | 85 |
| | Exp | — | — | — | 74 | 77 |
| | △ | | | | 9 | 8 |
| CHEAL | Obs | 70 | 78 | 88 | 88 | 88 |
| | Exp | — | — | — | 96 | 97 |
| | △ | | | | −9 | −10 |
| CIRAR | Obs | 18 | 30 | 48 | 73 | 75 |
| | Exp | — | — | — | 57 | 63 |
| | △ | | | | 16 | 12 |
| KCHSC | Obs | 65 | 70 | 40 | 78 | 88 |
| | Exp | — | — | — | 79 | 82 |
| | △ | | | | −2 | 6 |
| MATCH | Obs | 18 | 30 | 8 | 45 | 50 |
| | Exp | — | — | — | 24 | 35 |
| | △ | | | | 21 | 15 |
| POLCO | Obs | 60 | 70 | 73 | 78 | 80 |
| | Exp | — | — | — | 89 | 92 |
| | △ | | | | −12 | −12 |
| SINAR | Obs | 85 | 88 | 75 | 98 | 95 |
| | Exp | — | — | — | 96 | 97 |
| | △ | | | | 1 | −2 |
| HORVS | Obs | 0 | 0 | 0 | 0 | 0 |
| | Exp | — | — | — | 0 | 0 |
| | △ | | | | 0 | 0 |

TABLE 48-continued

| Herbicidal Effects (% visual injury) of Compound A and Halauxifen-methyl + Aminopyralid on weed and grain crops. | | | | | | |
|---|---|---|---|---|---|---|
| Application rate (g/ha) | Compound A<br>Halauxifen-methyl + Aminopyralid | 7.5<br>0 | 10<br>0 | 0<br>3 + 2.5 | 7.5<br>3 + 2.5 | 10<br>3 + 2.5 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 49

Compositions comprising Compound A, halauxifen-methyl, and fluroxypyr were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 49 below. In the table, an application rate of "X+Y" indicates that the application rate of halauxifen-methyl is "X" and fluroxypyr is "Y."

TABLE 49

| Herbicidal Effects (% visual injury) of Compound A and Halauxifen-methyl + Fluroxypyr on weed and grain crops. | | | | | | | | | |
|---|---|---|---|---|---|---|---|---|---|
| Application rate (g/ha) | Compound A<br>Halauxifen-methyl + Fluroxypyr | 7.5<br>0 | 10<br>0 | 0<br>2.5 + 38.5 | 0<br>3 + 70 | 7.5<br>2.5 + 38.5 | 10<br>2.5 + 38.5 | 7.5<br>3 + 70 | 10<br>3 + 70 |
| AMARE | Obs | 70 | 90 | 88 | 93 | 98 | 93 | 93 | 98 |
| | Exp | — | — | — | — | 96 | 99 | 98 | 99 |
| | △ | | | | | 1 | −6 | −5 | −2 |
| BRSNW | Obs | 63 | 68 | 35 | 30 | 78 | 83 | 83 | 90 |
| | Exp | — | — | — | — | 76 | 79 | 74 | 77 |
| | △ | | | | | 2 | 4 | 9 | 13 |
| CHEAL | Obs | 70 | 78 | 78 | 78 | 88 | 83 | 85 | 85 |
| | Exp | — | — | — | — | 93 | 95 | 93 | 95 |
| | △ | | | | | −6 | −12 | −8 | −10 |
| CIRAR | Obs | 18 | 30 | 10 | 15 | 38 | 55 | 25 | 25 |
| | Exp | — | — | — | — | 26 | 37 | 30 | 41 |
| | △ | | | | | 12 | 18 | −5 | −16 |
| KCHSC | Obs | 65 | 70 | 75 | 63 | 83 | 88 | 83 | 88 |
| | Exp | — | — | — | — | 91 | 93 | 87 | 89 |
| | △ | | | | | −9 | −5 | −4 | −1 |
| MATCH | Obs | 18 | 30 | 10 | 15 | 38 | 55 | 30 | 41 |
| | Exp | — | — | — | — | 26 | 37 | 30 | 41 |
| | △ | | | | | 12 | 18 | −5 | −16 |
| POLCO | Obs | 60 | 70 | 53 | 35 | 85 | 83 | 83 | 85 |
| | Exp | — | — | — | — | 81 | 86 | 74 | 81 |
| | △ | | | | | 4 | .3 | 9 | 5 |
| SINAR | Obs | 85 | 88 | 70 | 70 | 94 | 99 | 95 | 98 |
| | Exp | — | — | — | — | 96 | 96 | 96 | 96 |
| | △ | | | | | −2 | 2 | −1 | 1 |
| HORVS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

TABLE 49-continued

Herbicidal Effects (% visual injury) of Compound A and Halauxifen-methyl + Fluroxypyr on weed and grain crops.

| Application rate (g/ha) | Compound A<br>Halauxifen-methyl + Fluroxypyr | 7.5<br>0 | 10<br>0 | 0<br>2.5 + 38.5 | 0<br>3 + 70 | 7.5<br>2.5 + 38.5 | 10<br>2.5 + 38.5 | 7.5<br>3 + 70 | 10<br>3 + 70 |
|---|---|---|---|---|---|---|---|---|---|
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 50

Compositions comprising Compound A, clopyralid, and the ALS herbicide florasulam were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 50 below. In the table, an application rate of "X+Y" indicates that the application rate of clopyralid is "X" and florasulam is "Y."

TABLE 50

Herbicidal Effects (% visual injury) of Compound A and Clopyralid + Florasulam on weed and grain crops.

| Application rate (g/ha) | Compound A<br>Clopyralid + Florasulam | 7.5<br>0 | 10<br>0 | 0<br>60 + 5 | 7.5<br>60 + 5 | 10<br>60 + 5 |
|---|---|---|---|---|---|---|
| AMARE | Obs | 100 | 100 | 100 | 100 | 100 |
| | Exp | — | — | — | 100 | 100 |
| | △ | | | | 0 | 0 |
| BRSNN | Obs | 55 | 55 | 100 | 100 | 98 |
| | Exp | — | — | — | 100 | 100 |
| | △ | | | | 0 | −2 |
| CHEAL | Obs | 83 | 88 | 18 | 90 | 93 |
| | Exp | — | — | — | 92 | 92 |
| | △ | | | | 4 | 3 |
| CIRAR | Obs | 18 | 20 | 90 | 96 | 95 |
| | Exp | — | — | — | 92 | 92 |
| | △ | | | | 4 | 3 |
| KCHSC | Obs | 55 | 65 | 0 | 78 | 95 |
| | Exp | — | — | — | 55 | 65 |
| | △ | | | | 23 | 30 |
| MATCH | Obs | 20 | 13 | 95 | 95 | 95 |
| | Exp | — | — | — | 96 | 95 |
| | △ | | | | −1 | 0 |
| POLCO | Obs | 93 | 91 | 99 | 100 | 96 |
| | Exp | — | — | — | 100 | 100 |
| | △ | | | | 0 | −4 |
| SASKR | Obs | 63 | 65 | 30 | 70 | 73 |
| | Exp | — | — | — | 74 | 76 |
| | △ | | | | −4 | −3 |

TABLE 50-continued

Herbicidal Effects (% visual injury) of Compound A and Clopyralid + Florasulam on weed and grain crops.

| Application rate (g/ha) | Compound A<br>Clopyralid + Florasulam | 7.5<br>0 | 10<br>0 | 0<br>60 + 5 | 7.5<br>60 + 5 | 10<br>60 + 5 |
|---|---|---|---|---|---|---|
| SINAR | Obs | 100 | 100 | 98 | 100 | 100 |
| | Exp | — | — | — | 100 | 100 |
| | △ | | | | 0 | 0 |
| HORVS | Obs | 0 | 0 | 0 | 0 | 0 |
| | Exp | — | — | — | 0 | 0 |
| | △ | | | | 0 | 0 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 51

Compositions comprising Compound A, MCPA, and the ALS herbicide florasulam were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 51 below. In the table, an application rate of "X+Y" indicates that the application rate of MCPA is "X" and florasulam is "Y."

TABLE 51

Herbicidal Effects (% visual injury) of Compound A and MCPA + Florasulam on weed and grain crops.

| Application rate (g/ha) | Compound A / MCPA + Florasulam | 7.5 / 0 | 10 / 0 | 0 / 350 + 5 | 7.5 / 350 + 5 | 10 / 350 + 5 |
|---|---|---|---|---|---|---|
| AMARE | Obs | 100 | 100 | 100 | 100 | 100 |
| | Exp | — | — | — | 100 | 100 |
| | △ | | | | 0 | 0 |
| BRSNN | Obs | 55 | 55 | 100 | 100 | 100 |
| | Exp | — | — | — | 100 | 100 |
| | △ | | | | 0 | 0 |
| CHEAL | Obs | 83 | 88 | 70 | 95 | 100 |
| | Exp | — | — | — | 95 | 96 |
| | △ | | | | 0 | 4 |
| CIRAR | Obs | 18 | 20 | 89 | 90 | 89 |
| | Exp | — | — | — | 91 | 91 |
| | △ | | | | −1 | −2 |
| KCHSC | Obs | 55 | 65 | 13 | 95 | 98 |
| | Exp | — | — | — | 61 | 69 |
| | △ | | | | 34 | 28 |
| MATCH | Obs | 20 | 13 | 85 | 93 | 85 |
| | Exp | — | — | — | 88 | 87 |
| | △ | | | | 5 | −2 |
| POLCO | Obs | 93 | 91 | 99 | 96 | 95 |
| | Exp | — | — | — | 100 | 100 |
| | △ | | | | −4 | −5 |
| SASKR | Obs | 63 | 65 | 58 | 68 | 70 |
| | Exp | — | — | — | 84 | 85 |
| | △ | | | | −17 | −15 |
| SINAR | Obs | 100 | 100 | 100 | 99 | 100 |
| | Exp | — | — | — | 100 | 100 |
| | △ | | | | −2 | 0 |
| HORVS | Obs | 0 | 0 | 0 | 0 | 0 |
| | Exp | — | — | — | 0 | 0 |
| | △ | | | | 0 | 0 |
| TRZAS | Obs | 0 | 0 | 0 | 0 | 0 |
| | Exp | — | — | — | 0 | 0 |
| | △ | | | | 0 | 0 |

g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 52

Compositions comprising Compound A, halauxifen-methyl, and the ALS herbicide florasulam were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 52 below. In the table, an application rate of "X+Y" indicates that the application rate of halauxifen-methyl is "X" and florasulam is "Y."

TABLE 52

Herbicidal Effects (% visual injury) of Compound A and Halauxifen-methyl + Florasulam on weed and grain crops.

| Application rate (g/ha) | Compound A / Halauxifen-methyl + Florasulam | 7.5 / 0 | 10 / 0 | 0 / 5 + 5 | 0 / 6 + 5 | 7.5 / 5 + 5 | 10 / 5 + 5 | 7.5 / 6 + 5 | 10 / 6 + 5 |
|---|---|---|---|---|---|---|---|---|---|
| AMARE | Obs | 100 | 100 | 83 | 100 | 100 | 100 | 98 | 100 |
| | Exp | — | — | — | — | 100 | 100 | 100 | 100 |
| | △ | | | | | 0 | 0 | −3 | 0 |
| BRSNN | Obs | 55 | 55 | 100 | 98 | 98 | 98 | 100 | 100 |
| | Exp | — | — | — | — | 100 | 100 | 99 | 99 |
| | △ | | | | | −3 | −2 | 1 | 1 |
| CHEAL | Obs | 83 | 88 | 70 | 45 | 95 | 95 | 98 | 98 |
| | Exp | — | — | — | — | 95 | 96 | 90 | 93 |
| | △ | | | | | 0 | −1 | 7 | 4 |
| CIRAR | Obs | 18 | 20 | 88 | 90 | 94 | 93 | 92 | 95 |
| | Exp | — | — | — | — | 90 | 90 | 92 | 92 |
| | △ | | | | | 4 | 3 | 0 | 3 |
| KCHSC | Obs | 55 | 65 | 38 | 48 | 90 | 5 | 94 | 93 |
| | Exp | — | — | — | — | 72 | 78 | 76 | 82 |
| | △ | | | | | 18 | 17 | 17 | 11 |
| MATCH | Obs | 20 | 13 | 88 | 85 | 98 | 100 | 93 | 93 |
| | Exp | — | — | — | — | 90 | 89 | 88 | 87 |
| | △ | | | | | 8 | 11 | 5 | 6 |
| POLCO | Obs | 93 | 91 | 98 | 98 | 98 | 94 | 98 | 97 |
| | Exp | — | — | — | — | 100 | 100 | 100 | 100 |
| | △ | | | | | −2 | −6 | −2 | −3 |

TABLE 52-continued

Herbicidal Effects (% visual injury) of Compound A and Halauxifen-methyl + Florasulam on weed and grain crops.

| Application rate (g/ha) | Compound A<br>Halauxifen-methyl + Florasulam | 7.5<br>0 | 10<br>0 | 0<br>5 + 5 | 0<br>6 + 5 | 7.5<br>5 + 5 | 10<br>5 + 5 | 7.5<br>6 + 5 | 10<br>6 + 5 |
|---|---|---|---|---|---|---|---|---|---|
| SASKR | Obs | 63 | 65 | 80 | 65 | 70 | 35 | 68 | 85 |
| | Exp | — | — | — | — | 93 | 93 | 87 | 88 |
| | △ | | | | | −23 | −58 | −19 | −3 |
| SINAR | Obs | 100 | 100 | 100 | 100 | 100 | 100 | 100 | 100 |
| | Exp | — | — | — | — | 100 | 100 | 100 | 100 |
| | △ | | | | | 0 | 0 | 0 | 0 |
| HORVS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 53

Compositions comprising Compound A, halauxifen-methyl, and the ALS herbicide pyroxsulam were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 53 below. In the table, an application rate of "X+Y" indicates that the application rate of halauxifen-methyl is "X" and pyroxsulam is "Y."

TABLE 53

Herbicidal Effects (% visual injury) of Compound A and Halauxifen-methyl + Pyroxsulam on weed and grain crops.

| Application rate (g/ha) | Compound A<br>Halauxifen-methyl + Pyroxsulam | 7.5<br>0 | 10<br>0 | 0<br>5 + 15 | 0<br>5 + 18.75 | 7.5<br>5 + 15 | 10<br>5 + 15 | 7.5<br>5 + 18.75 | 10<br>5 + 18.75 |
|---|---|---|---|---|---|---|---|---|---|
| AMARE | Obs | 100 | 100 | 100 | 100 | 100 | 100 | 100 | 100 |
| | Exp | — | — | — | — | 100 | 100 | 100 | 100 |
| | △ | | | | | 0 | 0 | 0 | 0 |
| BRSNN | Obs | 55 | 55 | 100 | 100 | 96 | 99 | 98 | 99 |
| | Exp | — | — | — | — | 100 | 100 | 100 | 100 |
| | △ | | | | | −4 | −2 | −3 | −2 |
| CHEAL | Obs | 83 | 88 | 63 | 58 | 83 | 93 | 78 | 85 |
| | Exp | — | — | — | — | 93 | 95 | 93 | 95 |
| | △ | | | | | −11 | −3 | −15 | −10 |
| CIRAR | Obs | 18 | 20 | 70 | 68 | 93 | 83 | 78 | 83 |
| | Exp | — | — | — | — | 75 | 76 | 73 | 74 |
| | △ | | | | | 17 | 7 | 4 | 9 |
| KCHSC | Obs | 55 | 65 | 57 | 73 | 97 | 90 | 93 | 94 |
| | Exp | — | — | — | — | 80 | 85 | 88 | 90 |
| | △ | | | | | 17 | 5 | 5 | 3 |
| MATCH | Obs | 20 | 13 | 63 | 25 | 58 | 40 | 65 | 70 |
| | Exp | — | — | — | — | 70 | 67 | 40 | 34 |
| | △ | | | | | −13 | −27 | 25 | 36 |
| POLCO | Obs | 93 | 91 | 94 | 93 | 95 | 95 | 95 | 93 |
| | Exp | — | — | — | — | 100 | 99 | 99 | 99 |
| | △ | | | | | −5 | −4 | −4 | −7 |
| SASKR | Obs | 63 | 65 | 94 | 88 | 85 | 96 | 93 | 95 |
| | Exp | — | — | — | — | 98 | 98 | 95 | 96 |
| | △ | | | | | −13 | −2 | −3 | −1 |

TABLE 53-continued

Herbicidal Effects (% visual injury) of Compound A and Halauxifen-methyl + Pyroxsulam on weed and grain crops.

| Application rate (g/ha) | Compound A / Halauxifen-methyl + Pyroxsulam | 7.5 / 0 | 10 / 0 | 0 / 5 + 15 | 0 / 5 + 18.75 | 7.5 / 5 + 15 | 10 / 5 + 15 | 7.5 / 5 + 18.75 | 10 / 5 + 18.75 |
|---|---|---|---|---|---|---|---|---|---|
| SINAR | Obs | 100 | 100 | 100 | 100 | 100 | 100 | 100 | 100 |
| | Exp | — | — | — | — | 100 | 100 | 100 | 100 |
| | △ | | | | | 0 | 0 | 0 | 0 |
| HORVS | Obs | 0 | 0 | 13 | 5 | 18 | 20 | 10 | 5 |
| | Exp | — | — | — | — | 13 | 13 | 5 | 5 |
| | △ | | | | | 5 | 8 | 5 | 0 |
| TRZAS | Obs | 0 | 0 | 0 | 0 | 0 | 0 | 0 | 0 |
| | Exp | — | — | — | — | 0 | 0 | 0 | 0 |
| | △ | | | | | 0 | 0 | 0 | 0 |

g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 54

Compositions comprising Compound A (without cloquintocet-mexyl safener), 2,4-D, and the PS-II inhibitor herbicide bromoxynil were tested on undesirable vegetation species, including wild pansy (VIOTR, *Viola tricolor*), chickweed (STEME, *Stellaria media*), ivyleaf morningglory (IPOHE, *Ipomoea hederacea*), Canadian thistle (CIRAR, *Cirsium arvense*), velvetleaf (ABUTH, *Abutilon theophrasti*), volunteer soybean (GLXMA, *Glycine max*), broadleaf dock (RUMOB, *Rumex obtusifolius*), winter rape (BRSNW, *Brassica napus*), wild buckwheat (POLCO, *Polygonum convolvulus*), kochia (KCHSC, *Kochia scoparia*), common sunflower (HELAN, *Helianthus annuus*), blackgrass (ALOMY, *Alopecurus myosuroides*), wild oat (AVEFA, *Avena fatua*), Italian ryegrass (LOLMU, *Lolium multiflorum*), barnyard grass (ECHCG, *Echinochloa crus-galli*), nutsedge (CYPES, *Cyperus esculentus*), Chinese sprangletop (LEFCH, *Leptochloa chinensis*), large crabgrass (DIGSA, *Digitaria sanguinalis*), giant foxtail (SETFA, *Setaria faberi*), and grain sorghum (SORVU, *Sorghum vulgare*), to determine the efficacy of the compositions on these undesirable vegetation species.

The results are summarized in Table 54 below. In the table, an application rate of "X+Y" indicates that the application rate of 2,4-D is "X" and bromoxynil is "Y."

TABLE 54

Herbicidal Effects (% visual injury) of Compound A and 2,4-D + Bromoxynil on weeds.

| Application rate (g/ha) | Compound A / 2,4-D + Bromoxynil | 7.5 / 0 | 10 / 0 | 0 / 140 + 140 | 7.5 / 140 + 140 | 10 / 140 + 140 |
|---|---|---|---|---|---|---|
| VIOTR | Obs | 8 | 15 | 38 | 65 | 55 |
| | Exp | — | — | — | 42 | 47 |
| | △ | | | | 23 | 8 |
| STEME | Obs | 73 | 88 | 0 | 75 | 68 |
| | Exp | — | — | — | 73 | 88 |
| | △ | | | | 3 | −20 |
| IPOHE | Obs | 10 | 15 | 95 | 98 | 98 |
| | Exp | — | — | — | 96 | 96 |
| | △ | | | | 2 | 2 |
| CIRAR | Obs | 40 | 28 | 53 | 65 | 73 |
| | Exp | — | — | — | 72 | 66 |
| | △ | | | | −7 | — |
| ABUTH | Obs | 70 | 75 | 38 | 98 | 100 |
| | Exp | — | — | — | 81 | 84 |
| | △ | | | | 16 | 16 |
| GLXMA | Obs | 85 | 85 | 30 | 99 | 99 |
| | Exp | — | — | — | 90 | 90 |
| | △ | | | | 9 | 9 |
| RUMOB | Obs | 38 | 35 | 50 | 55 | 35 |
| | Exp | — | — | — | 69 | 68 |
| | △ | | | | −14 | −33 |
| BRSNW | Obs | 50 | 65 | 78 | 85 | 88 |
| | Exp | — | — | — | 89 | 92 |
| | △ | | | | −4 | −5 |

TABLE 54-continued

Herbicidal Effects (% visual injury) of Compound A and 2,4-D + Bromoxynil on weeds.

| Application rate (g/ha) | Compound A<br>2,4-D + Bromoxynil | 7.5<br>0 | 10<br>0 | 0<br>140 + 140 | 7.5<br>140 + 140 | 10<br>140 + 140 |
|---|---|---|---|---|---|---|
| POLCO | Obs | 80 | 78 | 20 | 100 | 95 |
| | Exp | — | — | — | 84 | 82 |
| | △ | | | | 16 | 13 |
| KCHSC | Obs | 73 | 88 | 63 | 90 | 94 |
| | Exp | — | — | — | 90 | 95 |
| | △ | | | | 0 | −1 |
| HELAN | Obs | 95 | 100 | 55 | 99 | 96 |
| | Exp | — | — | — | 98 | 100 |
| | △ | | | | 1 | −4 |
| ALOMY | Obs | 0 | 0 | 0 | 0 | 0 |
| | Exp | — | — | — | 0 | 0 |
| | △ | | | | 0 | 0 |
| AVEFA | Obs | 0 | 0 | 0 | 0 | 0 |
| | Exp | — | — | — | 0 | 0 |
| | △ | | | | 0 | 0 |
| LOLMU | Obs | 0 | 0 | 0 | 0 | 0 |
| | Exp | — | — | — | 0 | 0 |
| | △ | | | | 0 | 0 |
| ECHCG | Obs | 55 | 58 | 0 | 90 | 92 |
| | Exp | — | — | — | 55 | 58 |
| | △ | | | | 35 | 34 |
| CYPES | Obs | 0 | 0 | 0 | 0 | 0 |
| | Exp | — | — | — | 0 | 0 |
| | △ | | | | 0 | 0 |
| LEFCH | Obs | 0 | 0 | 0 | 15 | 30 |
| | Exp | — | — | — | 0 | 0 |
| | △ | | | | 15 | 30 |
| DIGSA | Obs | 0 | 8 | 0 | 13 | 13 |
| | Exp | — | — | — | 0 | 8 |
| | △ | | | | 13 | 5 |
| SETFA | Obs | 0 | 0 | 0 | 30 | 43 |
| | Exp | — | — | — | 0 | 0 |
| | △ | | | | 30 | 43 |
| SORVU | Obs | 0 | 0 | 0 | 0 | 0 |
| | Exp | — | — | — | 0 | 0 |
| | △ | | | | 0 | 0 |

g/ha = grams per hectare
VIOTR = *Viola tricolor* (wild pansy)
STEME = *Stellaria media* (chickweed)
IPOHE = *Ipomoea hederacea* (ivyleaf morningglory)
CIRAR = *Cirsium arvense* (Canadian thistle)
ABUTH = *Abutilon theophrasti* (velvetleaf)
GLXMA = *Glycine max* (soybean)
RUMOB = *Rumex obtusifolius* (broad-leaf dock)
BRSNW = *Brassica napus* (winter rape)
POLCO = *Polygonum convolvulus* (wild buckwheat)
KCHSC = *Kochia scoparia* (kochia)
HELAN = *Helianthus annuus* (common sunflower)
ALOMY = *Alopecurus myosuroides* (blackgrass)
AVEFA = *Avena fatua* (wild oat)
LOLMU = *Lolium multiflorum* (Italian ryegrass)
ECHCG = *Echinochloa crus-galli* (barnyardgrass)
CYPES = *Cyperus esculentus* (nutsedge)
LEFCH = *Leptochloa chinensis* (Chinese sprangletop)
DIGSA = *Digitaria sanguinalis* (large crabgrass)
SETFA = *Setaria faberi* (giant foxtail)
SORVU = *Sorghum vulgare* (grain sorghum)

Example 55

Compositions comprising Compound A and the auxin transport inhibitor diflufenzopyr were tested on undesirable vegetation species, including wild pansy (VIOTR, *Viola tricolor*), Italian ryegrass (LOLMU, *Lolium multiflorum*), common rice (ORYSA, *Oryza sativa*), barnyardgrass (ECHCG, *Echinochloa crus-galli*), large crabgrass (DIGSA, *Digitaria sanguinalis*), velvetleaf (ABUTH, *Abutilon theophrasti*), wild buckwheat (POLCO, *Polygonum convolvulus*), Canadian thistle (CIRAR, *Cirsium arvense*), spring rape (BRSNN, *Brassica napus*), giant foxtail (SETFA, *Setaria faberi*), broad-leaf dock (RUMOB, *Rumex obtusifolius*), and kochia (KCHSC, *Kochia scoparia*), to determine the efficacy of the compositions on these undesirable vegetation species.

The results are summarized in Table 55 below.

TABLE 55

Herbicidal Effects (% visual injury) of Compound A and Diflufenzopyr on weeds.

| Application rate (g/ha) | Compound A<br>Diflufenzopyr | 7.5<br>0 | 10<br>0 | 0<br>10 | 7.5<br>10 | 10<br>10 |
|---|---|---|---|---|---|---|
| VIOTR | Obs | 10 | 18 | 8 | 55 | 58 |
| | Exp | — | — | — | 17 | 24 |
| | △ | | | | 38 | 34 |
| LOLMU | Obs | 0 | 0 | 8 | 50 | 65 |
| | Exp | — | — | — | 8 | 8 |
| | △ | | | | 43 | 58 |
| ORYSA | Obs | 13 | 10 | 8 | 35 | 65 |
| | Exp | — | — | — | 19 | 17 |
| | △ | | | | 16 | 48 |
| ECHCG | Obs | 73 | 78 | 0 | 90 | 88 |
| | Exp | — | — | — | 73 | 78 |
| | △ | | | | 18 | 10 |
| DIGSA | Obs | 45 | 25 | 0 | 68 | 68 |
| | Exp | — | — | — | 45 | 25 |
| | △ | | | | 23 | 43 |
| ABUTH | Obs | 68 | 78 | 38 | 75 | 98 |
| | Exp | — | — | — | 80 | 86 |
| | △ | | | | −5 | 12 |
| POLCO | Obs | 75 | 70 | 5 | 90 | 90 |
| | Exp | — | — | — | 76 | 72 |
| | △ | | | | 14 | 19 |
| CIRAR | Obs | 23 | 20 | 10 | 50 | 58 |
| | Exp | — | — | — | 30 | 28 |
| | △ | | | | 20 | 30 |
| BRSNN | Obs | 73 | 83 | 70 | 98 | 100 |
| | Exp | — | — | — | 92 | 95 |
| | △ | | | | 6 | 5 |
| SETFA | Obs | 70 | 70 | 20 | 85 | 90 |
| | Exp | — | — | — | 76 | 76 |
| | △ | | | | 9 | 14 |
| RUMOB | Obs | 8 | 10 | 8 | 18 | 23 |
| | Exp | — | — | — | 14 | 17 |
| | △ | | | | 3 | 6 |
| KCHSC | Obs | 60 | 65 | 10 | 78 | 83 |
| | Exp | — | — | — | 64 | 69 |
| | △ | | | | 14 | 14 |

g/ha = grams per hectare
VIOTR = *Viola tricolor* (wild pansy)
LOLMU = *Lolium multiflorum* (Italian ryegrass)
ORYSA = *Oryza sativa* (common rice)
ECHCG = *Echinochloa crus-galli* (barnyardgrass)
DIGSA = *Digitaria sanguinalis* (large crabgrass)
ABUTH = *Abutilon theophrasti* (velvetleaf)
POLCO = *Polygonum convolvulus* (wild buckwheat)
CIRAR = *Cirsium arvense* (Canadian thistle)
BRSNN = *Brassica napus* (spring rape)
SETFA = *Setaria faberi* (giant foxtail)
RUMOB = *Rumex obtusifolius* (broad-leaf dock)
KCHSC = *Kochia scoparia* (kochia)

Example 56

Compositions comprising Compound A and the auxin transport inhibitor chlorflurenol-methyl were tested on undesirable vegetation species, including spring rape (BRSNN, *Brassica napus*), wild mustard (SINAR, *Sinapis arvensis*), kochia (KCHSC, *Kochia scoparia*), Russian thistle (SASKR, *Salsola kali*), pigweed (AMARE, *Amaranthus retroflexus*), common lambsquarters (CHEAL, *Chenopodium album* L.), wild chamomile (MATCH, *Matricaria chamomilla*), and Canadian thistle (CIRAR, *Cirsium arvense*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 56 below.

TABLE 56

| Herbicidal Effects (% visual injury) of Compound A and Chlorflurenol-methyl on weed and grain crops. | | | | | | |
|---|---|---|---|---|---|---|
| Application rate (g/ha) | Compound A<br>Chlorflurenol-methyl | 7.5<br>0 | 10<br>0 | 0<br>140 | 7.5<br>140 | 10<br>140 |
| BRSNN | Obs | 55 | 70 | 23 | 98 | 83 |
| | Exp | — | — | — | 65 | 77 |
| | △ | | | | 32 | 6 |
| SINAR | Obs | 85 | 90 | 18 | 100 | 98 |
| | Exp | — | — | — | 88 | 92 |
| | △ | | | | 12 | 6 |
| KCHSC | Obs | 50 | 55 | 0 | 73 | 68 |
| | Exp | — | — | — | 50 | 55 |
| | △ | | | | 23 | 13 |
| SASKR | Obs | 38 | 63 | 0 | 80 | 70 |
| | Exp | — | — | — | 38 | 63 |
| | △ | | | | 43 | 8 |
| AMARE | Obs | 70 | 98 | 0 | 99 | 88 |
| | Exp | — | — | — | 73 | 98 |
| | △ | | | | 26 | −10 |
| CHEAL | Obs | 60 | 90 | 0 | 100 | 88 |
| | Exp | — | — | — | 60 | 90 |
| | △ | | | | 40 | −3 |
| MATCH | Obs | 0 | 33 | 0 | 53 | 55 |
| | Exp | — | — | — | 0 | 33 |
| | △ | | | | 53 | 23 |
| CIRAR | Obs | 10 | 23 | 0 | 65 | 50 |
| | Exp | — | — | — | 10 | 23 |
| | △ | | | | 55 | 28 |
| TRZAS | Obs | 0 | 0 | 0 | 0 | 0 |
| | Exp | — | — | — | 0 | 0 |
| | △ | | | | 0 | 0 |

TABLE 56-continued

| Herbicidal Effects (% visual injury) of Compound A and Chlorflurenol-methyl on weed and grain crops. | | | | | | |
|---|---|---|---|---|---|---|
| Application rate (g/ha) | Compound A<br>Chlorflurenol-methyl | 7.5<br>0 | 10<br>0 | 0<br>140 | 7.5<br>140 | 10<br>140 |
| HORVS | Obs | 0 | 0 | 0 | 0 | 0 |
| | Exp | — | — | — | 0 | 0 |
| | △ | | | | 0 | 0 |

g/ha = grams per hectare
BRSNN = *Brassica napus* (spring rape)
SINAR = *Sinapis arvensis* (wild mustard)
KCHSC = *Kochia scoparia* (kochia)
SASKR = *Salsola kali* (Russian thistle)
AMARE = *Amaranthus retroflexus* (pigweed)
CHEAL = *Chenopodium album* L. (common lambsquarters)
MATCH = *Matricaria chamomilla* (wild chamomile)
CIRAR = *Cirsium arvense* (Canadian thistle)
TRZAS = *Triticum aestivum* (spring wheat)
HORVS = *Hordeum vulgare* (spring barley)

Example 57

Compositions comprising Compound A (without cloquintocet-mexyl safener) and the auxin transport inhibitor 2,3,5-triiodobenzoic acid (2,3,5-TIBA) were tested on undesirable vegetation species, including wild pansy (VIOTR, *Viola tricolor*), chickweed (STEME, *Stellaria media*), ivyleaf morningglory (IPOHE, *Ipomoea hederacea*), Canadian thistle (CIRAR, *Cirsium arvense*), velvetleaf (ABUTH, *Abutilon theophrasti*), volunteer soybean (GLXMA, *Glycine max*), broad-leaf dock (RUMOB, *Rumex obtusifolius*), winter rape (BRSNW, *Brassica napus*), wild buckwheat (POLCO, *Polygonum convolvulus*), kochia (KCHSC, *Kochia scoparia*), common sunflower (HELAN, *Helianthus annuus*), blackgrass (ALOMY, *Alopecurus myosuroides*), wild oat (AVEFA, *Avena fatua*), Italian ryegrass (LOLMU, *Lolium multiflorum*), barnyard grass (ECHCG, *Echinochloa crus-galli*), nutsedge (CYPES, *Cyperus esculentus*), Chinese sprangletop (LEFCH, *Leptochloa chinensis*), large crabgrass (DIGSA, *Digitaria sanguinalis*), giant foxtail (SETFA, *Setaria faberi*), and grain sorghum (SORVU, *Sorghum vulgare*), to determine the efficacy of the compositions on these undesirable vegetation species.

The results are summarized in Table 57 below.

TABLE 57

| Herbicidal Effects (% visual injury) of Compound A and 2,3,5-TIBA on weeds. | | | | | | |
|---|---|---|---|---|---|---|
| Application rate (g/ha) | Compound A<br>2,3,5-TIBA | 7.5<br>0 | 10<br>0 | 0<br>140 | 7.5<br>140 | 10<br>140 |
| VIOTR | Obs | 8 | 15 | 0 | 13 | 23 |
| | Exp | — | — | — | 8 | 15 |
| | △ | | | | 5 | 8 |
| STEME | Obs | 73 | 88 | 0 | 65 | 78 |
| | Exp | — | — | — | 73 | 88 |
| | △ | | | | −8 | −10 |
| IPOHE | Obs | 10 | 15 | 0 | 10 | 13 |
| | Exp | — | — | — | 10 | 15 |
| | △ | | | | 0 | −3 |
| CIRAR | Obs | 40 | 28 | 0 | 35 | 33 |
| | Exp | — | — | — | 40 | 28 |
| | △ | | | | −5 | 5 |
| ABUTH | Obs | 70 | 75 | 0 | 75 | 83 |
| | Exp | — | — | — | 70 | 75 |
| | △ | | | | 5 | 8 |
| GLXMA | Obs | 85 | 85 | 40 | 93 | 95 |
| | Exp | — | — | — | 91 | 91 |
| | △ | | | | 2 | 4 |
| RUMOB | Obs | 38 | 35 | 0 | 53 | 50 |
| | Exp | — | — | — | 38 | 35 |
| | △ | | | | 15 | 15 |

TABLE 57-continued

Herbicidal Effects (% visual injury) of Compound A and 2,3,5-TIBA on weeds.

| Application rate (g/ha) | Compound A<br>2,3,5-TIBA | 7.5<br>0 | 10<br>0 | 0<br>140 | 7.5<br>140 | 10<br>140 |
|---|---|---|---|---|---|---|
| BRSNW | Obs | 50 | 65 | 0 | 68 | 78 |
| | Exp | — | — | — | 50 | 65 |
| | △ | | | | 18 | 13 |
| POLCO | Obs | 80 | 78 | 0 | 90 | 80 |
| | Exp | — | — | — | 80 | 78 |
| | △ | | | | 10 | 3 |
| KCHSC | Obs | 73 | 88 | 0 | 80 | 85 |
| | Exp | — | — | — | 73 | 88 |
| | △ | | | | 8 | −3 |
| HELAN | Obs | 95 | 100 | 0 | 95 | 100 |
| | Exp | — | — | — | 95 | 100 |
| | △ | | | | 0 | 0 |
| ALOMY | Obs | 0 | 0 | 0 | 0 | 0 |
| | Exp | — | — | — | 0 | 0 |
| | △ | | | | 0 | 0 |
| AVEFA | Obs | 0 | 0 | 0 | 0 | 0 |
| | Exp | — | — | — | 0 | 0 |
| | △ | | | | 0 | 0 |
| LOLMU | Obs | 0 | 0 | 0 | 0 | 0 |
| | Exp | — | — | — | 0 | 0 |
| | △ | | | | 0 | 0 |
| ECHCG | Obs | 55 | 58 | 0 | 58 | 65 |
| | Exp | — | — | — | 55 | 58 |
| | △ | | | | 3 | 8 |
| CYPES | Obs | 0 | 0 | 0 | 0 | 0 |
| | Exp | — | — | — | 0 | 0 |
| | △ | | | | 0 | 0 |
| LEFCH | Obs | 0 | 0 | 0 | 0 | 0 |
| | Exp | — | — | — | 0 | 0 |
| | △ | | | | 0 | 0 |
| DIGSA | Obs | 0 | 8 | 0 | 5 | 0 |
| | Exp | — | — | — | 0 | 8 |
| | △ | | | | 5 | −8 |
| SETFA | Obs | 0 | 0 | 0 | 0 | 0 |
| | Exp | — | — | — | 0 | 0 |
| | △ | | | | 0 | 0 |
| SORVU | Obs | 0 | 0 | 0 | 0 | 0 |
| | Exp | — | — | — | 0 | 0 |
| | △ | | | | 0 | 0 |

g/ha = grams per hectare
VIOTR = *Viola tricolor* (wild pansy)
STEME = *Stellaria media* (chickweed)
IPOHE = *Ipomoea hederacea* (ivyleaf morningglory)
CIRAR = *Cirsium arvense* (Canadian thistle)
ABUTH = *Abutilon theophrasti* (velvetleaf)
GLXMA = *Glycine max* (soybean)
RUMOB = *Rumex obtusifolius* (broad-leaf dock)
BRSNW = *Brassica napus* (winter rape)
POLCO = *Polygonum convolvulus* (wild buckwheat)
KCHSC = *Kochia scoparia* (kochia)
HELAN = *Helianthus annuus* (common sunflower)
ALOMY = *Alopecurus myosuroides* (blackgrass)
AVEFA = *Avena fatua* (wild oat)
LOLMU = *Lolium multiflorum* (Italian ryegrass)
ECHCG = *Echinochloa crus-galli* (barnyardgrass)
CYPES = *Cyperus esculentus* (nutsedge)
LEFCH = *Leptochloa chinensis* (Chinese sprangletop)
DIGSA = *Digitaria sanguinalis* (large crabgrass)
SETFA = *Setaria faberi* (giant foxtail)
SORVU = *Sorghum vulgare* (grain sorghum)

Example 58

Compositions comprising Compound A (without cloquintocet-mexyl safener) and the auxin transport inhibitor naptalam were tested on undesirable vegetation species, including wild pansy (VIOTR, *Viola tricolor*), chickweed (STEME, *Stellaria media*), ivyleaf morningglory (IPOHE, *Ipomoea hederacea*), Canadian thistle (CIRAR, *Cirsium arvense*), velvetleaf (ABUTH, *Abutilon theophrasti*), volunteer soybean (GLXMA, *Glycine max*), broad-leaf dock (RUMOB, *Rumex obtusifolius*), winter rape (BRSNW, *Brassica napus*), wild buckwheat (POLCO, *Polygonum convolvulus*), kochia (KCHSC, *Kochia scoparia*), common sunflower (HELAN, *Helianthus annuus*), blackgrass (ALOMY, *Alopecurus myosuroides*), wild oat (AVEFA, *Avena fatua*), Italian ryegrass (LOLMU, *Lolium multiflorum*), barnyard grass (ECHCG, *Echinochloa crus-galli*), nutsedge (CYPES, *Cyperus esculentus*), Chinese sprangletop (LEFCH, *Leptochloa chinensis*), large crabgrass (DIGSA, *Digitaria sanguinalis*), giant foxtail (SETFA, *Setaria faberi*), and grain sorghum (SORVU, *Sorghum vulgare*), to determine the efficacy of the compositions on these undesirable vegetation species.

The results are summarized in Table 58 below.

TABLE 58

Herbicidal Effects (% visual injury) of Compound A and Naptalam on weeds.

| Application rate (g/ha) | Compound A<br>Naptalam | 7.5<br>0 | 10<br>0 | 0<br>140 | 7.5<br>140 | 10<br>140 |
|---|---|---|---|---|---|---|
| VIOTR | Obs | 8 | 15 | 0 | 30 | 20 |
| | Exp | — | — | — | 8 | 15 |
| | △ | | | | 23 | 5 |
| STEME | Obs | 73 | 88 | 0 | 75 | 75 |
| | Exp | — | — | — | 73 | 88 |
| | △ | | | | 3 | −13 |
| IPOHE | Obs | 10 | 15 | 0 | 15 | 25 |
| | Exp | — | — | — | 10 | 15 |
| | △ | | | | 5 | 10 |
| CIRAR | Obs | 40 | 28 | 0 | 30 | 25 |
| | Exp | — | — | — | 40 | 28 |
| | △ | | | | −10 | −3 |
| ABUTH | Obs | 70 | 75 | 0 | 75 | 73 |
| | Exp | — | — | — | 70 | 75 |
| | △ | | | | 5 | −3 |
| GLXMA | Obs | 85 | 85 | 13 | 93 | 95 |
| | Exp | — | — | — | 87 | 87 |
| | △ | | | | 6 | 8 |
| RUMOB | Obs | 38 | 35 | 0 | 50 | 63 |
| | Exp | — | — | — | 38 | 35 |
| | △ | | | | 13 | 28 |
| BRSNW | Obs | 50 | 65 | 0 | 73 | 80 |
| | Exp | — | — | — | 50 | 65 |
| | △ | | | | 23 | 15 |
| POLCO | Obs | 80 | 78 | 0 | 80 | 75 |
| | Exp | — | — | — | 80 | 78 |
| | △ | | | | 0 | −3 |
| KCHSC | Obs | 73 | 88 | 0 | 83 | 89 |
| | Exp | — | — | — | 73 | 88 |
| | △ | | | | 10 | 2 |
| HELAN | Obs | 95 | 100 | 0 | 100 | 99 |
| | Exp | — | — | — | 95 | 100 |
| | △ | | | | 5 | −2 |
| ALOMY | Obs | 0 | 0 | 0 | 0 | 0 |
| | Exp | — | — | — | 0 | 0 |
| | △ | | | | 0 | 0 |
| AVEFA | Obs | 0 | 0 | 0 | 0 | 0 |
| | Exp | — | — | — | 0 | 0 |
| | △ | | | | 0 | 0 |
| LOLMU | Obs | 0 | 0 | 0 | 0 | 0 |
| | Exp | — | — | — | 0 | 0 |
| | △ | | | | 0 | 0 |

TABLE 58-continued

Herbicidal Effects (% visual injury) of Compound A and Naptalam on weeds.

| Application rate (g/ha) | Compound A<br>Naptalam | 7.5<br>0 | 10<br>0 | 0<br>140 | 7.5<br>140 | 10<br>140 |
|---|---|---|---|---|---|---|
| ECHCG | Obs | 55 | 58 | 0 | 70 | 75 |
| | Exp | — | — | — | 55 | 58 |
| | △ | | | | 15 | 18 |
| CYPES | Obs | 0 | 0 | 35 | 0 | 0 |
| | Exp | — | — | — | 35 | 35 |
| | △ | | | | −35 | −35 |
| LEFCH | Obs | 0 | 0 | 0 | 0 | 0 |
| | Exp | — | — | — | 0 | 0 |
| | △ | | | | 0 | 0 |
| DIGSA | Obs | 0 | 8 | 0 | 0 | 5 |
| | Exp | — | — | — | 0 | 8 |
| | △ | | | | 0 | −3 |
| SETFA | Obs | 0 | 0 | 0 | 0 | 0 |
| | Exp | — | — | — | 0 | 0 |
| | △ | | | | 0 | 0 |
| SORVU | Obs | 0 | 0 | 0 | 0 | 0 |
| | Exp | — | — | — | 0 | 0 |
| | △ | | | | 0 | 0 |

g/ha = grams per hectare
VIOTR = *Viola tricolor* (wild pansy)
STEME = *Stellaria media* (chickweed)
IPOHE = *Ipomoea hederacea* (ivyleaf morningglory)
CIRAR = *Cirsium arvense* (Canadian thistle)
ABUTH = *Abutilon theophrasti* (velvetleaf)
GLXMA = *Glycine max* (soybean)
RUMOB = *Rumex obtusifolius* (broad-leaf dock)
BRSNW = *Brassica napus* (winter rape)
POLCO = *Polygonum convolvulus* (wild buckwheat)
KCHSC = *Kochia scoparia* (kochia)
HELAN = *Helianthus annuus* (common sunflower)
ALOMY = *Alopecurus myosuroides* (blackgrass)
AVEFA = *Avena fatua* (wild oat)
LOLMU = *Lolium multiflorum* (Italian ryegrass)
ECHCG = *Echinochloa crus-galli* (barnyardgrass)
CYPES = *Cyperus esculentus* (nutsedge)
LEFCH = *Leptochloa chinensis* (Chinese sprangletop)
DIGSA = *Digitaria sanguinalis* (large crabgrass)
SETFA = *Setaria faberi* (giant foxtail)
SORVU = *Sorghum vulgare* (grain sorghum)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects and are also disclosed. Other than in the examples, or where otherwise noted, all numbers expressing quantities of ingredients, reaction conditions, and so forth used in the specification and claims are to be understood to be construed in light of the number of significant digits and ordinary rounding approaches, and not as an attempt to limit the application of the doctrine of equivalents to the scope of the claims.

What is claimed is:

1. A composition, comprising:

(a) a pyridine carboxylate herbicide, wherein the pyridine carboxylate herbicide compound is propargyl 4-amino-3-chloro-5-fluoro-6-(7-fluoro-1H-indol-6-yl)pyridine-2-carboxylate:

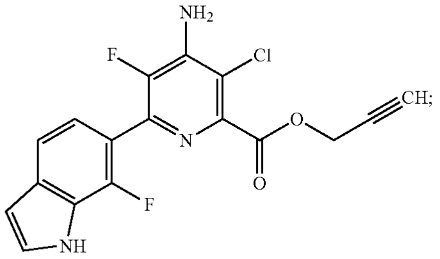

and (b) a synthetic auxin herbicide, an auxin transport inhibitor, agriculturally acceptable salts or esters thereof, or combinations thereof;

wherein the weight ratio of the pyridine carboxylate herbicide in g ae to the synthetic auxin herbicide or auxin transport inhibitor in g ai is from 1:200 to 20:1.

2. The composition of claim 1, wherein the synthetic auxin herbicide is selected from the group consisting of: 2,4-D; 2,4-DB; MCPA; MCPB; 2,3,6-TBA; aminocyclopyrachlor; aminopyralid; benazolin; chloramben; clomeprop; clopyralid; dicamba; dichlorprop; florpyrauxifen; fluroxypyr; halauxifen; mecoprop; picloram; quinclorac; quinmerac; triclopyr; agriculturally acceptable salts and esters thereof; or combinations thereof.

3. The composition of claim 1, wherein the auxin transport inhibitor is selected from the group consisting of: chlorflurenol; diflufenzopyr; naptalam; agriculturally acceptable salts or esters thereof; or combinations thereof.

4. The composition of claim 1, wherein the weight ratio of the pyridine carboxylate herbicide in g ae to the synthetic auxin herbicide or auxin transport inhibitor in g ai is from 1:100 to 10:1.

5. The composition of claim 1, wherein the synthetic auxin herbicide is selected from the group consisting of halauxifen-methyl, florpyrauxifen-benzyl, and a combination thereof.

6. The composition of claim 1, further comprising an additional pesticide.

7. The composition of claim 6, wherein the additional pesticide is selected from the group consisting of bromoxynil, florasulam, pyroxsulam, agriculturally acceptable salts or esters thereof; and combinations thereof.

8. The composition of claim 1, wherein the composition does not include a herbicidal active ingredient in addition to (a) and (b).

9. A method of controlling undesirable vegetation, comprising applying to vegetation or an area adjacent the vegetation or applying to soil or water to limit the emergence or growth of vegetation a composition, comprising:

(a) a pyridine carboxylate herbicide, wherein the pyridine carboxylate herbicide compound is propargyl 4-amino-3-chloro-5-fluoro-6-(7-fluoro-1H-indol-6-yl)pyridine-2-carboxylate:

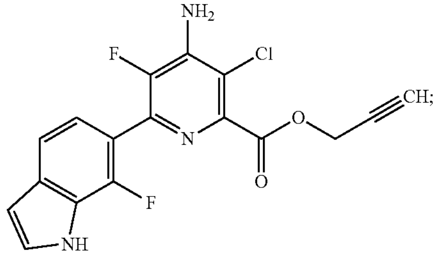

and (b) a synthetic auxin herbicide, an auxin transport inhibitor, agriculturally acceptable salts or esters thereof, or combinations thereof;

wherein the pyridine carboxylate herbicide is applied in an amount of at least 0.1 g ae/ha;

wherein the synthetic auxin herbicide or auxin transport inhibitor is applied in an amount of at least 1 g ai/ha; and wherein the weight ratio of the pyridine carboxylate herbicide in g ae/ha to the synthetic auxin herbicide or auxin transport inhibitor in g ai/ha is from 1:200 to 20:1.

10. The method of claim 9, wherein the pyridine carboxylate herbicide and the synthetic auxin herbicide or auxin transport inhibitor are applied simultaneously.

11. The method of claim 9, wherein the synthetic auxin herbicide is selected from the group consisting of: 2,4-D; 2,4-DB; MCPA; MCPB; 2,3,6-TBA; aminocyclopyrachlor; aminopyralid; chloramben; clomeprop; clopyralid; dicamba; dichlorprop; florpyrauxifen; fluroxypyr; halauxifen; mecoprop; picloram; quinclorac; quinmerac; triclopyr; agriculturally acceptable salts and esters thereof; or combinations thereof.

12. The method of claim 9, wherein the auxin transport inhibitor is selected from the group consisting of: chlorflurenol; diflufenzopyr; naptalam; agriculturally acceptable salts or esters thereof; or combinations thereof.

13. The method of claim 9, wherein the pyridine carboxylate herbicide is provided in amount of 0.1 g ae/ha to 300 g ae/ha.

14. The method of claim 9, wherein weight ratio of the pyridine carboxylate herbicide (in g ae/ha) to the synthetic auxin herbicide or auxin transport inhibitor (in g ai/ha) is from 1:100 to 10:1.

15. The method of claim 9, further comprising applying an additional pesticide.

16. The method of claim 9, wherein the composition does not include a herbicidal active ingredient in addition to (a) and (b).

* * * * *